US 11,966,116 B2

(12) United States Patent
Nichol et al.

(10) Patent No.: US 11,966,116 B2
(45) Date of Patent: Apr. 23, 2024

(54) REFLECTIVE DISPLAY COMPRISING A LIGHTGUIDE AND LIGHT TURNING FILM CREATING MULTIPLE ILLUMINATION PEAKS

(71) Applicant: AZUMO, INC., Chicago, IL (US)

(72) Inventors: Anthony Nichol, Minneapolis, MN (US); Zane Coleman, Elmhurst, IL (US)

(*) Notice: Subject to any disclaimer, the term of this patent is extended or adjusted under 35 U.S.C. 154(b) by 0 days.

(21) Appl. No.: 17/305,183

(22) Filed: Jul. 1, 2021

(65) Prior Publication Data

US 2021/0333629 A1    Oct. 28, 2021

Related U.S. Application Data

(63) Continuation of application No. PCT/US2020/012245, filed on Jan. 3, 2020.

(Continued)

(51) Int. Cl.
*G02F 1/1335*    (2006.01)
*F21V 8/00*    (2006.01)

(52) U.S. Cl.
CPC ..... *G02F 1/133553* (2013.01); *G02B 6/0031* (2013.01); *G02B 6/0068* (2013.01); *G02B 6/008* (2013.01); *G02F 1/133524* (2013.01)

(58) Field of Classification Search
CPC ......... G02F 1/133524; G02F 1/133553; G02B 6/008; G02B 6/0068; G02B 6/0031
See application file for complete search history.

(56) References Cited

U.S. PATENT DOCUMENTS 2,732,688 A    1/1956    Dickson
3,535,537 A    10/1970    Powell
(Continued)

FOREIGN PATENT DOCUMENTS

CN    1206661    2/1999
CN    1981220 A    6/2007
(Continued)

OTHER PUBLICATIONS

Rizzo, et al., "The recovery after bending of polycarbonate sheets." Rheol. Acta 20, 133-138 (1981), ISSN 0035-4511, p. 138, In 1-2.
(Continued)

*Primary Examiner* — Anabel Ton

(57) ABSTRACT

In one embodiment, a display comprises a light source positioned to emit light into a 0.5 millimeter thick lightguide with light extraction features, a cladding layer optically coupled to a core layer of the lightguide on a first side, a light turning film optically coupled to the cladding layer on an opposite side, the light turning film comprising a light turning features that redirect frustrated totally internally reflected light from the core layer into a first portion of light with a first peak luminous intensity at a first angle and a second portion of light with a second peak luminous intensity at a second angle different from the first angle and on an opposite side of the thickness direction, and the light diffusely reflecting from a reflective spatial light modulator has a peak luminous intensity within degrees from a direction normal to a surface of the display.

22 Claims, 7 Drawing Sheets

Related U.S. Application Data

(60) Provisional application No. 62/787,998, filed on Jan. 3, 2019.

(56) References Cited

U.S. PATENT DOCUMENTS

| | | |
|---|---|---|
| 3,933,556 A | 1/1976 | Strack |
| 4,026,693 A | 5/1977 | Sato |
| 4,141,058 A | 2/1979 | Mizohata et al. |
| 4,151,582 A | 4/1979 | Grunberger |
| 4,228,267 A | 10/1980 | Higashizume et al. |
| 4,389,698 A | 6/1983 | Cibie |
| 4,422,719 A | 12/1983 | Orcutt |
| 4,511,215 A | 4/1985 | Butler |
| 4,551,985 A | 11/1985 | Kovach |
| 4,592,717 A | 6/1986 | Albert |
| 4,667,481 A | 5/1987 | Watanabe et al. |
| 4,824,194 A | 4/1989 | Karasawa |
| 4,869,570 A | 9/1989 | Yokohama |
| 4,961,617 A | 10/1990 | Shahidi et al. |
| 4,974,354 A | 12/1990 | Hembrook, Jr. |
| 5,001,306 A | 3/1991 | Purcell |
| 5,009,483 A | 4/1991 | Rockwell, III |
| 5,106,181 A | 4/1992 | Rockwell, III |
| 5,134,857 A | 8/1992 | Burley |
| 5,165,187 A | 11/1992 | Shahidi-Hamedani et al. |
| 5,315,673 A | 5/1994 | Stetter et al. |
| 5,328,376 A | 7/1994 | West |
| 5,359,691 A | 10/1994 | Tai et al. |
| 5,379,539 A | 1/1995 | Hannula |
| 5,390,436 A | 2/1995 | Ashall |
| 5,506,929 A | 4/1996 | Tai et al. |
| 5,544,268 A | 8/1996 | Bischel |
| 5,596,671 A | 1/1997 | Rockwell, III |
| 5,661,839 A | 8/1997 | Whitehead |
| 5,737,472 A | 4/1998 | Bernasson et al. |
| 5,786,665 A | 7/1998 | Ohtsuki et al. |
| 5,789,710 A | 8/1998 | Vanderpoel |
| 5,818,554 A | 10/1998 | Hiyama et al. |
| 5,888,324 A | 3/1999 | Nakamura |
| 5,938,991 A | 8/1999 | Pollock |
| 6,049,641 A | 4/2000 | Deacon |
| 6,068,381 A | 5/2000 | Ayers |
| 6,208,788 B1 | 3/2001 | Nosov |
| RE37,186 E | 5/2001 | Hill |
| 6,224,269 B1 | 5/2001 | Engstrand et al. |
| 6,315,433 B1 | 11/2001 | Cavello |
| 6,354,724 B1 | 3/2002 | Sakushita |
| 6,361,180 B1 | 3/2002 | Imura |
| 6,464,365 B1 | 10/2002 | Gunn et al. |
| 6,490,090 B1 | 12/2002 | Kumazawa |
| 6,490,401 B2 | 12/2002 | Corneilissen et al. |
| 6,498,882 B1 | 12/2002 | Buckelew et al. |
| 6,547,445 B2 | 4/2003 | Kiani |
| 6,577,359 B2 | 6/2003 | Ishihara |
| 6,592,233 B1 | 7/2003 | Parikka |
| 6,641,880 B1 | 11/2003 | Deyak et al. |
| 6,700,054 B2 | 3/2004 | Cherney et al. |
| 6,750,996 B2 | 6/2004 | Jagt et al. |
| 6,825,895 B2 | 11/2004 | Nakano et al. |
| 6,846,082 B2 | 1/2005 | Glent-Madsen et al. |
| 6,847,424 B2 | 1/2005 | Gotoh et al. |
| 6,933,994 B1 | 8/2005 | Kaneko et al. |
| 6,964,226 B2 | 11/2005 | Weiss et al. |
| 7,004,610 B2 | 2/2006 | Yamashita et al. |
| 7,066,634 B2 | 6/2006 | Kitamura et al. |
| 7,108,414 B2 | 9/2006 | McCollum et al. |
| 7,121,711 B2 | 10/2006 | Yamamoto et al. |
| 7,190,425 B2 | 3/2007 | Hong |
| 7,237,396 B1 | 7/2007 | Nichol |
| 7,275,850 B2 | 10/2007 | Nesterenko |
| 7,343,060 B2 | 3/2008 | Ohtsu et al. |
| 7,384,173 B2 | 6/2008 | Whitney |
| 7,406,245 B2 | 7/2008 | Page et al. |
| 7,411,142 B2 | 8/2008 | Jung et al. |
| 7,413,336 B2 | 8/2008 | Freking et al. |
| 7,430,355 B2 | 9/2008 | Heikenfeld et al. |
| 7,452,120 B2 | 11/2008 | Lee et al. |
| 7,457,509 B2 | 11/2008 | Haenen et al. |
| 7,490,967 B2 | 2/2009 | Syribeys |
| 7,534,022 B2 | 5/2009 | Chou |
| 7,542,635 B2 | 6/2009 | Coleman |
| 7,565,054 B2 | 7/2009 | Rinko |
| 7,582,000 B2 | 9/2009 | Pendlebury et al. |
| 7,639,916 B2 | 12/2009 | Fine |
| 7,643,105 B2 | 1/2010 | Yang |
| 7,729,941 B2 | 6/2010 | Zampini, II et al. |
| 7,742,120 B2 | 6/2010 | Bayley et al. |
| 7,750,886 B2 | 7/2010 | Sampsell |
| 7,751,663 B2 | 7/2010 | Van Ostrand |
| 7,760,284 B2 | 7/2010 | Murase |
| 7,773,849 B2 | 8/2010 | Shani |
| 7,780,329 B2 | 8/2010 | McCollum et al. |
| 7,810,977 B2 | 10/2010 | Ueyama |
| 7,911,554 B2 | 3/2011 | Oohira |
| 8,013,831 B2 | 9/2011 | Sampsell |
| 8,098,347 B2 | 1/2012 | Brott et al. |
| 8,128,271 B2 | 3/2012 | Nichol |
| 8,164,703 B2 | 4/2012 | Cheng |
| 8,167,461 B2 | 5/2012 | Nichol |
| 8,231,256 B1 | 7/2012 | Coleman et al. |
| 8,434,909 B2 | 5/2013 | Nichol |
| 8,439,545 B2 | 5/2013 | Cheong et al. |
| 8,714,781 B2 | 5/2014 | Nichol |
| 8,750,671 B1 | 6/2014 | Kelly et al. |
| 8,761,565 B1 | 6/2014 | Coleman et al. |
| 8,764,262 B2 | 7/2014 | Nichol et al. |
| 8,794,809 B2 | 8/2014 | Lundin et al. |
| 8,905,610 B2 | 12/2014 | Coleman et al. |
| 8,917,962 B1 | 12/2014 | Nichol et al. |
| 8,950,902 B2 | 2/2015 | Nichol et al. |
| 9,028,123 B2 | 5/2015 | Nichol et al. |
| 9,103,956 B2 | 8/2015 | Nichol et al. |
| 9,110,200 B2 | 8/2015 | Nichol et al. |
| 9,287,336 B2 | 3/2016 | Lin et al. |
| 9,304,243 B2 | 4/2016 | Wolk et al. |
| 9,523,807 B2 | 12/2016 | Nichol et al. |
| 9,557,473 B2 | 1/2017 | Nichol et al. |
| 9,566,751 B1 | 2/2017 | Nichol et al. |
| 9,645,304 B2 | 5/2017 | Nichol et al. |
| 9,651,729 B2 * | 5/2017 | Nichol ............... G02B 6/0018 |
| 9,690,032 B1 | 6/2017 | Nichol et al. |
| 9,798,075 B2 | 10/2017 | Nichol et al. |
| 10,036,847 B2 | 7/2018 | Nichol et al. |
| 10,073,208 B2 | 9/2018 | Nichol et al. |
| 10,175,413 B2 | 1/2019 | Nichol et al. |
| 10,191,199 B2 | 1/2019 | Nichol et al. |
| 10,215,905 B2 | 2/2019 | Nichol et al. |
| 10,254,472 B2 | 4/2019 | Coleman et al. |
| 10,393,941 B2 | 8/2019 | Nichol et al. |
| 10,429,577 B2 | 10/2019 | Coleman et al. |
| 10,466,409 B2 | 11/2019 | Nichol et al. |
| 10,598,848 B2 | 3/2020 | Coleman et al. |
| 10,802,196 B2 | 10/2020 | Nichol et al. |
| 10,935,716 B2 | 3/2021 | Nichol et al. |
| 2001/0019379 A1 | 9/2001 | Ishihara et al. |
| 2001/0019380 A1 | 9/2001 | Ishihara |
| 2002/0015563 A1 | 2/2002 | Murakami |
| 2002/0028600 A1 | 3/2002 | Kondo |
| 2002/0047953 A1 | 4/2002 | Endo |
| 2002/0176035 A1 | 11/2002 | Yamazaki |
| 2003/0016930 A1 | 1/2003 | Inditsky |
| 2003/0174953 A1 | 9/2003 | Carnevale et al. |
| 2003/0198456 A1 | 10/2003 | Steiner |
| 2004/0008398 A1 | 1/2004 | Amundson |
| 2004/0093779 A1 | 5/2004 | Blach |
| 2004/0114342 A1 | 6/2004 | Lin et al. |
| 2004/0170373 A1 | 9/2004 | Kim |
| 2004/0228104 A1 | 11/2004 | Birman |
| 2004/0231481 A1 | 11/2004 | Floding et al. |
| 2005/0046921 A1 | 3/2005 | Govil et al. |
| 2005/0072032 A1 | 4/2005 | McCollum et al. |
| 2005/0088830 A1 | 4/2005 | Yumoto et al. |
| 2005/0091886 A1 | 5/2005 | Kim |
| 2005/0179850 A1 | 8/2005 | Du |

(56) References Cited

U.S. PATENT DOCUMENTS

| | | |
|---|---|---|
| 2005/0194896 A1 | 9/2005 | Sugita et al. |
| 2005/0219148 A1 | 10/2005 | Bayley et al. |
| 2005/0264730 A1 | 12/2005 | Kataoka et al. |
| 2006/0001037 A1 | 1/2006 | Schardt et al. |
| 2006/0007108 A1 | 1/2006 | Utsumi et al. |
| 2006/0008205 A1 | 1/2006 | Meir et al. |
| 2006/0008225 A1 | 1/2006 | Naitou et al. |
| 2006/0024017 A1 | 2/2006 | Page et al. |
| 2006/0061008 A1 | 3/2006 | Karner et al. |
| 2006/0105149 A1 | 5/2006 | Donahue |
| 2006/0114244 A1 | 6/2006 | Saxena et al. |
| 2006/0120106 A1 | 6/2006 | Kuki et al. |
| 2006/0120681 A1 | 6/2006 | Mune et al. |
| 2006/0207134 A1 | 9/2006 | Harry |
| 2006/0215958 A1 | 9/2006 | Yeo et al. |
| 2006/0269213 A1 | 11/2006 | Hwang |
| 2007/0002578 A1 | 1/2007 | Furusawa et al. |
| 2007/0014110 A1 | 1/2007 | Itaya |
| 2007/0025672 A1 | 2/2007 | Suzuki et al. |
| 2007/0031097 A1 | 2/2007 | Heikenfeld et al. |
| 2007/0035843 A1 | 2/2007 | Casserly |
| 2007/0081344 A1 | 4/2007 | Cappaert et al. |
| 2007/0081360 A1 | 4/2007 | Bailey et al. |
| 2007/0086712 A1 | 4/2007 | Shani |
| 2007/0116424 A1 | 5/2007 | Ting et al. |
| 2007/0133935 A1 | 6/2007 | Fine |
| 2007/0147023 A1 | 6/2007 | Matsushita |
| 2007/0153545 A1 | 7/2007 | Lee |
| 2007/0153548 A1 | 7/2007 | Hamada et al. |
| 2007/0171330 A1 | 7/2007 | Hung |
| 2007/0183730 A1 | 8/2007 | Morimoto et al. |
| 2007/0258267 A1 | 11/2007 | Huang et al. |
| 2007/0274091 A1 | 11/2007 | Inditsky |
| 2007/0279549 A1 | 12/2007 | Iwasaki |
| 2007/0280593 A1 | 12/2007 | Brychell et al. |
| 2007/0286562 A1 | 12/2007 | Inditsky |
| 2008/0007965 A1 | 1/2008 | Kanade et al. |
| 2008/0025039 A1 | 1/2008 | Guillermo |
| 2008/0031579 A1 | 2/2008 | Enami |
| 2008/0037284 A1 | 2/2008 | Rudisill |
| 2008/0043490 A1 | 2/2008 | Coleman et al. |
| 2008/0048366 A1 | 2/2008 | Durney |
| 2008/0075414 A1 | 3/2008 | Van Ostrand |
| 2008/0148753 A1 | 6/2008 | Welker et al. |
| 2008/0159693 A1 | 7/2008 | Chang |
| 2008/0266863 A1 | 10/2008 | Rinko |
| 2008/0285310 A1 | 11/2008 | Hong |
| 2009/0028038 A1 | 1/2009 | Harada |
| 2009/0034292 A1 | 2/2009 | Pokrovskiy et al. |
| 2009/0059618 A1 | 3/2009 | Onikiri et al. |
| 2009/0091836 A1 | 4/2009 | Mi et al. |
| 2009/0147535 A1 | 6/2009 | Mienko et al. |
| 2009/0172978 A1 | 7/2009 | Steenblick et al. |
| 2009/0173654 A1 | 7/2009 | Steenblick et al. |
| 2009/0190373 A1 | 7/2009 | Bita et al. |
| 2009/0207632 A1 | 8/2009 | McCollum et al. |
| 2009/0219734 A1 | 9/2009 | Sawada et al. |
| 2009/0257108 A1 | 10/2009 | Gruhlke et al. |
| 2009/0257215 A1 | 10/2009 | Gomi |
| 2010/0014311 A1 | 1/2010 | Danieli |
| 2010/0021109 A1 | 1/2010 | Ohtsu et al. |
| 2010/0021119 A1 | 1/2010 | Ohtsu et al. |
| 2010/0027289 A1 | 2/2010 | Kazuma et al. |
| 2010/0040986 A1 | 2/2010 | Yamaguchi |
| 2010/0053148 A1 | 3/2010 | Khazeni et al. |
| 2010/0067254 A1 | 3/2010 | Ohta |
| 2010/0074585 A1 | 3/2010 | Shimizu et al. |
| 2010/0092143 A1 | 4/2010 | Ushiwata et al. |
| 2010/0109173 A1 | 5/2010 | Yamamoto |
| 2010/0156953 A1 | 6/2010 | Nevitt |
| 2010/0212719 A1 | 8/2010 | Stolum |
| 2010/0214786 A1 | 8/2010 | Nichol |
| 2010/0246200 A1 | 9/2010 | Tessnow et al. |
| 2010/0258419 A1 | 10/2010 | Chung et al. |
| 2011/0032724 A1 | 2/2011 | Kinoshita |
| 2011/0085771 A1 | 4/2011 | Matsuyama et al. |
| 2011/0110638 A1 | 5/2011 | Shioda |
| 2011/0134623 A1 | 6/2011 | Sherman et al. |
| 2011/0164875 A1 | 7/2011 | Bicknell et al. |
| 2011/0176325 A1 | 7/2011 | Sherman et al. |
| 2011/0187964 A1 | 8/2011 | Li et al. |
| 2011/0227487 A1 | 9/2011 | Nichol et al. |
| 2011/0249425 A1 | 10/2011 | Aurongzeb et al. |
| 2011/0255303 A1 | 10/2011 | Nichol et al. |
| 2011/0273901 A1 | 11/2011 | Nichol et al. |
| 2011/0273906 A1 | 11/2011 | Nichol et al. |
| 2011/0277361 A1 | 11/2011 | Nichol et al. |
| 2011/0283576 A1 | 11/2011 | Nichol |
| 2011/0286234 A1 | 11/2011 | Nichol |
| 2012/0212414 A1 | 8/2012 | Osterhout et al. |
| 2012/0229531 A1 | 9/2012 | Yata et al. |
| 2012/0287674 A1 | 11/2012 | Nichol et al. |
| 2013/0038928 A1 | 2/2013 | Padiyath et al. |
| 2013/0155676 A1 | 6/2013 | Lee |
| 2013/0155723 A1 | 6/2013 | Coleman |
| 2013/0208508 A1 | 8/2013 | Nichol et al. |
| 2013/0250618 A1 | 9/2013 | Nichol et al. |
| 2013/0314942 A1 | 11/2013 | Nichol et al. |
| 2014/0049983 A1 | 2/2014 | Nichol et al. |
| 2014/0056028 A1 | 2/2014 | Nichol et al. |
| 2014/0063853 A1 | 3/2014 | Nichol et al. |
| 2014/0340910 A1 | 11/2014 | Goldstein et al. |
| 2014/0360578 A1 | 12/2014 | Nichol et al. |
| 2015/0049285 A1 | 2/2015 | Qian et al. |
| 2015/0078033 A1 | 3/2015 | Lee et al. |
| 2015/0078035 A1 | 3/2015 | Nichol et al. |
| 2015/0219834 A1 | 8/2015 | Nichol et al. |
| 2015/0253487 A1 | 9/2015 | Nichol et al. |
| 2015/0354781 A1 | 12/2015 | Catalano |
| 2016/0218156 A1 | 7/2016 | Shedletsky et al. |
| 2017/0045669 A1 | 2/2017 | Nichol et al. |
| 2017/0205572 A1 | 7/2017 | Nichol et al. |
| 2017/0235036 A1 | 8/2017 | Nichol et al. |
| 2017/0285243 A1 | 10/2017 | Nichol et al. |
| 2018/0052274 A1 | 2/2018 | Nichol et al. |
| 2018/0059318 A1 | 3/2018 | Nichol et al. |
| 2018/0210131 A1 | 7/2018 | Nichol et al. |
| 2018/0335629 A1 | 11/2018 | Cheng et al. |
| 2018/0348425 A1 | 12/2018 | Coleman et al. |
| 2019/0107665 A1 | 4/2019 | Bu et al. |
| 2019/0170925 A1 | 6/2019 | Nichol et al. |
| 2019/0170928 A1 | 6/2019 | Nichol et al. |
| 2019/0187360 A1 | 6/2019 | Nichol et al. |
| 2019/0235157 A1 | 8/2019 | Coleman et al. |
| 2020/0310020 A1 | 10/2020 | Sasaki et al. |
| 2021/0080638 A1 | 3/2021 | Nichol et al. |
| 2021/0181405 A1 | 6/2021 | Nichol et al. |
| 2021/0215857 A1 | 7/2021 | Nichol et al. |

FOREIGN PATENT DOCUMENTS

| | | |
|---|---|---|
| CN | 1981221 | 6/2007 |
| CN | 1985202 | 6/2007 |
| CN | 200962289 Y | 10/2007 |
| CN | 101140335 A | 3/2008 |
| CN | 101349400 A | 1/2009 |
| CN | 101639169 A | 2/2010 |
| DE | 2736486 A1 | 2/1978 |
| EP | 284098 A1 | 9/1988 |
| EP | 1760502 A1 | 3/2007 |
| EP | 2103972 A1 | 9/2009 |
| GB | 198085 | 5/1923 |
| GB | 662514 | 12/1951 |
| JP | 61-278416 A | 12/1987 |
| JP | 10-197865 A | 7/1998 |
| JP | S63301909 A | 12/1998 |
| JP | 11-264974 A | 9/1999 |
| JP | 2000-056138 A | 2/2000 |
| JP | 2000141997 A | 5/2000 |
| JP | 2000147218 A | 5/2000 |
| JP | 2000-258633 | 9/2000 |
| JP | 2001243818 | 9/2001 |
| JP | 2001266626 A | 9/2001 |
| JP | 2001305540 A | 10/2001 |

(56) References Cited

FOREIGN PATENT DOCUMENTS

| JP | 2001-312233 A | 11/2001 |
|---|---|---|
| JP | 2002277661 A | 9/2002 |
| JP | 2004069729 A | 3/2004 |
| JP | 2004109426 A | 4/2004 |
| JP | 2004-170972 A | 6/2004 |
| JP | 2004199967 A | 7/2004 |
| JP | 2004-288570 A | 10/2004 |
| JP | 2005043766 A | 2/2005 |
| JP | 2005340160 A | 8/2005 |
| JP | 2006-003431 A | 1/2006 |
| JP | 2006-024561 | 1/2006 |
| JP | 2006310112 A | 11/2006 |
| JP | 2007053054 A | 3/2007 |
| JP | 2007-535790 A | 12/2007 |
| JP | 2008-198615 A | 8/2008 |
| KR | 20060057583 A | 5/2006 |
| WO | 1996011358 | 4/1996 |
| WO | 2004027314 A1 | 4/2004 |
| WO | 2006131924 A2 | 12/2006 |
| WO | 2007081862 A2 | 7/2007 |
| WO | 2007123180 A1 | 11/2007 |
| WO | 2007143383 A2 | 12/2007 |
| WO | 2009048863 A1 | 4/2009 |
| WO | 2009084176 A1 | 7/2009 |
| WO | 2009084556 A1 | 7/2009 |
| WO | 2010005655 A2 | 1/2010 |
| WO | 2010085787 A1 | 7/2010 |
| WO | 2011130715 A2 | 10/2011 |
| WO | 2011130718 A2 | 10/2011 |
| WO | 2011130720 A2 | 10/2011 |
| WO | 2012016047 A1 | 2/2012 |
| WO | 2012068543 A1 | 5/2012 |
| WO | 2012088315 A1 | 6/2012 |
| WO | 2012122511 A1 | 9/2012 |
| WO | 2012158460 A1 | 11/2012 |
| WO | 2018144720 A1 | 9/2018 |
| WO | 2019090139 A1 | 5/2019 |
| WO | 2020047340 A1 | 3/2020 |
| WO | 2020123539 A1 | 6/2020 |
| WO | 2020142731 A1 | 7/2020 |
| WO | 2020146668 A1 | 7/2020 |
| WO | 2021022307 A1 | 2/2021 |

OTHER PUBLICATIONS

Lee et al., "LED Light Coupler Design for a Ultra Thin Light Guide," Journal of the Optical Society of Korea, vol. 11, No. 3, Sep. 2007, pp. 113-117.
Chien et al., "The study of LED uniform lightguide for liquid crystal display backlight applications," Tatung University white paper, Taipei, Taiwan, 2008.
Siitonen et al., "Coupling of light from an LED into a thin light guide by diffractive gratings, " Applied Optics, vol. 43, No. 30, Oct. 2004, 5631-5636.
Murata et al., "Input couplers for thin light-guides and light-emitting diodes," Optical Engineering 47(2) , Feb. 2008, 027001-027007.
Kim, Joon-Sung, et al. "Stacked Polymeric Multimode Waveguide Arrays for Two-Dimensional Optical Interconnects", Journal of Lightwave Technology, p. 840, Mar. 2004.
Luminus Devices PhlatLight Data Sheet, PDS-001022 Rev 05, 2009.
International Search Report for International Application No. PCT/US08/79041, dated Jan. 8, 2009.
Cardinal Intellectual Property's search report (Work order 5874.5) including the results of a search for the features of the claims included in the U.S. patent application entitled "Light Coupling Into Films", inventor: Anthony Nichol, and having assigned U.S. Appl. No. 12/682,387. The foregoing U.S. patent application is a continuation of U.S. Appl. No. 12/682,387.
Cardinal Intellectual Property's supplemental search report dated Nov. 7, 2011 (Work order 5874.6) including the results of a search for the features of the claims included in the U.S. patent application entitled "Method of Manufacturing a Light Emitting Device", inventor: Anthony Nichol, and having assigned U.S. Appl. No. 12/682,387. The foregoing U.S. patent application is a continuation of U.S. Appl. No. 12/682,387.
International Search Report for International Application No. PCT/US11/032797 dated Nov. 7, 2011.
Written Opinion of the International Searching Authority for International Application No. PCT/US11/032797 dated Nov. 7, 2011.
International Search Report for International Application No. PCT/US11/032795 dated Nov. 16, 2011.
Written Opinion of the International Searching Authority for International Application No. PCT/US11/032795 dated Nov. 16, 2011.
International Search Report for International Application No. PCT/US11/032792 dated Nov. 17, 2011.
Written Opinion of the International Searching Authority for International Application No. PCT/US11/032792 dated Nov. 17, 2011.
Written Opinion of the International Searching Authority for International Application No. PCT/US08/079041 dated Jan. 8, 2009.
International Search Report for International Application No. PCT/US10/22066 dated Mar. 22, 2010.
Written Opinion of the International Searching Authority for International Application No. PCT/US10/22066 dated Mar. 22, 2010.
International Search Report for International Application No. PCT/US11/045730 dated Dec. 23, 2011.
Written Opinion of the International Searching Authority for International Application No. PCT/US11/045730 dated Dec. 23, 2011.
International Search Report for International Application No. PCT/US11/61528 dated Mar. 26, 2012.
Written Opinion of the International Searching Authority for International Application No. PCT/US11/61528 dated Mar. 26, 2012.
International Search Report for International Application No. PCT/US11/066596 dated May 7, 2012.
Written Opinion of the International Searching Authority for International Application No. PCT/US11/066596 dated May 7, 2012.
Cardinal Intellectual Property's supplemental search report dated Nov. 7, 2011 (Work Order 5874.6) including the results of a search for the features of the claims included in the U.S. patent application entitled "Method of Manufacturing a Light Emitting Device," inventor: Anthony Nichol. The foregoing U.S. Patent application is a continuation of U.S. Appl. No. 12/682,387.
International Search Report and Written Opinion for International Application No. PCT/US2012/028578 dated Jun. 28, 2012.
Office action dated Nov. 19, 2013 by the China Patent Office for application No. 201180027447.2.
European Search Report and written opinion for European Application No. EP08838526 dated Sep. 19, 2012.
Office action dated Sep. 10, 2012 by the State Intellectual Property Office of China for application No. CN201080005385.0.
International Search Report and Written opinion for International Application No. PCT/US2012/37317 dated Aug. 22, 2012.
Office action dated Dec. 3, 2013 by Japan Patent Office for application No. 2010-528972.
Office action dated Mar. 5, 2013 by the Japan Patent Office for application No. 2010-528972.
Office action dated May 15, 2012 by the USPTO for U.S. Appl. No. 12/682,387.
Office action dated Dec. 23, 2011by the USPTO for U.S. Appl. No. 12/682,387.
Office action dated Jul. 23, 2012 by IP Australia for application No. 2010206525.
Office action dated Nov. 22, 2012 by Instituto Mexicano de la Propiedad Industrial for application MX/a/2011/007770.
Office action dated Dec. 6, 2012 by the USPTO for U.S. Appl. No. 13/088,231.
Notice of allowance dated Jan. 7, 2013 by the USPTO for U.S. Appl. No. 13/089,311.
Buchner, Diplomarbeit: Kinetmatics of 3D Folded Structures for Nanostructured Origami, Department of Mechanical Engineering, 3D optical Systems Group, Massachusetts Institute of Technology, 2003.
Nichol, A.J.; Barbastathis, G., "Sub-30nm alignment accuracy between layered photonic nanostructures using optimized V nanomagnet

(56) References Cited

OTHER PUBLICATIONS arrays," Optical MEMs and Nanophotonics, 2008 IEEE/LEOS International Conference on , vol. No., pp. 9,10, Aug. 11-14, 2008.
Arora et al., "Membrane folding to achieve three-dimensional nanostructures: Nanopatterned silicon nitride folded with stressed chromium hinges," Appl. Phys. Lett. 88, 053108 (Jan. 2006).
"Nanostructured Origami Folding of Patternable Resist for 3D Lithography""Se Young Yang, Hyung-ryul Johnny Choi, Martin Deterre, George Barbastathis, " "IEEE 2010 International Conference on Optical MEMS & Nanophotonics, p. 37-38, Aug. 2010".
Notice of allowance dated Jul. 29, 2013 by the China Patent Office for application No. 201080005385.0.
Office action dated Jun. 20, 2013 by Instituto Mexicano de la Propiedad Industrial for application MX/a/2012/012033.
Office action dated Jun. 26, 2013 by Instituto Mexicano de la Propiedad Industrial for application MX/a/2012/012034.
Office action dated Jun. 26, 2013 by Instituto Mexicano de la Propiedad Industrial for application MX/a/2012/012035.
Office action dated Oct. 15, 2013 by the China Patent Office for application No. 201180027439.8.
International Search Report and Written Opinion for International Application No. PCT/US2019/48943 dated Nov. 29, 2019.
International Search Report and Written Opinion for International Application No. PCT/US2019/065525 dated Feb. 21, 2020.
International Search Report and Written Opinion for International Application No. PCT/US2020/012245 dated Mar. 24, 2020.
International Search Report and Written Opinion for International Application No. PCT/US2020/012977 dated Mar. 20, 2020.
International Search Report and Written Opinion for International Application No. PCT/US2020/070341 dated Oct. 9, 2020.
Office_action_dated Mar. 10, 2023_in_CN202080013934.2.
Office_action_dated Mar. 10, 2023_in_CN202080013934.2_Machine_Translation.

* cited by examiner

REFLECTIVE DISPLAY COMPRISING A LIGHTGUIDE AND LIGHT TURNING FILM CREATING MULTIPLE ILLUMINATION PEAKS

CROSS REFERENCE TO RELATED APPLICATION

This application is a continuation application of International Application No. PCT/US2020/12245, entitled "Reflective display comprising a lightguide and light turning film creating multiple illumination peaks," filed on Jan. 3, 2020, which claims the benefit of U.S. Provisional Application No. 62/787,998, entitled "Light emitting display comprising a film-based lightguide and a conformal coating" filed on Jan. 3, 2019, the entire contents of each of which are incorporated herein by reference.

TECHNICAL FIELD

The subject matter disclosed herein generally relates to lightguides, films, and light emitting devices such as, without limitation, light fixtures, backlights, frontlights, light emitting signs, passive displays, and active displays and their components and methods of manufacture.

BACKGROUND

Light emitting devices are needed that have a very thin form factor that can generate light with specific angular light output profiles. Conventionally, in order to reduce the thickness of displays and backlights, edge-lit configurations using rigid lightguides have been used to receive light from the edge of and direct light out of a larger area surface. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes. The ability to further reduce the thickness and overall volume of these area light emitting devices has been limited by the ability to couple sufficient light flux into a thinner lightguide.

SUMMARY

In one embodiment, a display comprises a light source positioned to emit light into a 0.5 millimeter thick lightguide with light extraction features, a cladding layer optically coupled to a core layer of the lightguide on a first side, a light turning film optically coupled to the cladding layer on an opposite side, the light turning film comprising a light turning features that redirect frustrated totally internally reflected light from the core layer into a first portion of light with a first peak luminous intensity at a first angle and a second portion of light with a second peak luminous intensity at a second angle different from the first angle and on an opposite side of the thickness direction, and the light diffusely reflecting from a reflective spatial light modulator has a peak luminous intensity within 10 degrees from a direction normal to a surface of the display.

In on embodiment, a display comprises a reflective spatial light modulator diffusely reflecting incident light; a lightguide comprising a core layer having opposing surfaces with a thickness not greater than 0.5 millimeters therebetween, a lightguide region and a light emitting region; a light source positioned to emit light that propagates by total internal reflection within the lightguide region to the light emitting region; a cladding layer having a first side optically coupled to the core layer and a second side opposite the first side; a plurality of light extraction features arranged within the light emitting region in a pattern that varies spatially in the light emitting region, the plurality of light extraction features frustrate totally internally reflected light from the light source propagating between the opposing surfaces of the core layer such that light exits the core layer in the light emitting region into the cladding layer; and a light turning film optically coupled to the second side of the cladding layer, the light turning film having a thickness in a thickness direction and comprising a plurality of light turning features with a first light receiving surface and a second light receiving surface, wherein a first portion of the totally internally reflected light frustrated and exited the core layer is redirected by the first light receiving surface such that it exits the light turning film toward the reflective spatial light modulator with a first peak luminous intensity at a first angle from the thickness direction of the light turning film, a second portion of the totally internally reflected light frustrated and exited the core layer is redirected by at least the second light receiving surface such that it exits the light turning film toward the reflective spatial light modulator with a second peak luminous intensity at a second angle from the thickness direction of the light turning film on an opposite side of the thickness direction of the light turning film than the first angle, and the light diffusely reflecting from the reflective spatial light modulator due to a combination of the first portion and the second portion of the totally internally reflected light frustrated and exited the core layer has a peak luminous intensity within 10 degrees from a direction normal to a light emitting surface of the display. In another embodiment, the first light receiving surface has a first orientation angle within an angular range of 25 to 65 degrees from the thickness direction of the light turning film, and the second light receiving surface has a second orientation angle within an angular range of 60 to 90 degrees from a direction orthogonal to the thickness direction of the light turning film. In another embodiment, the plurality of light turning features are multi-faceted light turning features. In one embodiment, at least a portion of the first light receiving surface or the second light receiving surface is curved. In one embodiment, the first light receiving surface has a first orientation angle within an angular range of 30 to 60 degrees from the thickness direction of the light turning film, and the second light receiving surface has a second orientation angle within an angular range of 80 to 90 degrees from a direction orthogonal to the thickness direction of the light turning film. In a further embodiment, the second portion of the totally internally reflected light frustrated and exited the core layer is redirected by total internal reflection from the first light receiving surface and the second light receiving surface such that it exits the light turning film with a second peak luminous intensity at a second angle from the thickness direction of the light turning film on an opposite side of the thickness direction of the light turning film than the first angle. In another embodiment, the first portion of the totally internally reflected light frustrated and exited the core layer has a first angular full-width at half maximum luminous intensity, the second portion of the totally internally reflected light frustrated and exited the core layer has a second angular full-width at half maximum luminous intensity, and light reflecting from the reflective spatial light modulator due to the first portion of the totally internally reflected light and the second portion of the totally internally reflected light frustrated and exited the core layer has a third angular full-width at half-maximum luminous intensity greater than the first angular full-width at half maximum luminous intensity and the second angular full-width at half maximum luminous intensity. In another embodiment, the first angular full-width at half maximum luminous intensity and the second angular full-width at half maximum luminous intensity are between 5 and 40 degrees measured in air. In another embodiment, the light turning film is positioned between the lightguide and the reflective spatial light modulator. In a further embodiment, the reflective spatial light modulator has an optical property of diffusely reflecting light incident at an angle of 35 degrees from a normal to a top surface of the reflective spatial light modulator with a divergences less than 3 milliradians to light with an angular full-width at half maximum intensity less than 30 degrees measured in air. In one embodiment, the first angle is between 15 and 30 degrees and the second angle is between 15 and 30 degrees measured in air. In another embodiment, the reflective spatial light modulator is a reflective liquid crystal display. In another embodiment, the refractive index of the core layer of the lightguide is greater than 1.5.

In one embodiment, a display comprises a light turning film optically coupled to the second side of the cladding layer, the light turning film having a thickness in a thickness direction and comprising a plurality of light turning features that redirect frustrated totally internally reflected light from the core layer into a first portion of light and a second portion of light, wherein the first portion of light exits the light turning film toward the reflective spatial light modulator with a first peak luminous intensity at a first angle from the thickness direction of the light turning film, the second portion of light exits the light turning film toward the reflective spatial light modulator with a second peak luminous intensity at a second angle from the thickness direction of the light turning film on an opposite side of the thickness direction of the light turning film than the first angle, and the light diffusely reflecting from the reflective spatial light modulator due to the first portion of light and the second portion of light of the frustrated totally internally reflected light has a peak luminous intensity within 10 degrees from a direction normal to a light emitting surface of the display. In one embodiment, the plurality of light turning features comprise at least one curved surface. In one embodiment, the lightguide is formed from a film and comprises an array of coupling lightguides in a form of strips of the film extending from and continuous with the lightguide region of the film; each coupling lightguide of the array of coupling lightguides terminates in a bounding edge; each coupling lightguide is folded in a fold region such that the array of coupling lightguides are stacked and oriented in a first direction parallel to their stacked surfaces and the bounding edges of the array of coupling lightguides are stacked; and the light source is positioned to emit light into the bounding edges, the light propagating within the array of coupling lightguides to the lightguide region, with light from each coupling lightguide combining and totally internally reflecting within the lightguide region.

In one embodiment, the first portion of light exits the light turning film toward the reflective spatial light modulator with a first peak luminous intensity at a first angle between 5 and 20 degrees from the thickness direction of the light turning film measured in air, the second portion of light exits the light turning film toward the reflective spatial light modulator with a second peak luminous intensity at a second angle larger than the first angle between 15 and 35 degrees measured in air from the thickness direction of the light turning film on a same side of the thickness direction of the light turning film than the first angle, and the light diffusely reflecting from the reflective spatial light modulator due to the first portion and the second portion of the totally internally reflected light frustrated and exited the core layer has a peak luminous intensity within 10 degrees measured in air from a direction normal to a light emitting surface of the display.

In one embodiment, a light emitting device comprises a lightguide formed from a film having an array of coupling lightguide strips extending from a lightguide region of the film, the coupling lightguides are folded and stacked and a light source is positioned to emit light into edges of the stacked coupling lightguides to propagate into a light mixing region and then into a light emitting region, wherein the light mixing region wraps completely around the stack of coupling lightguides such that it surrounds the stack of coupling lightguides. In one embodiment, the light mixing region wraps is in contact with at least two sides of the stack of coupling lightguides. In another embodiment, the light mixing region comprises a cladding comprising a pressure sensitive adhesive material.

DETAILED DESCRIPTION OF EMBODIMENTS

Figure 1:
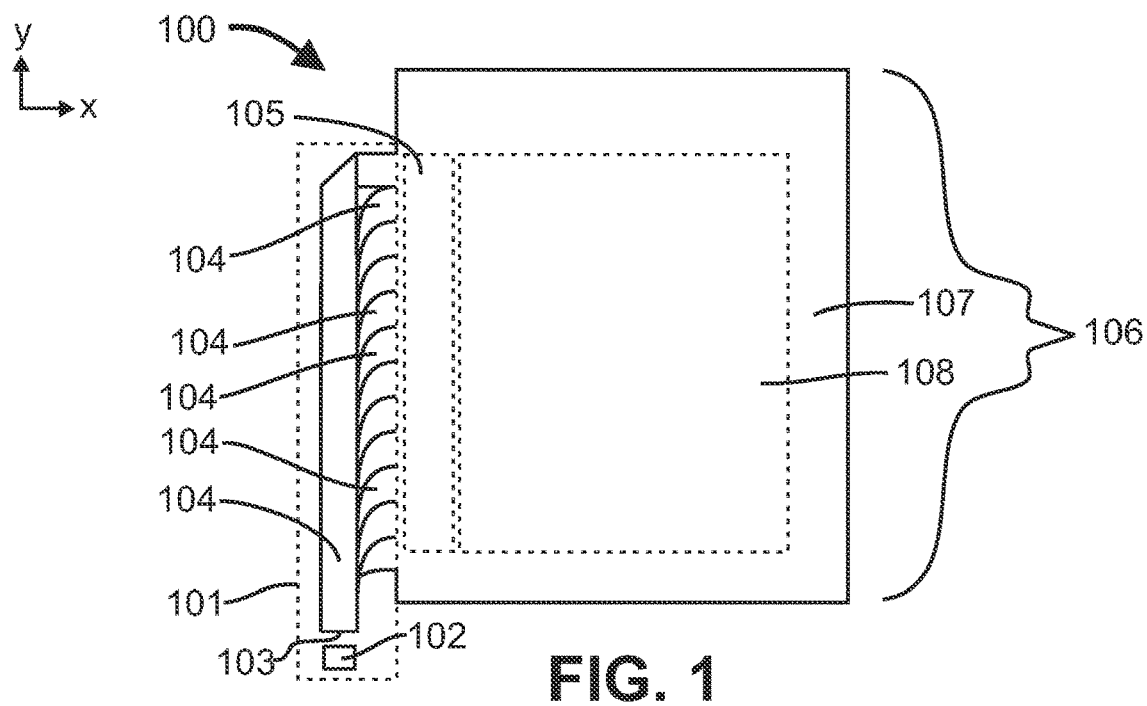
FIG. 1 is a top view of one embodiment of a light emitting device including a light input coupler disposed on one side of a lightguide.

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

Definitions

"Electroluminescent display" is defined herein as a means for displaying information wherein the legend, message, image, or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent displays can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if the angle (a) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of n≈1; however, high and low refractive index materials can be used to achieve lightguide regions. A lightguide does not need to be optically coupled to all of its components to be considered as a lightguide. Light may enter from any surface (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5 micrometer region or layer of a film or it may be a 3-millimeter sheet including a light transmitting polymer.

"In contact" and "disposed on" are used generally to describe that two items are adjacent one another such that the whole item can function as desired. This may mean that additional materials can be present between the adjacent items, as long as the item can function as desired. A "film" as used herein refers to a thin extended region, membrane, or layer of material. A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element onto a second region such that the first region covers at least a portion of the second region. An example of a fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

In one embodiment, the light emitting device has an optical axis defined herein as the direction of peak luminous intensity for light emitting from the light emitting surface or region of the device for devices with output profiles with one peak. For optical output profiles with more than one peak and the output is symmetrical about an axis, such as with a "batwing" type profile, the optical axis of the light emitting device is the axis of symmetry of the light output. In light emitting devices with angular luminous intensity optical output profiles with more than one peak which are asymmetrical about an axis, the light emitting device optical axis is the angular weighted average of the luminous intensity output. For non-planar output surfaces, the light emitting device optical axis is evaluated in two orthogonal output planes and may be a constant direction in a first output plane and at a varying angle in a second output plane orthogonal to the first output plane. For example, light emitting from a cylindrical light emitting surface may have a peak angular luminous intensity (thus light emitting device optical axis) in a light output plane that does not include the curved output surface profile and the angle of luminous intensity could be substantially constant about a rotational axis around the cylindrical surface in an output plane including the curved surface profile. Thus, in this example, the peak angular intensity is a range of angles. When the light emitting device has a light emitting device optical axis in a range of angles, the optical axis of the light emitting device includes the range of angles or an angle chosen within the range. The optical axis of a lens or element is the direction of which there is some degree of rotational symmetry in at least one plane and as used herein corresponds to the mechanical axis. The optical axis of the region, surface, area, or collection of lenses or elements may differ from the optical axis of the lens or element, and as used herein is dependent on the incident light angular and spatial profile, such as in the case of off-axis illumination of a lens or element.

Light Input Coupler

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one surface or edge of the core material with a refractive index less than a refractive index of the core material. In other embodiment, the light input coupler includes a plurality of coupling lightguides wherein a portion of light from a light source incident on a surface of at least one strip is directed into the lightguide such that light travels in a waveguide condition. The light input coupler may also include one or more of the following: a strip folding device, a strip holding element, and an input surface optical element.

In one embodiment, a first array of light input couplers is positioned to input light into the light mixing region, light emitting region, or lightguide region and a separation distance between the light input couplers varies. In one embodiment, a light emitting device includes at least three light input couplers disposed along a side of a film having a separation distance between a first pair of input couplers along the side of the film different than a separation distance between a second pair of input couplers along the side of the film. For example, in one embodiment a separation distance between the first pair of input couplers along the side of the film is great than a separation distance between a second pair of input couplers along the side of the film.

Light Source

In one embodiment, a light emitting device includes at least one light source selected from a group: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source, high efficiency plasma light source, microplasma lamp. The light emitting device may include a plurality of light sources arranged in an array, on opposite sides of lightguide, on orthogonal sides of a lightguide, on 3 or more sides of a lightguide, or on 4 sides of a substantially planer lightguide. The array of light sources may be a linear array with discrete LED packages includes at least one LED die. In another embodiment, a light emitting device includes a plurality of light sources within one package disposed to emit light toward a light input surface. In one embodiment, the light emitting device includes 1, 2, 3, 4, 5, 6, 8, 9, 10, or more than 10 light sources. In another embodiment, the light emitting device includes an organic light emitting diode disposed to emit light as a light emitting film or sheet. In another embodiment, the light emitting device includes an organic light emitting diode disposed to emit light into a lightguide.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In one embodiment, the light input coupler is region of a film that includes the lightguide and the light input coupler which includes strip sections of the film which form coupling lightguides that are grouped together to form a light coupler input surface. The coupling lightguides may be grouped together such the edges opposite the lightguide region are brought together to form an input surface including their thin edges. A planar input surface for a light input coupler can provide beneficial refraction to redirect a portion of the input light from the surface into angles such that it propagates at angles greater than the critical angle for the lightguide. In another embodiment, a substantially planar light transmitting element is optically coupled to the grouped edges of coupling lightguides. One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized.

Light Collimating Optical Element

In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In another embodiment, the light collimating element is one or more of the following: an injection molded optical lens, a thermoformed optical lens, and a cross-linked lens made from a mold. In another embodiment, the light collimating element reduces the angular full-width at half maximum (FWHM) intensity within the input plane and a plane orthogonal to the input plane. In one embodiment, the light collimating optical element receives light from a light source with a substantially symmetric angular FWHM intensity about the optical axis greater than one selected from the group: 50, 60, 70, 80, 90, 100, 110, 120, and 130 degrees in air and provides output light with an angular FWHM intensity less than one selected from the group: 60, 50, 40, 30, and 20 degrees from the optical axis measured in air. For example, in one embodiment, the light collimating optical element receives light from a white LED with an angular FWHM intensity of about 120 degrees symmetric about its optical axis and provides output light with an angular FWHM intensity of about 30 degrees from the optical axis.

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards).

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, $n_{clad}$, less than the refractive index of the material, nm, of the surface to which it is optically coupled. In a one embodiment, the average thickness of one or both cladding layers of the lightguide is less than one selected from the group: 100 micrometers, 60 micrometers, 30 micrometers, 20 micrometers, 10 micrometers, 6 micrometers, 4 micrometers, 2 micrometers, 1 micrometer, 0.8 micrometers, 0.5 micrometers, 0.3 micrometers, and 0.1 micrometers. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material. In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide, and the cladding material is not disposed on one or more coupling lightguides.

In one embodiment, the cladding is one selected from the group: methyl-based silicone pressure sensitive adhesive, fluoropolymer material (applied using a coating including a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. In another embodiment, the cladding includes a material with an effective refractive index less than the core layer due to microstructures or nanostructures. In another embodiment, the cladding layer includes a porous region including air or other gas or material with a refractive index less than 1.2 such that the effective refractive index of the cladding layer is than that of the material around the porous regions. For example, in one embodiment, the cladding layer is an aerogel or arrangement of nano-structured materials disposed on the core layer that creates a cladding layer with an effective refractive index less than the core layer. In one embodiment, the nano-structured material includes fibers, particles, or domains with an average diameter or dimension in the plane parallel to the core layer surface or perpendicular to the core layer surface less than one selected from the group: 1000, 500, 300, 200, 100, 50, 20, 10, 5, and 2 nanometers. For example, in one embodiment, the cladding layer is a coating including nanostructured fibers, including polymeric materials such as, without limitation, cellulose, polyester, PVC, PTFE, polystyrene, PMMA, PDMS, or other light transmitting or partially light transmitting materials. In another embodiment, materials that normally scattering too much light in bulk form (such as HDPE or polypropylene) to be used as a core or cladding material for lightguide lengths greater than 1 meter (such as scattering greater than 10% of the light out of the lightguide over the 1 meter length) are used in a nanostructured form. For example, in one embodiment, the nanostructured cladding material on the film based lightguide, when formed into a bulk solid form (such as a 200 micrometer thick homogeneous film formed without mechanically formed physical structures volumetrically or on the surface under film processing conditions designed to minimize haze substantially) has an ASTM haze greater than 0.5%.

In a further embodiment, the microstructured or nanostructured cladding material includes a structure that will "wet-out" or optically couple light into a light extraction feature disposed in physical contact with the microstructured or nanostructured cladding material. For example, in one embodiment, the light extraction feature includes nanostructured surface features that when in close proximity or contact with the nanostructured cladding region couple light from the cladding region. In one embodiment, the microstructured or nanostructured cladding material has complementary structures to the light extraction feature structures, such as a male-female part or other simple or complex complementary structures such that the effective refractive index in the region including the two structures is larger than that of the cladding region without the light extraction features.

Cladding layers may also be used to provide the benefit of at least one of increased rigidity, increased flexural modulus, increased impact resistance, anti-glare properties, provide an intermediate layer for combining with other layers such as in the case of a cladding functioning as a tie layer or a base or substrate for an anti-reflection coating, a substrate for an optical component such as a polarizer, liquid crystal material, increased scratch resistance, provide additional functionality (such as a low-tack adhesive to bond the lightguide region to another element, a window "cling type" film such as a highly plasticized PVC). The cladding layer may be an adhesive, such as a low refractive index silicone adhesive which is optically coupled to another element of the device, the lightguide, the lightguide region, the light mixing region, the light input coupler, or a combination of one or more of the aforementioned elements or regions. In one embodiment, a cladding layer is optically coupled to a rear polarizer in a backlit liquid crystal display. In another embodiment, the cladding layer is optically coupled to a polarizer or outer surface of a front-lit display such as an electrophoretic display, e-book display, e-reader display, MEMs type display, electronic paper displays such as E-ink® display by E Ink Corporation, reflective or partially reflective LCD display, cholesteric display, or other display capable of being illuminated from the front. In another embodiment, the cladding layer is an adhesive that bonds the lightguide or lightguide region to a component such as a substrate (glass or polymer), optical element (such as a polarizer, retarder film, diffuser film, brightness enhancement film, protective film (such as a protective polycarbonate film), the light input coupler, coupling lightguides, or other element of the light emitting device. In one embodiment, the cladding layer is separated from the lightguide or lightguide region core layer by at least one additional layer or adhesive.

In one embodiment, the cladding region is optically coupled to one or more surfaces of the light mixing region to prevent out-coupling of light from the lightguide when it is in contact with another component. In this embodiment, the cladding also enables the cladding and light mixing region to be physically coupled to another component.

Cladding Location

In one embodiment, the cladding region is optically coupled to at least one selected from the group: lightguide, lightguide region, light mixing region, one surface of the lightguide, two surfaces of the lightguide, light input coupler, coupling lightguides, and an outer surface of the film. In another embodiment, the cladding is disposed in optical contact with the lightguide, lightguide region, or layer or layers optically coupled to the lightguide, and the cladding material is not disposed on one or more coupling lightguides. In one embodiment, the coupling lightguides do not include a cladding layer between the core regions in the region near the light input surface or light source. In another embodiment, the core regions may be pressed or held together, and the edges may be cut and/or polished after stacking or assembly to form a light input surface or a light turning edge that is flat, curved, or a combination thereof. In another embodiment, the cladding layer is a pressure sensitive adhesive and the release liner for the pressure sensitive adhesive is selectively removed in the region of one or more coupling lightguides that are stacked or aligned together into an array such that the cladding helps maintain the relative position of the coupling lightguides relative to each other. In another embodiment, the protective liner is removed from the inner cladding regions of the coupling lightguides and is left on one or both outer surfaces of the outer coupling lightguides.

In one embodiment, a cladding layer is disposed on one or both opposite surfaces of the light emitting region and is not disposed between two or more coupling lightguides at the light input surface. For example, in one embodiment, a mask layer is applied to a film based lightguide corresponding to the end regions of the coupling lightguides that will form the light input surface after cutting (and possibly the coupling lightguides) and the film is coated on one or both sides with a low refractive index coating. In this embodiment, when the mask is removed and the coupling lightguides are folded (using, for example a relative position maintaining element) and stacked, the light input surface can includes core layers without cladding layers and the light emitting region can include a cladding layer (and the light mixing region may also include a cladding and/or light absorbing region), which is beneficial for optical efficiency (light is directed into the cladding at the input surface) and in applications such as film-based frontlights for reflective or transflective displays where a cladding may be desired in the light emitting region.

In another embodiment, the protective liner of at least one outer surface of the outer coupling lightguides is removed such that the stack of coupling lightguides may be bonded to one of the following: a circuit board, a non-folded coupling lightguide, a light collimating optical element, a light turning optical element, a light coupling optical element, a flexible connector or substrate for a display or touchscreen, a second array of stacked coupling lightguides, a light input coupler housing, a light emitting device housing, a thermal transfer element, a heat sink, a light source, an alignment guide, a registration guide or component including a window for the light input surface, and any suitable element disposed on and/or physically coupled to an element of the light input surface or light emitting device. In one embodiment, the coupling lightguides do not include a cladding region on either planar side and optical loss at the bends or folds in the coupling lightguides is reduced. In another embodiment, the coupling lightguides do not include a cladding region on either planar side and the light input surface input coupling efficiency is increased due to the light input surface area having a higher concentration of lightguide received surface relative to a lightguide with at least one cladding.

In one embodiment, the cladding on at least one surface of the lightguide is applied (such as coated or co-extruded) and the cladding on the coupling lightguides is subsequently removed. In a further embodiment, the cladding applied on the surface of the lightguide (or the lightguide is applied onto the surface of the cladding) such that the regions corresponding to the coupling lightguides do not have a cladding. For example, the cladding material could be extruded or coated onto a lightguide film in a central region wherein the outer sides of the film will include coupling lightguides. Similarly, the cladding may be absent on the coupling lightguides in the region disposed in close proximity to one or more light sources or the light input surface.

In one embodiment, two or more core regions of the coupling lightguides do not include a cladding region between the core regions in a region of the coupling lightguide disposed within a distance selected from the group: 1 millimeter, 2 millimeters, 4 millimeters, and 8 millimeters from the light input surface edge of the coupling lightguides.

Layers or Regions on Opposite Sides of the Lightguide of Materials with Higher and Lower Refractive Indexes In one embodiment, a light emitting region of the film-based lightguide comprises: a first layer or coating of a first material with a first refractive index optically coupled to a first surface of the film-based lightguide in the light emitting region, a second layer or coating of a second material with a second refractive index optically coupled to the opposite surface of the film-based lightguide in the light emitting region, the second refractive index higher than the first refractive index, the second refractive index and the first refractive index less than the refractive index of the material in the core region of the lightguide. In this embodiment, light propagating within the core layer or region of the film-based lightguide in the light emitting region that undergoes a low angle light redirection, such as by a low angle directing feature, will preferentially leak or exit the lightguide on the side with the second refractive index since it is higher than the first refractive index and the critical angle is higher. In this embodiment, light deviating from angles higher than the critical angle to smaller angles from the thickness direction of the film will first pass the total internal reflection interface on the side of the core layer or region optically coupled to the cladding layer or region with the higher refractive index.

Lightguide Configuration and Properties

In one embodiment, the thickness of the film, light redirecting optical element, reflective display, lightguide, and/or lightguide region is within a range of 0.005 millimeter to 0.5 millimeter. In another embodiment, the thickness of the film or lightguide is within a range of 0.025 millimeter (0.001 inches) to 0.5 millimeter (0.02 inches). In a further embodiment, the thickness of the film, lightguide and/or lightguide region is within a range of 0.050 millimeter to 0.175 millimeter. In one embodiment, the thickness of the film, lightguide or lightguide region is less than 0.2 mm or less than 0.5 millimeter. In one embodiment, one or more of a thickness, a largest thickness, an average thickness, a greater than 90% of the entire thickness of the film, a lightguide, and a lightguide region is less than 0.2 millimeters.

Optical Properties of the Lightguide or Light Transmitting Material

With regards to the optical properties of lightguides, light redirecting optical element or region, light extraction film or region, or light transmitting materials for certain embodiments, the optical properties specified herein may be general properties of the lightguide, the core, the cladding, or a combination thereof or they may correspond to a specific region (such as a light emitting region, light mixing region, or light extracting region), surface (light input surface, diffuse surface, flat surface), and direction (such as measured normal to the surface or measured in the direction of light travel through the lightguide).

Refractive Index of the Light Transmitting Material

In one embodiment, the core material of the lightguide has a higher refractive index than the cladding material. In one embodiment, the core is formed from a material with a refractive index ($n_D$) greater than one selected from the group: 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment, the refractive index ($n_D$) of the cladding material is less than one selected from the group: 1.1, 1.2, 1.3, 1.4, 1.5, 1.6, 1.7, 1.8, 1.9, 2.0, 2.1, 2.2, 2.3, 2.4, and 2.5.

Shape of the Lightguide

In one embodiment, at least a portion of the lightguide shape or lightguide surface is substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism, wave-like shape, and/or other known suitable geometrical solids or shapes. In one embodiment, the lightguide is a film formed into a shape by thermoforming or other suitable forming techniques. In another embodiment, the film or region of the film is tapered in at least one direction. In a further embodiment, a light emitting device includes a plurality of lightguides and a plurality of light sources physically coupled or arranged together (such as tiled in a 1×2 array for example). In another embodiment, the surface of the lightguide region of the film is substantially in the shape of a polygon, triangle, rectangle, square, trapezoid, diamond, ellipse, circle, semicircle, segment or sector of a circle, crescent, oval, annulus, alphanumeric character shaped (such as "U-shaped" or "T-shaped), or a combination of one or more of the aforementioned shapes. In another embodiment, the shape of the lightguide region of the film is substantially in the shape of a polyhedron, toroidal polyhedron, curved polyhedron, spherical polyhedron, rectangular cuboid, cuboid, cube, orthotope, stellation, prism, pyramid, cylinder, cone, truncated cone, ellipsoid, paraboloid, hyperboloid, sphere, or a combination of one or more of the aforementioned shapes.

Thickness of the Lightguide

In one embodiment, the thickness of the film, lightguide, lightguide region, and/or light emitting region is within a range of 0.005 millimeter to 0.5 millimeter. In another embodiment, the thickness of the film or lightguide is within a range of 0.025 millimeter (0.001 inches) to 0.5 millimeter (0.02 inches). In a further embodiment, the thickness of the film, lightguide and/or lightguide region is within a range of 0.050 millimeter to 0.175 millimeter. In one embodiment, the thickness of the film, lightguide or lightguide region is less than 0.2 millimeter or less than 0.5 millimeter. In one embodiment, one or more of a thickness, a largest thickness, an average thickness, greater than 90% of the entire thickness of the film, a lightguide, and a lightguide region is less than 0.2 millimeters. In one embodiment, the separation between the two surfaces of the core layer or region of the lightguide in the light emitting region deviates from the average separation by less than one selected from the group of 30%, 20%, 10%, and 5% of the average separation. In another embodiment, the separation distance between the two surfaces defining the total internal reflection surfaces for the lightguide within the light emitting region deviates from the average separation distance by less than one selected from the group of 30%, 20%, 10%, and 5% of the average separation distance. In one embodiment, the average angle between the two surfaces defining the total internal reflection surfaces for the lightguide within the light emitting region is less than one selected from the group of 10, 8, 6, 5, 4, 3, 2, 1 and 0.5 degrees.

In one embodiment, a reflective display comprises a lightguide wherein an effective thickness of the lightguide bounded by total internal reflection interfaces is increased for totally internally reflected light within the core layer that is frustrated by the plurality of light extraction features such that it passes through the first cladding layer and totally internally reflects at one of the total internal reflection interfaces of a light redirecting optical element. In another embodiment, a light emitting device comprises a first lightguide having a core layer having opposing surfaces with a thickness not greater than about 0.5 millimeters therebetween, the first lightguide defined by the opposing surfaces guiding light by total internal reflection, and a second lightguide comprising the core layer, the second lightguide defined by a second portion of the frustrated totally internally reflected light from the first lightguide propagating by total internal reflection between a surface of the first lightguide and an area of the surface of the light redirecting optical element between the light redirecting features. In a further embodiment, a first lightguide and a second lightguide comprise the core layer, the second lightguide defined by a portion of the frustrated totally internally reflected light from the first lightguide propagating by total internal reflection between a surface of the first lightguide and an area of a surface of the light redirecting optical element, wherein the light redirecting features of a light redirecting optical element occupy less than 50% of the surface of the light redirecting optical element, the area of the surface of the light redirecting element is defined between the light redirecting features and reflects by total internal reflection a second portion of the frustrated totally internally reflected light from the light extraction features back through a first cladding layer and into a core layer of the first lightguide where it totally internally reflects from the surface of the first lightguide and is subsequently reflected by a light redirecting feature toward a reflective spatial light modulator.

Lightguide Material

In one embodiment, a light emitting device includes a lightguide or lightguide region formed from at least one light transmitting material. In one embodiment, the lightguide is a film includes at least one core region and at least one cladding region, each including at least one light transmitting material. In one embodiment, the light transmitting material is a thermoplastic, thermoset, rubber, polymer, high transmission silicone, glass, composite, alloy, blend, silicone, or other suitable light transmitting material, or a combination thereof. In one embodiment, a component or region of the light emitting device includes a suitable light transmitting material, such as one or more of the following: cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly(vinyl ester) such as poly(vinyl acetate), poly(vinyl halide) such as poly(vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins (e.g., homopolyesters, for example, polyalkylene terephthalates such as polyethylene terephthalate and polybutylene terephthalate, polyalkylene naphthalates corresponding to the polyalkylene terephthalates; copolyesters including an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer. In another embodiment, the lightguide includes a material with at least one selected from the group: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film). In a further embodiment, at least one of the core material or cladding material of the lightguide is an adhesive material.

Multilayer Lightguide

In one embodiment, the lightguide includes at least two layers or coatings. In another embodiment, the layers or coatings function as at least one selected from the group: a core layer, a cladding layer, a tie layer (to promote adhesion between two other layers), a layer to increase flexural strength, a layer to increase the impact strength (such as Izod, Charpy, Gardner, for example), and a carrier layer.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities or inhomogeneities within the volume of the material different that co-planar layers with parallel interfacial surfaces.

In one embodiment, the light extraction feature is substantially directional and includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, an extruded mixture, a blended materials, an alloy of materials, a composite of symmetric or asymmetrically shaped materials, a laser ablated surface feature, an embossed surface feature, a coated surface feature, an injection molded surface feature, an extruded surface feature, and one of the aforementioned features disposed in the volume of the lightguide. For example, in one embodiment, the directional light extraction feature is a 100 micrometer long, 45 degree angled facet groove formed by UV cured embossing a coating on the lightguide film that substantially directs a portion of the incident light within the lightguide toward 0 degrees from the surface normal of the lightguide.

In one embodiment, the light extraction feature is a specularly, diffusive, or a combination thereof reflective material. For example, the light extraction feature may be a substantially specularly reflecting ink disposed at an angle (such as coated onto a groove), or the light extraction feature may be a substantially diffusely reflective ink such as an ink including titanium dioxide particles within a methacrylate-based binder. In one embodiment, the thin lightguide film permits smaller features to be used for light extraction features or light extracting surface features to be spaced further apart due to the thinness of the lightguide. In one embodiment, the average largest dimensional size of the light extracting surface features in the plane parallel to the light emitting surface corresponding to a light emitting region of the light emitting device is less than one selected from the group of 3 mm, 2 mm, 1 mm, 0.5 mm, 0.25 mm, 0.1 mm, 0.080, 0.050 mm, 0.040 mm, 0.025 mm, and 0.010 mm.

In another embodiment, the fill factor of the light extracting features, light turning features, or low angle directing features defined as the percentage of the area comprising the features in a square centimeter in a light emitting region, surface, or layer of the lightguide or film, is one selected from the group of less than 80%, less than 70%, less than 60%, less than 50%, less than 40%, less than 30%, less than 20%, and less than 10%. The fill factor can be measured within a full light emitting square centimeter surface region or area of the lightguide or film (bounded by region in all directions within the plane of the lightguide which emit light) or it may be the average of the light emitting areas of the lightguides. The fill factor may be measured when the light emitting device is in the on state or in the off state (not emitting light) where in the off state, the light extracting features are defined as visual discontinuities seen by a person with average visual acuity at a distance of less than 10 cm.

The light extraction region may comprise volumetric scattering regions having dispersed phase domains, voids, absence of other materials or regions (gaps, holes), air gaps, boundaries between layers and regions, and other refractive index discontinuities within the volume of the material different than co-planar layers with parallel interfacial surfaces. In one embodiment, the light extracting region comprises angled or curved surface or volumetric light extracting features that redirect a first redirection percentage of light into an angular range within 5 degrees of the normal to the light emitting surface of the light emitting device or within 80-90 or 85-90 degrees from the direction normal to the light emitting surface of the light emitting device. In another embodiment, the first redirection percentage is greater than one selected from the group of 5, 10, 20, 30, 40, 50, 60, 70, 80, and 90. In one embodiment, the light extraction features are light redirecting features, light extracting regions, or light output coupling features.

In one embodiment, the lightguide or lightguide region comprises light extraction features in a plurality of regions. In one embodiment, the lightguide or lightguide region comprises light extraction features on or within at least one selected from the group of one outer surface, two outer surfaces, two outer and opposite surfaces, an outer surface and at least one region disposed between the two outer surfaces, within two different volumetric regions substantially within two different volumetric planes parallel to at least one outer surface or light emitting surface or plane, within a plurality of volumetric planes. In another embodiment, a light emitting device comprises a light emitting region on the lightguide region of a lightguide comprising more than one region of light extraction features. In another embodiment, one or more light extraction features are disposed on top of another light extraction feature. For example, grooved light extraction features could comprise light scattering hollow microspheres which may increase the amount of light extracted from the lightguide or which could further scatter or redirect the light that is extracted by the grooves. More than one type of light extraction feature may be used on the surface, within the volume of a lightguide or lightguide region, or a combination thereof.

In one embodiment, a first lightguide including a film layer comprises light extraction features, a second lightguide is defined by a surface of a light redirecting optical element and a surface of the first lightguide, and the light redirecting optical element comprises light redirecting features or light turning features that are also light extraction features for the second lightguide.

In a further embodiment, the light extraction features are grooves, indentations, curved, or angled features that redirect a portion of light incident in a first direction to a second direction within the same plane through total internal reflection. In another embodiment, the light extraction features redirect a first portion of light incident at a first angle into a second angle greater than the critical angle in a first output plane and increase the angular full width at half maximum intensity in a second output plane orthogonal to the first. In a further embodiment, the light extraction feature is a region comprising a groove, indentation, curved or angled feature and further comprises a substantially symmetric or isotropic light scattering region of material such as dispersed voids, beads, microspheres, substantially spherical domains, or a collection of randomly shaped domains wherein the average scattering profile is substantially symmetric or isotropic. In a further embodiment, the light extraction feature is a region comprising a groove, indentation, curved or angled feature and further comprises a substantially anisotropic or asymmetric light scattering region of material such as dispersed elongated voids, stretched beads, asymmetrically shaped ellipsoidal particles, fibers, or a collection of shaped domains wherein the average scattering profile is substantially asymmetric or anisotropic. In one embodiment, the Bidirectional Scattering Distribution Function (BSDF) of the light extraction feature is controlled to create a predetermined light output profile of the light emitting device or light input profile to a light redirecting element.

In one embodiment, at least one light extraction feature is an array, pattern or arrangement of a wavelength conversion material selected from the group of a fluorophore, phosphor, a fluorescent dye, an inorganic phosphor, photonic bandgap material, a quantum dot material, a fluorescent protein, a fusion protein, a fluorophores attached to protein to specific functional groups, quantum dot fluorophores, small molecule fluorophores, aromatic fluorophores, conjugated fluorophores, and a fluorescent dye scintillators, phosphors such as Cadmium sulfide, rare-earth doped phosphor, and other known wavelength conversion materials.

In one embodiment, the light extraction feature is a specularly, diffusive, or a combination thereof reflective material. For example, the light extraction feature may be a substantially specularly reflecting ink disposed at an angle (such as coated onto a groove), or it may be a substantially diffusely reflective ink such as an ink comprising titanium dioxide particles within a methacrylate-based binder (white paint). Alternatively, the light extraction feature may be a partially diffusively reflecting ink such as an ink with small silver particles (micrometer or sub-micrometer, spherical or non-spherical, plate-like shaped or non-plate-like shaped, or silver (or aluminum) coated onto flakes) further comprising titanium dioxide particles. In another embodiment, the degree of diffusive reflection is controlled to optimize at least one of the angular output of the device, the degree of collimation of the light output, and the percentage of light extracted from the region.

The pattern or arrangement of light extraction features may vary in size, shape, pitch, location, height, width, depth, shape, orientation, in the x, y, or z directions. Patterns and formulas or equations to assist in the determination of the arrangement to achieve spatial luminance or color uniformity are known in the art of edge-illuminated backlights. In one embodiment, a light emitting device comprises a film-based lightguide comprising light extraction features disposed beneath lenticules wherein the light extraction features are substantially arranged in the form of dashed lines beneath the lenticules such that the light extracted from the line features has a lower angular FHWM intensity after redirection from the lenticular lens array light redirecting element and the length of the dashes varies to assist with the uniformity of light extraction. In another embodiment, the dashed line pattern of the light extraction features varies in the x and y directions (where the z direction is the optical axis of the light emitting device). Similarly, a two-dimensional microlens array film (close-packed or regular array) or an arrangement of microlenses may be used as a light redirecting element and the light extraction features may comprise a regular, irregular, or other arrangement of circles, ellipsoidal shapes, or other pattern or shape that may vary in size, shape, or position in the x direction, y direction, or a combination thereof. In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction. In one embodiment, the non-uniform pitch, feature dimension, or density of the low angle directing features in the first and/or second direction is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In another embodiment, the low angle directing features are light extraction features for a first lightguide and a second lightguide. In another embodiment, the light emitting device comprises low angle directing features in two or more layers or regions in the direction of the light output of the light emitting device.

Low Angle Directing Features

In one embodiment, at least one of the coupling lightguides, light mixing region, or light emitting region comprises two or more low angle directing features. As used herein, low angle directing features are refractive, total internal reflection, diffractive, or scattering surfaces, features, or interfaces that redirect light propagating within a totally internally reflecting lightguide at a first angle to the thickness direction of the film in the core region of the lightguide to a second angle in the core region of the lightguide smaller than the first angle by an average total angle of deviation of less than 20 degrees. In another embodiment, the low angle directing features redirect incident light to a second angle with an average total angle of deviation less than one selected from the group 18, 16, 14, 12, 10, 8, 6, 5, 4, 3, 2, and 1 degrees from the angle of incidence. In one embodiment, the low angle directing features are defined by one or more reflective surfaces of the reflective spatial light modulator. For example, in one embodiment, the rear reflective surface of a reflective spatial light modulator comprises low angle directing features and the reflective spatial light modulator is optically coupled to the lightguide in the light emitting region. In another example, the reflective pixels of a reflective spatial light modulator are low angle directing features and the reflective spatial light modulator is optically coupled to the lightguide in the light emitting region.

In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction. In one embodiment, the non-uniform pitch, feature dimension, or density is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In a further embodiment, the light redirecting features are low angle directing features. In another embodiment, the low angle directing features are light extraction features for a first lightguide and a second lightguide. In another embodiment, the light emitting device comprises low angle directing features in two or more layers or regions in the direction of the light output of the light emitting device.

In one embodiment, the light redirecting element has a refractive index less than or equal to the refractive index of the core layer of the film-based lightguide. For example, in one embodiment a reflective display comprises a frontlight having a light redirecting element formed in a polycarbonate material with a refractive index of about 1.6 that is optically coupled to a polycarbonate lightguide with a refractive index of about 1.6 using an adhesive functioning as a cladding layer with a refractive index of about 1.5 where the lightguide comprises low angle directing features that are light extracting features for the film-based lightguide and the lightguide is optically coupled to a reflective spatial light modulator on a side opposite the light redirecting optical element using an adhesive that functions as a cladding with a refractive index of about 1.42.

In one embodiment, a light emitting device comprises a film-based lightguide comprising a core layer having opposing surfaces with a thickness not greater than about 0.5 millimeters therebetween wherein light propagates by total internal reflection between the opposing surfaces; a first cladding layer having a first side optically coupled to the core layer and an opposing second side; an array of coupling lightguides continuous with a lightguide region of the lightguide, each coupling lightguide of the array of coupling lightguides terminates in a bounding edge, and each coupling lightguide is folded in a fold region such that the bounding edges of the array of coupling lightguides are stacked; a light emitting region comprising a plurality of light extraction features arranged in a pattern that varies spatially in the light emitting region, the plurality of light extraction features frustrate totally internally reflected light propagating within the core layer such that light exits the core layer in the light emitting region into the first cladding layer; a light source positioned to emit light into the stacked bounding edges, the light propagating within the array of coupling lightguides to the lightguide region, with light from each coupling lightguide combining and totally internally reflecting within the lightguide region; a light redirecting optical element optically coupled to the second side of the first cladding layer, the light redirecting optical element comprising light redirecting features that direct frustrated totally internally reflected light from the light extraction features toward the reflective spatial light modulator, the light redirecting features occupy less than 50% of a surface of the light redirecting optical element in the light emitting region, and wherein the core layer has an average thickness in the light emitting region, the light emitting region has a largest dimension in a plane of the light emitting region orthogonal to the thickness direction of the core layer, the largest dimension of the light emitting region divided by the average thickness of the core layer in the light emitting region is greater than 100, the light extraction features are low angle directing features, the light exiting the light source has a first full angular width at half maximum intensity in a plane orthogonal to the thickness direction of the film, the light exiting the light emitting device has second full angular width at half maximum intensity in a second plane parallel to the thickness direction and a third full angular width at half maximum intensity in a third plane parallel to the thickness direction of the film and orthogonal to the second plane. In one embodiment, the first full angular width is less than one selected from the group: 1, 2, 5, 7, 10, 15, 20, 25, 30, 35, 40, 45, and 50 degrees (measured in air). In another embodiment, the second full angular width is less than one selected from the group: 1, 2, 5, 7, 10, 15, 20, 25, 30, 35, 40, 45, and 50 degrees (measured in air). In another embodiment, the third full angular width is less than one selected from the group: 1, 2, 5, 7, 10, 15, 20, 25, 30, 35, 40, 45, and 50 degrees (measured in air). In another embodiment, the first, second, and third full angular widths are each less than one selected from the group 1, 2, 5, 7, 10, 15, 20, 25, 30, 35, 40, 45, and 50 degrees (measured in air). In one embodiment, the light exiting the light source has a full angular width at half maximum intensity in a plane parallel to the thickness direction of the film greater than the first full angular width. For example, in one embodiment, a light source is substantially collimated in a plane perpendicular to the thickness direction of the lightguide, film, or stack of coupling lightguides, in the light emitting region (or has a first angular width at half maximum intensity less than 10 degrees) and is not collimated or has a larger full angular width at half maximum intensity in the plane parallel to the thickness direction of the film or stack of coupling lightguides. In one embodiment, light from the light sources passes through the coupling lightguides and into the lightguide region, it is redirected by the low angle directing features, passes through the first cladding layer, is redirected by the light redirecting optical element and exits the light emitting device with second angular full width at half maximum intensity that can be low (such as less than 10 degrees) due to the collimation of the light source output (such as by a primary and/or secondary lens or reflector) and a third angular full width at half maximum intensity that can be low (such as less than 10 degrees) due to the collimation from the combination of the low angle directing features, the difference in refractive index between the two cladding layers, and the light redirecting features of the light redirecting optical element.

Reflecting Low Angle Directing Features

In one embodiment, a film-based lightguide comprises a light emitting region with low angle directing features defined by angled or curved interfaces between materials with two different refractive indexes. In this embodiment, the refractive index difference can cause at least a portion of the incident light to be reflected with an average total angle of deviation less than 20 degrees from the angle of incidence. In one embodiment, light propagating within a core region of a lightguide of a first core material with a first core refractive index adjacent a region with a second refractive index less than the first refractive index interacts and reflects from angled surface features embossed into the first core material such that at least a portion of the incident light is reflected with an average total angle of deviation less than 20 degrees from the angle of incidence. In one embodiment, the reflection at the angled or curved surface feature is a total internal reflection. For example, in one embodiment, a film-based lightguide comprises a light emitting region with low angle directing features defined by an arrangement of linear surface features angled at an average of 4 degrees from the direction parallel to the film surface (or core region layer interface) in the light emitting region (an average of 86 degrees from the surface normal of the film in the light emitting region). In this example, the surfaces can be formed (such as by scribing or embossing) in the core layer of material and a material with a lower refractive index may be positioned adjacent the surface such that a portion of the light incident on the surface is reflected (low angle directed) at a total angle of deviation of 8 degrees.

Refractive Low Angle Directing Features

In another example, a film-based lightguide comprises a light emitting region with low angle directing features defined by an arrangement of surfaces wherein light passing through the surface is refracted (and optionally reflected) at least once to a new angle with an average total angle of deviation less than 20 degrees from the angle of incidence. In this example, the surfaces can be formed in the core layer of material and have a material with a lower refractive index adjacent the surface such that a portion of the light incident on the surface is refracted (low angle directed) at the interface, passes through the lower refractive index material and reflects off a second interface, passes back through the lower refractive index material and back through the lightguide where it may escape the lightguide at the opposite surface interface and be subsequently redirected by light turning features.

Diffracting Low Angle Directing Features

In another example, a film-based lightguide comprises a light emitting region with low angle directing features defined by an arrangement of diffractive features or surfaces wherein light passing through the features or surfaces is diffracted (and optionally reflected) at least once to a new angle with an average total angle of deviation less than 20 degrees from the angle of incidence. For example, in one embodiment, one surface of the film-based lightguide in the light emitting region of the film comprises binary gratings or blazed diffraction gratings that redirect light incident at a first angle within a first wavelength bandwidth to a second angle different from the first angle with an average total angle deviation less than 20 degrees from the angle of incidence. In one embodiment, the pitch, size, length size, depth, or angle of the one or more diffractive features or surfaces varies in a first direction from the first side of the light emitting region to the opposite side in the direction of light propagation within the light emitting region. For example, in one embodiment, the core region of the lightguide in the light emitting region comprises diffraction gratings with a repeating array of first, second, and third pitches configured to diffract the average angle of incident light into average total angle deviations less than 20 degrees for blue, green, and red light, respectively.

Scattering Low Angle Directing Features

In a further example, a film-based lightguide comprises a light emitting region with low angle directing features defined by a layer or region with light scattering features, domains, or particles wherein light passing through the light scattering layer or region is scattered at least once to a new angle with an average total angle of deviation less than 20, 15, 10, 8, 6, 4, 3, 2, or 1 degrees from the angle of incidence. In one embodiment, the light scattering layer or region can be formed adjacent, above, below, or within a region of the core layer of material. In this example, the light scattering layer or region may comprise or be defined by a light scattering interface with a regular or irregular surface structure on a first material with a first refractive index in contact with a second surface of a second material conforming to the first material surface with a lower or higher refractive index than the first material such that a portion of the light incident on the interface is scattered (forward and/or back scattering) such that it escapes the lightguide at a surface interface and is subsequently redirected by light turning features. In another embodiment, the film-based lightguide comprises low angle scattering features defined by a dispersed phase of a first material in a second matrix material (such as dispersed beads within a coating matrix). In this embodiment, the light incident scatters or refracts from one or more domain-matrix interfaces such that the average total angle of deviation of the incident light is less than 20 degrees from the angle of incidence. In one embodiment, the low angle directing features progressively redirect light such that the light is deviated into an angle such that all or a portion of the light escapes the total internal reflection condition within the lightguide.

Polarization Dependent Low Angle Directing Features

In one embodiment, the low angle directing features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50. For example, in one embodiment, the first polarization is s-polarized light, and the second polarization is p-polarized light. In one embodiment, the low angle directing features or surface, or a material optically coupled to the low angle directing features or surface, comprise a substantially isotropic material, a birefringent material, or a trirefringent material. In one embodiment, a structured low angle directing feature in a birefringent material is used to redirect light of a first polarization such that the average total angle of deviation of the incident light is less than 20 degrees from the angle of incidence. For example, in one embodiment, light of the first polarization, such as s-polarized light, is directed into a low angle such that it is at an angle less than the critical angle for the side of the lightguide optically coupled to the cladding layer with a higher refractive index than the cladding layer on the opposite side. Thus, in this example, light of the desired polarization state, s-polarized light, is preferentially extracted by the low angle directing features. In another embodiment, one or more layers or regions optically coupled to the lightguide comprises a waveplate, birefringent material, trirefringent material, or anisotropic material that converts light remaining in the lightguide into the desired polarization state such that it can be redirected through a second or subsequent interaction with the polarization dependent low angle directing feature.

Light Turning Features

In one embodiment, the light emitting region of the lightguide comprises or is optically coupled to a layer or region with light turning features. As used herein, light turning features are refractive, total internal reflection, diffractive, or scattering surfaces, features, or interfaces that redirect at least a portion of light incident within a first angular range to a second angular range different from the first, wherein the second angular range is within 30 degrees from the thickness direction of the film in the light emitting region when measured in air. For example, in one embodiment, a polycarbonate film with grooves on a first outer surface is optically coupled to a film-based lightguide using a pressure sensitive adhesive on the second surface of the polycarbonate film opposite the first outer surface. In this embodiment, light escaping the lightguide (such as by low angle directing features) through the pressure sensitive adhesive totally internally reflects at the groove-air interface in the polycarbonate film and is directed to an angle within 30 degrees from the thickness direction of the film in the light emitting region (as measured in air) where it further passes through the lightguide to illuminate an object, such as a reflective LCD, and may optionally pass back through the lightguide. In one embodiment, the light turning features receive light from the low angle directing features and redirect the light into an angle less than 30 degrees from the thickness direction in the light emitting region as measured in air. The light turning feature may be formed on a surface or within a volume of material and the material may be thermoplastic, thermoset, or adhesive material. For purposes herein, the material comprising the light turning features has a thickness less than 0.5 millimeters and is considered a film without regards to its method of manufacture such that the light turning film may be an extruded film, UV cured film, an injection molded acrylic optic, or an injection molded polycarbonate optic, for example). In one embodiment, the light turning features are embossed (UV cured or thermomechanically embossed) surface features in a light turning film that is optically coupled (such as by using a pressure sensitive adhesive) to the film-based lightguide in the light emitting region. In one embodiment, a light turning film comprising light turning features on a first surface of the film is optically coupled to the lightguide on the second surface opposite the first surface, the light turning features comprise recessed regions or grooves in the first surface, and the first surface is adhered to a second film in regions between the recessed regions or grooves using a pressure sensitive adhesive that leaves an air gap in the recessed region or grooves. In this embodiment, the large refractive index difference between the polymer light turning film and the air within the recessed region or grooves increases the percentage of totally internally reflected light at the interface over that of an adhesive that effectively planarizes the surface by filing in the recessed regions or grooves with the adhesive. In another embodiment, the light turning film or region or layer comprising the light turning features extends into less than one selected from the group of 30%, 20%, 10%, and 5% of the light mixing region of the film-based lightguide.

In one embodiment, a light turning features of a light turning film that directs a first portion of light toward the reflective spatial light modulator with a first peak luminous intensity at a first angle between 5 and 20 degrees from the thickness direction of the light turning film measured in air and a second portion of light exits the light turning film toward the reflective spatial light modulator with a second peak luminous intensity at a second angle larger than the first angle between 15 and 35 degrees measured in air from the thickness direction of the light turning film on a same side of the thickness direction of the light turning film than the first angle. In this embodiment a light turning feature with multiple light receiving surfaces may direct light into multiple lobes or portions of light wherein a portion of the light may have a peak intensity beyond 30 degrees (such as up to 35 degrees) and may exceptionally be a light turning feature for purposes herein, such as a light turning feature directing a first portion of light to a peak luminous intensity within 30 degrees of the thickness direction of the light turning film and also directing a second portion of light with a second peak greater than 30 degrees from the thickness direction of the light turning film.

Size and Shape of the Light Turning Features

In one embodiment, a light emitting device comprises the film-based lightguide providing front illumination, such as a frontlight for a reflective display, and the density of the light turning features in the light emitting region of the film (or in a film optically coupled to the light emitting region) is less than about 50% in order to reduce undesired second light deviations (such as unwanted reflections) of the light reflected from the object illuminated and passing back through the lightguide and layer or region comprising the light turning features. In one embodiment, the area density or density along a first direction of the light turning features in the light emitting region of the lightguide is a first density selected from the group: less than 50%; less than 40%; less than 30%; between 1% and 50%; between 1% and 40%; between 1% and 30%; between 5% and 30%; and between 5% and 20%. In another embodiment, the density and/or dimension of the light turning features in the first and/or second direction is less than the first density and the light turning features are not visible from distance of 45.7 centimeters or more by a person with a visual acuity of 1 arcminute. In another embodiment, the angle subtended by the dimension of the light turning features in the first direction and/or second direction is less than one arcminute at a distance of 45.7 centimeters. In a further embodiment, area density in a plane comprising the first direction and the second direction of the light turning features is less than the first density and the light turning features redirect less than one selected from the group: 50%, 40%, 30%, 20%, and 10% of the light reflected from the object of illumination (such as a reflective display) back toward the object of illumination. Thus, in this embodiment, the density and/or dimensions of the light turning features can be configured to reduce the light reflected back toward the object which could reduce the visible luminance contrast of the object.

In another embodiment, the average depth of the light turning features in the thickness direction of the layer or region of film comprising the light turning features is one or more selected from the group: between 1 and 500 micrometers, between 3 and 300 micrometers, between 5 and 200 micrometers, greater than 2 micrometers, less than 500 micrometers, less than 200 micrometers, less than 100 micrometers, less than 75 micrometers, less than 50 micrometers, and less than 10 micrometers.

In another embodiment, the average width of the light turning features in the direction of light propagation from a first input side of the light emitting region of the lightguide to the opposite side of the light emitting region of the lightguide is one or more selected from the group: between 2 and 500 micrometers, between 5 and 300 micrometers, between 10 and 200 micrometers, greater than 5 micrometers, less than 500 micrometers, less than 200 micrometers, less than 100 micrometers, less than 75 micrometers, less than 50 micrometers, less than 25 micrometers, and less than 10 micrometers.

In one embodiment, the light turning feature includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, a composite of symmetric or asymmetrically shaped materials, a laser ablated surface feature, an embossed surface feature, a coated surface feature, an injection molded surface feature, an extruded surface feature, and one of the aforementioned features positioned in the volume of the lightguide.

In one embodiment, a reflective display comprises a light emitting device with a film-based lightguide and a reflective spatial light modulator. In this embodiment, the light emitting device comprises a light redirecting optical element with light redirecting features or light turning features with a dimension in a plane orthogonal to the thickness direction of the film-based lightguide larger than the average size of a pixel of the reflective spatial light modulator or larger than the size of 2, 3, 4, 5, 7, 10, 20, 30, or 50 average size pixels.

In another embodiment, the ratio of the average spacing between light redirecting features or light turning features to the average dimension of the light redirecting features or light turning features in a direction in a plane orthogonal to the thickness direction of the film-based lightguide is greater than one selected from the group 1, 1.5, 2, 3, 4, 5, 7, 10, 15, 20, 30, 40, 50, 70, and 100.

Multi-Faceted Light Turning Features

In one embodiment the light redirecting features or light turning features comprise a plurality of facets and/or curved sections that redirect portions of incident light into different directions. In one embodiment, the light turning film comprises a plurality of light turning features comprising a first light receiving surface and a second light receiving surface wherein the first light receiving surface and/or the second light receiving surface may be flat or curved. In one embodiment, the light turning film comprises a plurality of light turning features comprising a first light receiving surface, a second light receiving surface, and a third light receiving surface wherein the first light receiving surface, the second light receiving surface, and/or the third light receiving surface may be flat or curved. In one embodiment, the first light receiving surface of the light turning feature redirects a first portion light extracted from the core layer by a light extraction feature (such as from a low angle directing feature) to light with a first angle of peak luminous intensity (measured in air) from the thickness direction of the light turning film selected from the group: 5 and 20 degrees, 5 and 35 degrees, 10 and 35 degrees, 10 and 30 degrees, 15 and 35 degrees, 10 and 30 degrees and the second light receiving surface of the light turning feature redirects a second portion light extracted from the core layer by a light extraction feature (such as from a low angle directing feature) to light with a second angle of peak luminous intensity (measured in air) from the thickness direction of the light turning film selected from the group: 5 and 35 degrees, 10 and 35 degrees, 10 and 30 degrees, 15 and 35 degrees, 10 and 30 degrees, wherein the second angle of peak luminous intensity is on the opposite side of the thickness direction than the first angle of peak luminous intensity. In one embodiment, the second portion of the light extracted from the core layer is redirected by at least the second light receiving surface to light with the second angle of peak luminous intensity. In one embodiment, the second the second portion of the light extracted from the core layer is redirected by the first light receiving surface and the second light receiving surface to light with the second angle of peak luminous intensity. In one embodiment, the first portion and second portion of light redirected by the light turning features are diffusively reflected by the spatial light modulator such that the light reflecting from the spatial light modulator due to the first portion and the second portion of the frustrated totally internally reflected light has an angle of peak luminous intensity within 5, 10, or 15 degrees from a direction normal to the light emitting surface of the display (measured in air). In one embodiment, the light directed by the light turning features of the light turning film due to light from one or more light sources propagating in the lightguide by total internal reflection and extracted by light extracting features toward the light turning film comprises reflected light in an angular profile (measured in air) with a first lobe with a first angle of peak luminous intensity and a second lobe with a second angle of peak luminous intensity different than the first angle. In one embodiment, the full angular width at half-maximum luminous intensity of the first lobe and/or second lobe measured in air is between one selected from the group: 5 and 40 degrees; 10 and 40 degrees; 10 and 30 degrees; 15 and 30 degrees; and 10 and 20 degrees.

In one embodiment, the light redirected by the light turning film comprises two lobes which are combined and spread out to larger angular full-width at half-maximum intensities by the diffusely reflecting spatial light modulators such that the reflected light output from the reflective spatial light modulator (and optionally the display) has a peak angle of luminous intensity (such as a single peak angle of luminous intensity) measured in air within 5, 10, or 15 degrees from the normal to the light turning film, the thickness direction of the light turning film, or normal to the light emitting surface (such as by emitting light by reflecting ambient light) of the display comprising the reflective spatial light modulator.

Pitch of the Light Turning Features

In one embodiment the average pitch or spacing between the light redirecting features or light turning features is constant. In one embodiment, the average pitch of the light turning features in the direction of light propagation from a first input side of the light emitting region of the lightguide to the opposite side of the light emitting region of the lightguide (such as the direction of the average angle of propagation within the lightguide in the light emitting region, for example) is one or more selected from the group: between 5 and 500 micrometers, between 10 and 300 micrometers, between 20 and 200 micrometers, greater than 5 micrometers, less than 500 micrometers, less than 200 micrometers, less than 100 micrometers, less than 75 micrometers, and less than 50 micrometers. In one embodiment, the pitch of the light turning features is substantially constant. In one embodiment, the pitch of the light turning features or light redirecting features is configured to reduce moiré contrast with regularly spaced elements of the object of illumination, such as a reflective or transmissive LCD.

The visibility of the moiré interference pattern can be visually distracting in a light emitting device such as a display and reduces the luminance uniformity. The visibility, or luminance contrast of the moiré patterns is defined as LMmax−LMmin/(LMmax+LMmin) where LMmax and LMmin are the maximum and minimum luminance, respectively, along a cross section substantially perpendicular to the repeating moiré pattern when the elements are illuminated. In one embodiment, the moiré contrast of the light emitting device comprising the light turning features or light redirecting features, is low such that the moiré contrast is less than one selected from the group of 50%, 40%, 30%, 20% and 10%. The moiré contrast may be reduced by shifting the pitch of the light turning features or light redirecting features relative to the regular features of the object of illumination such that the moiré contrast is sufficiently small enough not to be visible to the naked eye or be seen without close inspection. The moiré contrast can be reduced or essentially eliminated by one or more of the following methods: adjusting the pitch of the light turning features or light redirecting features, rotating the light turning features or light redirecting features relative to the regular array of features in the object of illumination, randomizing the pitch of the light turning features or light redirecting features, or increasing the spacing between the light turning features or light redirecting features and the object of illumination.

In another embodiment, the light redirecting features or light turning features are spaced at a first distance from the pixels of a spatial light modulator, where the first distance is greater than one selected from the group: 0.05, 0.1, 0.2, 0.3, 0.4, 0.5, 0.6, 0.7, 0.8, 0.9, 1, 1.5, and 2 millimeters. In another embodiment, a light emitting device comprises a lens positioned to receive light redirected by the light redirecting features or light turning features that reflects or transmits through a spatial light modulator, wherein the modulation transfer function for the lens at the first distance or location of the light turning features or light redirecting features is less than 0.5 and modulation transfer function for the lens is greater than 0.7 at a plane comprising the pixels of the spatial light modulator. For example, in one embodiment, a head-mounted display comprises a film-based lightguide, a light redirecting element, a reflective spatial light modulator, and a lens (or combination of lenses) to magnify the pixels of the reflective spatial light modulator wherein the light redirecting features of the light redirecting element are positioned at a first distance from the pixels of the reflective spatial light modulator such that the modulation transfer function for the light redirecting features is less than 0.5 and the light redirecting features are not discernable or barely discernable for a person with an average acuity of 1 arcminute. Similarly, in a projection system, the modulation transfer function of a lens for the location of the light turning features or light redirecting features may be less than 0.5.

By adjusting the pitch of the light turning features when they are substantially parallel to the features in the object of illumination, the moiré contrast can be reduced. In one embodiment, the ratio of the pitches between the array of light turning features and the pitch of the regular features in the object of illumination (such as pixels in a display) is equal to $1/(N+0.5)$ where N is an integer, and the moiré contrast is reduced or eliminated. A pitch ratio from $0.9/(N+0.5)$ to $1.1/(N+0.5)$ will have a relatively low visibility of moiré. In one embodiment, the pitch of the light turning features and the pitch of the regular array of elements on the object of illumination (such a regular array of pixels in a reflective LCD) is in accordance with the above equation and has an acceptable level of moiré visibility. In one embodiment, a light emitting device comprises light turning features with a first pitch P1, the light turning features positioned to redirect light to an angle within 30 degrees from the thickness direction of the film toward an object of illumination with a regular array of elements (such as pixels in a reflective LCD) with a second pitch P2 wherein $0.9/(N+0.5)<P2/P1<1.1/(N+0.5)$ where N is an integer.

Polarization Dependent Light Turning Features

In one embodiment, the light turning features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50. For example, in one embodiment, the first polarization is s-polarized light, and the second polarization is p-polarized light. In one embodiment, the light turning features or surface, or a material optically coupled to the light turning features or surface, comprise a substantially isotropic material, a birefringent material, or a trirefringent material. In one embodiment, a structured light turning feature in a birefringent material is used to redirect light of a first polarization such that the average total angle of deviation of the incident light is less than 20 degrees from the angle of incidence. For example, in one embodiment, light from low angle directing features incident on the light turning feature of the first polarization, such as s-polarized light, is directed into an angle from the thickness direction of the film in the light emitting region less than 30 degrees such that it escapes the film-based lightguide in the light emitting region, such as to illuminate a reflective display, and may optionally pass back through the lightguide. Light of the second polarization may pass through the light turning feature and totally internally reflect at an interface further from the core region of the lightguide. In this example, the light of the second polarization may be changed to the first polarization state and be recycled within the lightguide and layers optically coupled to the lightguide. Thus, in this example, light of the desired polarization state, s-polarized light for example, is preferentially directed to an angle such that it can transmit out of the lightguide and layers by the light turning features. The light turning features may directly couple light out of the lightguide without passing back through the core region of the lightguide or the light turning features may direct the light to the opposite side of the lightguide toward an object for front illumination. In another embodiment, one or more layers or region optically coupled to the lightguide comprises a waveplate, birefringent, trirefringent, or anisotropic material that converts light remaining in the lightguide into the desired polarization state such that it can be redirected through a second or subsequent interaction with the polarization dependent light turning feature.

Light Emitting Display Configurations

In some embodiments, the layers or films, their locations, and their optical properties for illuminating from the front a reflective spatial light modulator are optimized to reduce interfacial reflections and/or increase the contrast of the light emitting display in a light emitting mode and/or an ambient light illumination mode where the light source for the light emitting display is not emitting light.

First Embodiment of a Light Emitting Display

In a first embodiment of a light emitting display, the display comprises a light input coupler, a film-based lightguide comprising a core layer with a core refractive index $n_{DL}$ optically coupled to a reflective spatial light modulator using a first pressure sensitive adhesive layer with a first refractive index $n_{D1}$. A light mixing region is positioned between the light input coupler and the light emitting region of the light emitting display. A light source is positioned to emit light into the folded stack of coupling lightguides. In this embodiment, the film-based lightguide comprises a plurality of low angle directing features on the lower surface of the core layer of the film-based lightguide that may be features formed into the lower surface or printed on the lower surface or as otherwise disclosed herein. The low angle directing features may be, for example, linear, faceted structures embossed into a polycarbonate film or light scattering regions or lines printed on the core layer, for example. The low angle directing features may decrease in separation distance in the of propagation through the core layer to extract more light out of the core layer of the film-based lightguide as the light propagates further across the reflective spatial light modulator to increase spatial luminance uniformity of the light reaching the reflective spatial light modulator and the resulting spatial luminance uniformity of the light emitting display. In this embodiment, the core layer is optically coupled to a light turning film on the upper surface of the core layer using a second pressure sensitive adhesive layer with a second refractive index $n_{D2}$. In this embodiment, the light turning film comprises a plurality of light turning features on the top surface of the light turning film opposite the second pressure sensitive adhesive layer. In this embodiment, a third pressure sensitive adhesive layer optically couples a cover layer (such as a protective PET film or touchscreen film, for example) to the light turning film over a portion of the top surface such that air gaps are formed at the light turning features. Optionally in this embodiment, an opaque layer may be optically coupled to the film-based lightguide in the light mixing region using the second pressure sensitive adhesive layer. The opaque layer may be a light absorbing layer that absorbs at least 70% of the light within a wavelength range between 400 nanometers and 700 nanometers that reaches the opaque layer through the second pressure sensitive adhesive layer. The light turning film has a refractive index $n_{DT}$.

In this first embodiment of a light emitting display, first light, second light, and third light from the light source propagate through the coupling lightguides within the light input coupler, totally internally reflect within the core layer of the film-based lightguide and propagate through the light mixing region and into the light emitting region of the film-based lightguide at, for example, the same angle of propagation within the core layer. In this embodiment, first light reflects from a low angle directing feature to a second angle in the core layer of the lightguide smaller than the incident angle by an average total angle of deviation of less than one selected from the group of 30, 20, 15, and 10 degrees. In this embodiment, the second angle is less than the critical angle for the interface between the core layer and second pressure sensitive adhesive layer. In this embodiment, $n_{DL} > n_{D2} > n_{D1}$ such that the first light and the second light preferentially escape a total internal reflection condition within the core layer of the film-based lightguide on the upper surface of the core layer since the refractive index, $n_{D2}$, of the second pressure sensitive adhesive layer is greater than the refractive index, $n_{D1}$, of the first pressure sensitive adhesive layer. After transmitting from the core layer into the second pressure sensitive adhesive layer, the first light of this embodiment propagates into the light turning film and totally internally reflects from a light turning feature in the light turning film to an angle within one selected from the group of 40, 30, 25, 20, 15 and 10 degrees from the thickness direction of the film-based lightguide (measured in air). The first light of this embodiment then propagates back through the light turning film, the second pressure sensitive adhesive layer, the core layer, and the first pressure sensitive adhesive layer, reflects from the reflective spatial light modulator, passes back through the aforementioned layers in the reverse order, does not interact a second time with a light turning feature, and is emitted from the light emitting display in the light emitting region. In this embodiment, after being redirected by the low angle directing feature, the second light propagates from the core layer into the second pressure sensitive adhesive layer and into the light turning film. In this embodiment, the second light does not intersect a light turning feature on the first pass and totally internally reflects from the top surface of the light turning film between the light turning features and propagates back through the light turning film, through the second pressure sensitive adhesive layer, through the core layer and totally internally reflects at the interface between the core layer and the first pressure sensitive adhesive layer, passes back through the aforementioned layers in reverse order and totally internally reflects from a light turning feature in the light turning film to an angle within one selected from the group of 40, 30, 25, 20, 15 and 10 degrees from the thickness direction (or direction normal to the light emitting surface of the light emitting display) of the film-based lightguide measured in air. In this embodiment, the second light then propagates back through the light turning film, the second pressure sensitive adhesive layer, the core layer, and the first pressure sensitive adhesive layer, reflects from the reflective spatial light modulator, passes back through the aforementioned layers in the reverse order, and is emitted from the light emitting display in the light emitting region.

In this embodiment third light propagates through the coupling lightguides within the light input coupler, totally internally reflects within the core layer of the film-based lightguide and propagates through the light mixing region and into the light emitting region of the film-based lightguide. Third light of this embodiment then reflects from a low angle directing feature to a second angle in the core layer of the lightguide smaller than the incident angle by an average total angle of deviation of less than one selected from the group of 30, 20, 15, and 10 degrees. In this embodiment, $n_{DT} > n_{D2}$, and third light totally internally reflects from the top surface of the light turning film between the light turning features and reflects from a light turning feature on the way back toward the core layer at an angle in the light turning film that is larger from the direction normal to the light turning film surface than it would have been had it reflected from the light turning feature directly prior to reaching the top surface of the light turning film. A portion of the third light reflects from the interface between the light turning film and the second pressure sensitive adhesive layer which propagates out of the light emitting display and reduces the contrast of the light emitting display since it has not been modulated by the reflective spatial light modulator and will increase the luminance of the dark pixels.

For example, in this embodiment, the first pressure sensitive adhesive layer may be a silicone-based pressure sensitive adhesive with a first refractive index of $n_{D1}=1.47$, the second pressure sensitive adhesive layer may be an acrylate based adhesive with a second refractive index, $n_{D2}=1.49$, the core layer may be a polycarbonate film with a refractive index $n_{DL}=1.58$, and the light turning film may be a polycarbonate film with a refractive index $n_{DT}=1.58$. In this example, the interfaces between the PC films (the light turning film and the core layer) and the second pressure sensitive adhesive have a high reflectance due to the high difference in refractive index (difference in refractive indexes is 0.09) such that the display contrast is reduced relative to some other embodiments.

Second Embodiment of a Light Emitting Display

The second embodiment of a light emitting display is similar to the first embodiment of a light emitting display except that $|n_{DT}-n_{D2}|$ is less than one selected from the group of 0.1, 0.07, 0.05, 0.03, 0.02, and 0.01; $n_{DL}-n_{DT}$ is greater than one selected from the group 0.1, 0.07, 0.05, 0.03, 0.02, and 0.01. I; and third light totally internally reflects from the top surface of the light turning film between the light turning features, reflects from a light turning feature on the way back toward the core layer (indirect reflection) to an angle in the light turning film that is closer to the directly reflected angle of (a direct reflection from the light turning feature than that of the embodiment of the first embodiment of a light emitting display since the refractive index of the light turning film is lower than the refractive index of the light turning film in the first embodiment of a light emitting display and $n_{DL}-n_{DT}$ is greater than one selected from the group 0.1, 0.07, 0.05, 0.03, 0.02, and 0.01). In this embodiment, the angle of propagation of the third light in the light turning film is at a larger angle from the normal to the top surface of the light turning film than in the first embodiment of a light emitting display such that the difference between the angles of reflection from the direct reflection light and the indirect reflection light from the light turning feature is less than the first embodiment of a light emitting display and therefore, the angular spread of the light (including the first, second, and third light) illuminating the display (and ultimately outputting from the light emitting display) is lower and with a reduced or eliminated second angular lobe due to the indirect reflection compared to the first embodiment of a light emitting display. In one embodiment, the full-angular width at half maximum luminous intensity of the light emitting from the display of this embodiment in a plane parallel to general propagation direction of light in the core layer of the lightguide (or a plane parallel to an array direction of a linear array of light turning features or parallel to an array direction of a linear array of low angle directing features) is less than one selected from the group of 70, 60, 50, 40, 30, and 20 degrees measured in air. In this second embodiment of a light emitting display, the portion of the third light that reflects from the interface between the light turning film and the second pressure sensitive adhesive layer which propagates out of the light emitting display may be a smaller reflected percentage than the reflected percentage of the portion of the third light from the first light emitting display embodiment since the refractive index, $n_{DT}$, of the light turning film may closer to the refractive index, $n_{D2}$, of the second pressure sensitive adhesive layer. Thus, in this second embodiment of a light emitting display, the contrast of the light emitting display is increased relative to the contrast of the light emitting display of the first embodiment of a light emitting display since the portion of reflected third light may be a smaller percentage of incident light than in the first embodiment of a light emitting display and less light that has not been modulated by the reflective spatial light modulator will be emitted from the light emitting display. For example, in this second embodiment of a light emitting display, the first pressure sensitive adhesive layer may be a silicone-based pressure sensitive adhesive with a first refractive index of $n_{D1}=1.47$, the second pressure sensitive adhesive layer may be an acrylate based pressure-sensitive adhesive with a second refractive index, $n_{D2}=1.491$, the core layer may be a polycarbonate film with a refractive index $n_{DL}=1.58$, and the light turning film may be an acrylic film with a refractive index $n_{DT}=1.490$. In this example of a second embodiment of a light emitting display, the interface between the light turning film (acrylic film in this embodiment) and the second pressure sensitive adhesive (an acrylic based pressure sensitive adhesive in this embodiment) has a low reflectance due to the low difference in refractive index (difference in refractive indexes is 0.001) such that the display contrast is increased relative to the first embodiment of a light emitting display.

Third Embodiment of a Light Emitting Display

In a third embodiment of a light emitting display, the display comprises the light input coupler, a film-based lightguide comprising a core layer with a core refractive index $n_{DL}$ optically coupled to a light turning film with a refractive index $n_{DT}$ on the lower surface of core layer using a second pressure sensitive adhesive layer with a second refractive index $n_{D2}$. In this embodiment, the light turning film comprises light turning features on the bottom surface of the light turning film. A high refractive index conformal coating is coated onto the bottom surface of the light turning film such that the high refractive index conformal coating is conformal with the bottom surface of the light turning film and conformal with the surfaces of the light turning features. The high refractive index conformal coating has a refractive index, $n_{DH}$, greater than one selected from the group of 1.49, 1.52, 1.55, 1.6, 1.62, 1.68, 1.70, 1.72, 1.74, 1.76, and 1.8; and $n_{DH}-n_{DT}$ is greater than one selected from the group 0.1, 0.07, 0.05, 0.03, 0.02, and 0.01. In this embodiment, the reflective spatial light modulator is optically coupled to the high refractive index conformal coating using a third pressure sensitive adhesive layer, a light source is positioned to emit light into the folded stack of coupling lightguides, and the film-based lightguide comprises a plurality of low angle directing features on the top surface of the core layer of the film-based lightguide and is optically coupled to a cover layer (such as a protective PET film or touchscreen film, for example) using a first pressure sensitive adhesive layer with a first refractive index $n_{D1}$. In this embodiment, first light from the light source propagates through the coupling lightguides within the light input coupler, totally internally reflects within the core layer of the film-based lightguide, propagates through the light mixing region and into the light emitting region of the film-based lightguide, reflects from a low angle directing feature (which may be an embossed surface or light scattering region printed on the core layer, for example) to a second angle in the core layer of the lightguide smaller than the incident angle by an average total angle of deviation less than one selected from the group of 30, 20, 15, and 10 degrees. In this embodiment, the second angle is less than the critical angle for the interface between the core layer and second pressure sensitive adhesive layer.

In this embodiment, $n_{DL}>n_{D2}>n_{D1}$ such that the first light and second light preferentially escape a total internal reflection condition within the core layer of the film-based lightguide on the lower surface of the core layer since the refractive index, $n_{D2}$, of the second pressure sensitive adhesive layer is greater than the refractive index, $n_{D1}$, of the first pressure sensitive adhesive layer. After transmitting from the core layer into the second pressure sensitive adhesive layer, the first light propagates into the light turning film, refracts into the high refractive index conformal coating at a first surface of the light turning feature, and totally internally reflects from a second surface of the light turning feature to an angle within one selected from the group of 30, 25, 20, 15 and 10 degrees from the thickness direction (or direction normal to the light emitting surface of the light emitting display) of the film-based lightguide (measured in air). The first light then propagates through the third pressure sensitive adhesive layer and reflects from the reflective spatial light modulator, passes back through the aforementioned layers in the reverse order, does not interact a second time with a light turning feature, and is emitted from the light emitting device in the light emitting region. After transmitting from the core layer into the second pressure sensitive adhesive layer, the second light propagates into the light turning film, refracts into the high refractive index conformal coating outside of a light turning feature, and totally internally reflects from the interface between the high refractive index conformal coating and the third pressure sensitive adhesive. The second light then propagates through the high refractive index conformal coating and passes through the second surface of the light turning feature and is substantially un-deviated by refraction (or refracted such that the angle of propagation rotates by less than 15, 10, or 5 degrees) into the light turning film. Thus, in this embodiment, the second light and light parallel to the second light that totally internally reflects from the interface between the high refractive index conformal coating and the third pressure sensitive adhesive but misses the light turning feature may still totally internally reflect from the interface between the core layer and the first pressure sensitive adhesive layer such that it is direct back toward the reflective spatial light modulator and isn't emitted directly from the light emitting display and doesn't reduce the contrast of the light emitting display. In this third embodiment of a light emitting display, the light turning features may comprise two substantially planar surfaces (that may be extended in a direction orthogonal to a direction of propagation of light in the core layer of the lightguide) oriented at an angle to each other greater than one selected from the group of 20, 30, 40, 50, and 60 degrees. In this third embodiment of a light emitting display, the first surface of the light turning feature is oriented at a first angle within one selected from the group of 5, 10, and 15 degrees of the thickness direction (or direction normal to the light emitting surface of the light emitting display) of the film-based lightguide and the second surface is oriented at a second angle further from the thickness direction (or direction normal to the light emitting surface of the light emitting display) of the film-based lightguide than the first angle and is within an angular range selected from the group of 40 and 50 degrees, 35 and 55 degrees, 30 and 60 degrees, and 25 and 65 degrees from the thickness direction (or direction normal to the light emitting surface of the light emitting display) of the film-based lightguide. For example, in this third embodiment of a light emitting display, the first pressure sensitive adhesive layer may be a silicone-based pressure sensitive adhesive with a first refractive index of $n_{D1}=1.47$, the second pressure sensitive adhesive layer may be an acrylate based adhesive with a second refractive index, $n_{D2}=1.49$, the core layer may be a polycarbonate film with a refractive index $n_{DL}=1.58$, the light turning film may be a polycarbonate film with a refractive index $n_{DT}=1.58$, and the high refractive index conformal coating may have a refractive index of $n_{DC}=1.7$.

Fourth Embodiment of a Light Emitting Display

In a fourth embodiment of a light emitting display, a light emitting display comprises a light input coupler, a film-based lightguide comprising a core layer with a core refractive index $n_{DL}$ optically coupled to a light turning film on the lower surface of the core layer using a second pressure sensitive adhesive layer with a second refractive index $n_{D2}$. The light turning film comprises light turning features on the bottom surface of the light turning film. A low refractive index conformal coating with a refractive index $n_{DC1}$ is coated onto the bottom surface of the light turning film such that the low refractive index conformal coating is conformal with the bottom surface of the light turning film and conformal with the first surface and the second surface (which is angled relative to the first surface) of the light turning features. In this embodiment, the low refractive index conformal coating may have a refractive index $n_{DC1}$ less than one selected from the group of 1.5, 1.49, 1.45, 1.43, 1.4, 1.39, and 1.38; and $n_{DT}-n_{DC1}$ is greater than one selected from the group 0.1, 0.07, 0.05, 0.03, 0.02, and 0.01. In this fourth embodiment of a light emitting display, the surfaces of the light turning features may be oriented similar to the light turning feature surfaces of the third embodiment of a light emitting display embodiment. In this third embodiment of a light emitting display, a second conformal coating with a refractive index $n_{DC2}$ (where, for example, $|n_{DC1}-n_{DC2}|$ may be less than one selected from the group of 0.1, 0.07, 0.05, 0.03, 0.02, and 0.01) is positioned between the low refractive index conformal coating and the third pressure sensitive adhesive layer with a refractive index $n_{D3}$. The reflective spatial light modulator is optically coupled to the second conformal coating using the third pressure sensitive adhesive layer. A light source is positioned to emit light into the folded stack of coupling lightguides. In this embodiment, the film-based lightguide comprises a plurality of low angle directing features in the form of printed light scattering lines or regions on the top surface of the core layer of the film-based lightguide and is optically coupled to a cover layer (such as a protective PET film or touchscreen film, for example) using a first pressure sensitive adhesive layer with a first refractive index $n_{D1}$. In this embodiment, a light mixing region is positioned between the light input coupler and the light emitting region of the light emitting device. In this embodiment, first light from the light source propagates through the coupling lightguides within the light input coupler, totally internally reflects within the core layer of the film-based lightguide and propagates through the light mixing region and into the light emitting region of the film-based lightguide. In this embodiment, first light then reflects (such as reflectively scatters) from a low angle directing feature to a second angle in the core layer of the lightguide smaller than the incident angle by an average total angle of deviation of less than 20 degrees. In this embodiment, the second angle is less than the critical angle for the interface between the core layer 601 and second pressure sensitive adhesive layer. In this embodiment, $n_{DL}>n_{D2}>n_{D1}$ such that the first light and second light preferentially escapes a total internal reflection condition within the core layer of the film-based lightguide on the lower surface of the core layer since the refractive index, $n_{D2}$, of the second pressure sensitive adhesive layer is greater than the refractive index, $n_{D1}$, of the first pressure sensitive adhesive layer. In this embodiment, after transmitting from the core layer into the second pressure sensitive adhesive layer, the first light propagates into the light turning film, refracts into the low refractive index conformal coating at a first surface of the light turning feature, passes through the low refractive index conformal coating, refracts into the second conformal coating, totally internally reflects from the interface between the second conformal coating and the low refractive index conformal coating to an angle within one selected from the group of 30, 25, 20, 15 and 10 degrees from the thickness direction (parallel to the z direction in this embodiment) of the film-based lightguide (measured in air). In this embodiment, the first light then propagates through the third pressure sensitive adhesive layer and reflects from the reflective spatial light modulator, passes back through the aforementioned layers in the reverse order, does not interact a second time with a light turning feature, and is emitted from the light emitting device in the light emitting region. In this embodiment, after transmitting from the core layer into the second pressure sensitive adhesive layer, the second light propagates into the light turning film, totally internally reflects at the low refractive index conformal coating and passes back through second pressure sensitive adhesive layer, into the core layer and reflects from the top surface of the core layer. In this embodiment, after transmitting from the core layer into the second pressure sensitive adhesive layer, the third light propagates into the light turning film, totally internally reflects at the low refractive index conformal coating and passes into the low refractive index conformal coating at the light turning feature, passes through a portion of the second conformal coating, passes through the low refractive index conformal coating, passes through the light turning film, passes back through second pressure sensitive adhesive layer, passes into the core layer and reflects from the top surface of the core layer. In this embodiment, fourth light preferentially escapes a total internal reflection condition within the core layer of the film-based lightguide on the lower surface of the core layer since the refractive index, $n_{D2}$, of the second pressure sensitive adhesive layer is greater than the refractive index, $n_{D1}$, of the first pressure sensitive adhesive layer. In this embodiment, after transmitting from the core layer into the second pressure sensitive adhesive layer, the fourth light propagates into the light turning film, refracts into the low refractive index conformal coating at a first surface of the light turning feature, refracts into the second conformal coating, totally internally reflects at the interface between the second conformal coating and the third pressure sensitive adhesive layer, and continues to totally internally reflect within the second conformal coating in a lightguide condition until reaching a different light turning feature where it may be coupled back into the light turning film as the third light propagated. In this fourth embodiment of a light emitting display, the second light, third light, and fourth light remain in a waveguide condition within the light emitting display until totally internally reflecting from the low refractive index conformal coating adjacent the second surface of a light turning feature toward the reflective spatial light modulator. For example, in this embodiment, the first pressure sensitive adhesive layer may be a silicone-based pressure sensitive adhesive with a first refractive index of $n_{D1}$=1.47, the second pressure sensitive adhesive layer may be an acrylate based adhesive with a second refractive index, $n_{D2}$=1.49, the core layer may be a polycarbonate film with a refractive index $n_{DL}$=1.58, the light turning film may be an acrylic film with a refractive index $n_{DT}$=1.52, the low refractive index conformal coating may have a refractive index of $n_{DC1}$=1.38, the second conformal coating may be an acrylic coating with a refractive index of $n_{DC2}$=1.52, and the third pressure sensitive adhesive may be a silicone-based pressure sensitive adhesive with a refractive index of $n_{D3}$=1.47.

Conformal Coating

In one embodiment, one or more light directing features, light turning features, layers, or films is coated with a conformal coating that may be a low refractive index conformal coating or a high refractive index conformal coating, and the conformal coating may be a partial coating such that one or more surfaces of one or more features is not substantially coated. In one embodiment, the conformal coating is coated by gravure coating at a first roll speed and first web speed. In one embodiment, the gravure coating is a micro-gravure coating. In another embodiment, the first roll speed and first web speed are chosen such that the coating covers less than one selected from the group of 50, 40, 30, 20, and 10 percent of the first surface or second surface of a light turning feature or light directing feature. In one embodiment, the conformal coating is an ultraviolet light cured coating wherein one of the first or second surface is exposed to the light and cured and the other of the first or second surface is not exposed to the light due to masking or total internal reflection such that the coating material of the other of the first or second surface may be removed such as by washing to remove the coating. Similarly, a coating may be configured to cure in regions that are not exposed to the light and the exposed regions may be removed. In one embodiment, the conformal coating is an electron-sensitive resist or material and the resist or material is exposed to electrons (such as in e-beam lithography) and cured wherein the resist or material at one of the first or second surfaces is exposed to the electrons and cured and the resist or material at the other of the first or second surface is not exposed to the electrons due to masking, total internal reflection, or direct writing or scanning such that the resist or coating material of the other of the first or second surface may be removed such as by washing. Similarly, a resist or other material may be configured to cure in regions that are not exposed to the electrons and the exposed regions may be removed.

Multiple Lightguides

In one embodiment, a light emitting device includes more than one lightguide to provide one or more of the following: color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, and large area light emitting devices including smaller light emitting devices. In another embodiment, a light emitting device includes a plurality of lightguides optically coupled to each other. In another embodiment, at least one lightguide or a component thereof includes a region with anti-blocking features such that the lightguides do not substantially couple light directly into each other due to touching.

Multiple Lightguides to Provide Pixelated Color

In one embodiment, a light emitting device includes a first lightguide and second lightguide disposed to receive light from a first and second light source, respectively, through two different optical paths wherein the first and second light source emit light of different colors and the light emitting regions of the first and second lightguides include pixelated regions spatially separated in the plane including the light output plane of the light emitting device at the pixelated regions (for example, separated in the thickness direction of the film-based lightguides).

Lightguide Folding Around Components

In one embodiment, at least one selected from the group: lightguide, lightguide region, light mixing region, plurality of lightguides, coupling lightguides, and light input coupler bends or folds such that the component other components of the light emitting device are hidden from view, located behind another component or the light emitting region, or are partially or fully enclosed. These components around which they may bend or fold include components of the light emitting device such as light source, electronics, driver, circuit board, thermal transfer element, spatial light modulator, display, housing, holder, or other components such that the components are disposed behind the folded or bent lightguide or other region or component. In one embodiment, a frontlight for a reflective display includes a lightguide, coupling lightguides and a light source wherein one or more regions of the lightguide are folded and the light source is disposed substantially behind the display. In one embodiment, the light mixing region includes a fold and the light source and/or coupling lightguides are substantially disposed on the side of the film-based lightguide opposite the light emitting region of the device or reflective display. In one embodiment, a reflective display includes a lightguide that is folded such that a region of the lightguide is disposed behind the reflective spatial light modulator of the reflective display.

Light Absorbing Region or Layer

In one embodiment, one or more of the cladding, the adhesive, the layer disposed between the lightguide and lightguide region and the outer light emitting surface of the light emitting device, a patterned region, a printed region, and an extruded region on one or more surfaces or within a volume of the film includes a light absorbing material which absorbs a first portion of light in a first predetermined wavelength range.

Light Redirecting Element Disposed to Redirect Light from the Lightguide

In one embodiment, a light emitting device includes a lightguide with light redirecting elements disposed on or within the lightguide and light extraction features disposed in a predetermined relationship relative to one or more light redirecting elements. In another embodiment, a first portion of the light redirecting elements are disposed above a light extraction feature in a direction substantially perpendicular to the light emitting surface, lightguide, or lightguide region.

In a further embodiment, light redirecting elements are disposed to redirect light which was redirected from a light extraction feature such that the light exiting the light redirecting elements is one selected from the group of more collimated than a similar lightguide with a substantially planar surface; has a full angular width at half maximum intensity less than 60 degrees, 50 degrees, 40 degrees, 30 degrees, 20 degrees, 10 degrees, or 5 degrees in a first light output plane; has a full angular width at half maximum intensity less than 60 degrees, 50 degrees, 40 degrees, 30 degrees, 20 degrees, 10 degrees, or 5 degrees in a first light output plane and second light output plane orthogonal to the first output plane; and has a full angular width at half maximum intensity less than 60 degrees, 50 degrees, 40 degrees, 30 degrees, 20 degrees, 10 degrees, or 5 degrees in all planes parallel to the optical axis of the light emitting device (measured in air).

Location of the Film-Based Lightguide

In one embodiment, the core region of the film-based lightguide is positioned between two layers selected from the group: hardcoating substrate, layer, or adhesive; anti-glare layer or anti-reflection layer, substrate or adhesive; color filter material, layer, substrate, or adhesive; first cladding of the lightguide; second cladding of the lightguide; cladding substrate or adhesive; film-based lightguide adhesive; electro-optic layer (such as liquid crystal layer or electrophoretic layer, for example); viewer side substrate for the electro-optic layer; substrate for the electro-optic layer on non-viewer side; adhesive or substrate for the electro-optic layer; reflective material, film, layer, or substrate or adhesive for reflective layer; polarizer layer substrate, or adhesive for polarizer; light redirecting layer; light extraction feature film; impact protection layer; internal coating; conformal coating; circuit board; flexible connector; thermally conducting film, layer (such as a stainless steel, copper, or aluminum foil layer), substrate, or adhesive; sealant layer, film substrate or adhesive; air gap layer; spacer layer or substrate for the spacer layer; electrically conducting layer (transparent or opaque), substrate, or adhesive; anode layer, substrate, or adhesive for anode layer; cathode layer, substrate or adhesive for cathode layer; active matrix layer, substrate or adhesive for active matrix layer; passive matrix layer, substrate or adhesive for passive matrix layer; and touchscreen layer, substrate for touchscreen, or adhesive for touchscreen layer. In another embodiment, the film-based lightguide functions as one or more of the aforementioned layers in addition to propagating light in a waveguide condition.

In one embodiment, a film-based lightguide frontlight is disposed between a touchscreen film and a reflective spatial light modulator. In another embodiment, a touchscreen film is disposed between the film-based lightguide and the reflective spatial light modulator. In another embodiment, the reflective spatial light modulator, the film-based lightguide frontlight and the touchscreen are all film-based devices, and the individual films may be laminated together. In another embodiment, the light transmitting electrically conductive coating for the touchscreen device or the display device is coated onto the film-based lightguide frontlight. In a further embodiment, the film-based lightguide is physically coupled to the flexible electrical connectors of the display or the touchscreen. In one embodiment, the flexible connector is a "flexible cable", "flex cable," "ribbon cable," or "flexible harness" including a rubber film, polymer film, polyimide film, polyester film, or other suitable film.

In one embodiment, a reflective display includes one or more film-based lightguides disposed within or adjacent to one or more regions selected from the group: the region between the touchscreen layer and the reflective light modulating pixels, the region on the viewing side of the touchscreen layer, the region between a diffusing layer and the reflective light modulating pixels, the viewing side of the diffusing layer in a reflective display, the region between a diffusing layer and the light modulating pixels, the region between the diffusing layer and the reflective element, the region between the light modulating pixels and a reflective element, the viewing side of a substrate for a component or the light modulating pixels, the reflective display, between the color filters and the spatial light modulating pixels, the viewing side of the color filters, between the color filters and the reflective element, the substrate for the color filter, the substrate for the light modulating pixels, the substrate for the touchscreen, the region between a protective lens and the reflective display, the region between a light extraction layer and the light modulating pixels, the region on the viewing side of a light extraction layer, the region between an adhesive and a component of a reflective display, and between two or more components of a reflective display known in the art. In the aforementioned embodiment, the film-based lightguide may include volumetric light extraction features or light extraction features on one or more surfaces of the lightguide and the lightguide may include one or more lightguide regions, one or more cladding regions, or one or more adhesive regions.

In one embodiment, the film-based lightguide is folded around a first edge of the active area of a reflective spatial light modulator behind a reflective spatial light modulator and one or more selected from the group: a touchscreen connector, touchscreen film substrate, reflective spatial light modulator connector, and reflective spatial light modulator film substrate is folded behind the first edge, a second edges substantially orthogonal to the first edge, or an opposite edge to the first edge. In the aforementioned embodiment, a portion of the lightguide region, light mixing region, or coupling lightguide includes the bend region of the fold and may extend beyond the reflective spatial light modulator flexible connector, reflective spatial light modulator substrate, touchscreen flexible connector or touchscreen flexible substrate.

Orientation of Light within the Display

In one embodiment, a film-based lightguide illumination device illuminates a spatial light modulator (from the viewer side, from the side opposite the viewer, or from within the display) at a display illumination angle within the layer or material adjacent the electro-optical material or layer of the spatial light modulator in a first illumination plane. As used herein, the display illumination angle is defined as the angle of peak intensity from the surface normal of the spatial light modulating component or layer measured (or calculated) within the layer or material adjacent (on the viewer side) the spatial light modulating component or layer (such as for example, the electro-optical elements of an electrophoretic display, or liquid crystal layer in a liquid crystal display) in a first illumination plane. In one embodiment, the display illumination angle is less than one selected from the group: 60, 50, 40, 30, 20, 10, and 5 degrees measured in air. In one embodiment, the first illumination plane is parallel to the extended direction of the coupling lightguides. In another embodiment, the first illumination plane is perpendicular to the extended direction of the coupling lightguides.

Light Emitting Device

In one embodiment, a light emitting device comprises: a film lightguide of a lightguide material with a lightguide refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first cladding layer comprising a first material with a first refractive index, $n_{D1}$, a second cladding layer comprising a second material with a second refractive index $n_{D2}$ where $n_{DL}>n_{D2}>n_{D1}$; a plurality of low angle directing features optically coupled to the body of the lightguide; a plurality of light turning features optically coupled to the lightguide, wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film measured in air.

In this embodiment, light propagating within the core layer or region of the film-based lightguide in the light emitting region that undergoes a low angle light redirection, such as by a low angle directing feature, will preferentially leak or exit the core layer or region of the lightguide on the side with the second refractive index since it is higher than the first refractive index and the critical angle is higher. In this embodiment, light deviating from angles higher than the critical angle to smaller angles to the normal of the film surface (or core-layer interface) will first pass the critical angle boundary on the side of the core layer or region optically coupled to the cladding layer or region with the higher refractive index than the cladding layer or region on the opposite side of the core region or layer.

In one embodiment, the low angle directing feature is configured to deviate light by a total angle of deviation less than a maximum first total angle of deviation, Of, from the angle of incidence, following the equation: $\theta_f=\theta_{c2}-\theta_{c1}$, where $\theta_{c2}$ is the critical angle between the core layer or region and the second cladding layer or region and can also be expressed as $\theta_{c2}=\sin^{-1}(n_{D2}/n_{DL})$, and $\theta_{c1}$ is the critical angle between the core layer or region and the first cladding layer or region and can be expressed as $\theta_{c1}=\sin^{-1}(n_{D1}/n_{DL})$. In another embodiment, the low angle directing feature is configured to provide a maximum total angle of deviation, $\theta_{max}$ of less than 110% of the maximum first total angle of deviation or $\theta_{max}<1.1\times\theta_f$. In another embodiment, the low angle directing feature is configured to provide an average first total angle of deviation, $\theta_{fave}$, from the angle of incidence of $\theta_{fave}=\theta_{c2}-\theta_{c1}$. In another embodiment, the low angle directing feature is configured to provide an average total angle of deviation, $\theta_{ave}$ of less than 110% of the average first total angle of deviation or $\theta_{ave}<1.1\times\theta_{fave}$.

For example, in one embodiment, the first material has a refractive index of $n_{D1}=1.4$, the second material has a refractive index of $n_{D2}=1.5$, and the core layer or region material has a refractive index of $n_{DL}=1.6$. In this example, a low angle light directing feature comprises an angled reflective surface wherein the angle of the surface causes a total light deviation less than 0 f such that the light preferentially escapes the core layer of the lightguide through the higher index cladding layer or region. In this example, $\theta_{c1}=61$ degree, $\theta_{c2}=70$ degrees, and thus the maximum first total angle of deviation for optimum coupling into the second cladding region is less than 9 degrees. Since light reflecting from an angled surface undergoes a total angle of deviation of twice the angle of the feature, the angle of the features are chosen to be less than 4.5 degrees $$\left(\frac{\theta_f}{2}\right)$$

from the direction perpendicular to the thickness direction of the film at the feature. In one embodiment the average angle from a direction perpendicular to the thickness direction of the film at the feature of the surface of a reflective low angle directing feature receiving light propagating within the lightguide is less than $$\left(\frac{\theta_f}{2}\right)$$

degrees or less than $$1.1 \times \left(\frac{\theta_f}{2}\right)$$

degrees. In another embodiment, the thickness of the core layer or region of the film-based lightguide is less than 100 micrometers and the low angle directing feature directs (such as by reflection or refraction, for example) less than one selected from the group 100%, 80%, 60%, 40%, 30%, 20%, 10%, and 5% of the incident light in a single interaction (such as a single reflection or single refraction, for example). In a further embodiment, the light propagating within the lightguide that interacts with the low angle light directing features and propagates to the light turning features interacts with an average of more than 1, 2, 3, 4, 5, 10, 15, or 20 low angle directing features before reaching a light turning feature.

Backlight or Frontlight

In one embodiment, the film-based lightguide illuminates a display, forming an electroluminescent display. In one embodiment, the film based lightguide is a frontlight for a reflective or transflective display. In another embodiment, the film-based lightguide is a backlight for a transmissive or transflective display. Typically, with displays including light emitting lightguides for illumination, the location of the lightguide will determine whether or not it is considered a backlight or frontlight for an electroluminescent display where traditionally a frontlight lightguide is a lightguide disposed on the viewing side of the display (or light modulator) and a backlight lightguide is a lightguide disposed on the opposite side of the display (or light modulator) than the viewing side. However, the frontlight or backlight terminology to be used can vary in the industry depending on the definition of the display or display components, especially in the cases where the illumination is from within the display or within components of the spatial light modulator (such as the cases where the lightguide is disposed in-between the liquid crystal cell and the color filters or in-between the liquid crystal materials and a polarizer in an LCD). In some embodiments, the lightguide is sufficiently thin to be disposed within a spatial light modulator, such as between light modulating pixels and a reflective element in a reflective display. In this embodiment, light can be directed toward the light modulating pixels directly or indirectly by directing light to the reflective element such that is reflects and passes through the lightguide toward the spatial light modulating pixels. In one embodiment, a lightguide emits light from one side or both sides and with one or two light distribution profiles that contribute to the "front" and/or "rear" illumination of light modulating components. In embodiments disclosed herein, where the light emitting region of the lightguide is disposed between the spatial light modulator (or electro-optical regions of the pixels, sub-pixels, or pixel elements) and a reflective component of a reflective display, the light emitting from the light emitting region may propagate directly toward the spatial light modulator or indirectly via directing the light toward a reflective element such that the light reflected passes back through the lightguide and into the spatial light modulator. In this specific case, the terms "frontlight" and "backlight" used herein may be used interchangeably.

In one embodiment, a light emitting display backlight or frontlight includes a light source, a light input coupler, and a lightguide. In one embodiment, the frontlight or backlight illuminates a display or spatial light modulator selected from the group: transmissive display, reflective display, liquid crystal displays (LCD's), MEMs based display, electrophoretic displays, cholesteric display, time-multiplexed optical shutter display, color sequential display, interferometric modulator display, bistable display, electronic paper display, LED display, TFT display, OLED display, carbon nanotube display, nanocrystal display, head mounted display, head-up display, segmented display, passive matrix display, active matrix display, twisted nematic display, in-plane switching display, advanced fringe field switching display, vertical alignment display, blue phase mode display, zenithal bistable device, reflective LCD, transmissive LCD, electrostatic display, electrowetting display, bistable TN displays, micro-cup EPD displays, grating aligned zenithal display, photonic crystal display, electrofluidic display, and electrochromic displays.

LCD Backlight or Frontlight

In one embodiment, a backlight or frontlight suitable for use with a liquid crystal display panel includes at least one light source, light input coupler, and lightguide. In one embodiment, the backlight or frontlight includes a single lightguide wherein the illumination of the liquid crystal panel is white. In another embodiment, the backlight or frontlight includes a plurality of lightguides disposed to receive light from at least two light sources with two different color spectra such that they emit light of two different colors. In another embodiment, the backlight or frontlight includes a single lightguide disposed to receive light from at least two light sources with two different color spectra such that they emit light of two different colors. In another embodiment, the backlight or frontlight includes a single lightguide disposed to receive light from a red, green, and blue light source. In one embodiment, the lightguide includes a plurality of light input couplers wherein the light input couplers emit light into the lightguide with different wavelength spectrums or colors. In another embodiment, light sources emitting light of two different colors or wavelength spectrums are disposed to couple light into a single light input coupler. In this embodiment, more than one light input coupler may be used, and the color may be controlled directly by modulating the light sources.

Reflective Display

In one embodiment, a method of producing a display includes: forming an array of coupling lightguides from a lightguide region of a film including a core region and a cladding region by separating the coupling lightguides from each other such that they remain continuous with the lightguide region of the film and include bounding edges at the end of the coupling lightguides; folding the plurality of coupling lightguides such that the bounding edges are stacked; directing light from a light source into the stacked bounding edges such that light from the light source propagates within the core region through the coupling lightguides and lightguide region of the film by total internal reflection; forming light extraction features on or within the core layer in a light emitting region of the lightguide region of the film; disposing a light extracting region on the cladding region or optically coupling a light extracting region to the cladding region in a light mixing region of the lightguide region between the coupling lightguides and the light emitting region; and disposing the light emitting region adjacent a reflective spatial light modulator.

The lightguides disclosed herein may be used to illuminate a reflective display. In one embodiment, a reflective display comprises a first reflective surface and a film-based lightguide comprising a plurality of coupling lightguides. In this embodiment, the reflective display may be a diffusely reflective spatial light modulator or a specularly reflecting spatial light modulator. For example, a diffusely reflective spatial light modulator can include a reflective display such as an electrophoretic particle based reflective display and a specularly reflecting spatial light modulator can include a reflective LCD with specularly reflecting rear electrodes. The reflective spatial light modulator, or a component of the light emitting device, lightguide, or a coating or layer positioned within, may include a light scattering or diffusive surface or volumetric light scattering particles or domains.

In one embodiment, the light emitting device is a frontlight for a watch that comprises a reflective display. In another embodiment, the largest dimension in a plane orthogonal to the thickness direction of the lightguide or display of the light emitting region is less than one selected from the group of 100, 75, 50, 40, 30, and 25 millimeters.

Modes of the Light Emitting Device

In another embodiment, a light emitting device includes one or more modes selected from the group: normal viewing mode, daytime viewing mode, high brightness mode, low brightness mode, nighttime viewing mode, night vision or NVIS compatible mode, dual display mode, monochrome mode, grayscale mode, transparent mode, full color mode, high color gamut mode, color corrected mode, redundant mode, touchscreen mode, 3D mode, field sequential color mode, privacy mode, video display mode, photo display mode, alarm mode, nightlight mode, emergency lighting/sign mode, user adjustable color mode, and stereoscopic display mode.

In one embodiment, a light emitting display includes a film-based lightguide and a reflective spatial light modulator wherein the light reflected by the reflective spatial light modulator from light incident from a lightguide due to light extracted from the lightguide propagating in a first direction does not substantially overlap the light reflected by the reflective spatial light modulator from light incident from the lightguide extracted from light propagating in a second direction different from the first direction. In one embodiment, a light emitting display includes a reflective spatial light modulator with a diffusely reflecting properties wherein the angular full-width at half maximum intensity of the diffusely reflected light is less than one selected from the group: 50 degrees, 40 degrees, 30 degrees, 20 degrees, and 10 degrees when measured in air with laser light with a divergence less than 3 milliradians at an incidence angle of 35 degrees.

Head-Mounted Display (HMD)

In one embodiment, a head-mounted display (HMD) comprises the film-based lightguide, wherein the light output from the light emitting area provides illumination to an amplitude or phase spatial light modulator. In one embodiment, the light from the light emitting region provides illumination to the amplitude or phase spatial light modulator as a frontlight or a backlight. In another embodiment, the spatially modulated light from the amplitude or phase spatial light modulator is directed onto the input surface of a light input coupler, propagates through the lightguide film, and is emitted from the lightguide and directed to one or more eyes of the viewer wearing the head-mounted display. In one embodiment, an eyewear frame or one or more arms of a frame comprises one or more selected from the group: the light mixing region of the lightguide, an inactive region of the lightguide, the spatial light modulator, the light source, and the electronics. In one embodiment, the light emitting area of the film-based lightguide is positioned on a surface or within a lens of eyewear. In another embodiment, the head-mounted display is an attachment that can be permanently or removably attached to eyewear such as sunglasses or prescription eyewear. In this embodiment, the light emitting area may be a film that can be pressed, laminated, glued, placed adjacent, physically coupled, or optically coupled to or adjacent a lens or frame of eyewear. In one embodiment, the array of coupling lightguides extend over one selected from the group: 5, 10, 15, 20, 30, 40, 50, 60, and 70 percent of the length of the frame along one side of the eyewear. In another embodiment, the light mixing region of the lightguide extends over one selected from the group: 5, 10, 15, 20, 30, 40, 50, 60, and 70 percent of the length of the frame along one side of the eyewear.

Angular Profile of Light Emitting from the Light Emitting Device

In one embodiment, the light emitting from at least one surface of the light emitting device has an angular full-width at half-maximum intensity (FWHM) measured in air less than one selected from the group: 120 degrees, 100 degrees, 80 degrees, 60 degrees, 40 degrees, 20 degrees and 10 degrees. In another embodiment, the light emitting from at least one surface of the light emitting device has at least one angular peak of intensity within at least one angular range selected from the group: 0-10 degrees, 20-30 degrees, 30-40 degrees, 40-50 degrees, 60-70 degrees, 70-80 degrees, 80-90 degrees, 40-60 degrees, 30-60 degrees, and 0-80 degrees from the normal to the light emitting surface measured in air. In another embodiment, the light emitting from at least one surface of the light emitting device has two peaks within one or more of the aforementioned angular ranges and the light output resembles a "bat-wing" type profile known in the lighting industry to provide uniform illuminance over a predetermined angular range. In another embodiment, the light emitting device emits light from two opposing surfaces within one or more of the aforementioned angular ranges and the light emitting device is one selected from the group: a backlight illuminating two displays on either side of the backlight, a light fixture providing up-lighting and down-lighting, a frontlight illuminating a display and having light output on the viewing side of the frontlight that has not reflected from the modulating components of the reflective spatial light modulator with a peak angle of luminance greater than 40 degrees, 50 degrees, or 60 degrees. In another embodiment, the optical axis of the light emitting device is within an angular range selected from the group: 0-20, 20-40, 40-60, 60-80, 80-100, 100-120, 120-140, 140-160, 160-180, 35-145, 45-135, 55-125, 65-115, 75-105, and 85-95 degrees from the normal to a light emitting surface measured in air. In a further embodiment, the shape of the lightguide is substantially tubular and the light substantially propagates through the tube in a direction parallel to the longer (length) dimension of the tube and the light exits the tube wherein at least 70% of the light output flux is contained within an angular range of 35 degrees to 145 degrees from the light emitting surface measured in air. In a further embodiment, the light emitting device emits light from a first surface and a second surface opposite the first surface wherein the light flux exiting the first and second surfaces, respectively, is chosen from the group: 5-15% and 85-95%, 15-25% and 75-85%, 25-35% and 65-75%, 35-45% and 65-75%, 45-55% and 45-55%. In another embodiment, the first light emitting surface emits light in a substantially downward direction and the second light emitting surface emits light substantially in an upward direction. In another embodiment, the first light emitting surface emits light in a substantially upward direction and the second light emitting surface emits light substantially in a downward direction.

Film Production

In one embodiment, the film or lightguide is one selected from the group: extruded film, co-extruded film, cast film, solvent cast film, UV cast film, pressed film, injection molded film, knife coated film, spin coated film, and coated film. In one embodiment, one or two cladding layers are co-extruded on one or both sides of a lightguide region. In another embodiment, tie layers, adhesion promotion layers, materials or surface modifications are disposed on a surface of or between the cladding layer and the lightguide layer. In one embodiment, the coupling lightguides, or core regions thereof, are continuous with the lightguide region of the film as formed during the film formation process. For example, coupling lightguides formed by slicing regions of a film at spaced intervals can form coupling lightguides that are continuous with the lightguide region of the film. In another embodiment, a film-based lightguide with coupling lightguides continuous with the lightguide region can be formed by injection molding or casting a material in a mold including a lightguide region with coupling lightguide regions with separations between the coupling lightguides. In one embodiment, the region between the coupling lightguides and lightguide region is homogeneous and without interfacial transitions such as without limitation, air gaps, minor variations in refractive index, discontinuities in shapes or input-output areas, and minor variations in the molecular weight or material compositions.

In another embodiment, at least one selected from the group: lightguide layer, light transmitting film, cladding region, adhesive region, adhesion promotion region, or scratch resistant layer is coated onto one or more surfaces of the film or lightguide. In another embodiment, the lightguide or cladding region is coated onto, extruded onto, or otherwise disposed onto a carrier film.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides. The relative position maintaining element may be adhered, clamped, disposed in contact, disposed against a linear fold region, or disposed between a linear fold region and a lightguide region.

In another embodiment, the relative position maintaining element includes angular teeth or regions that redistribute the force at the time of bending at least one coupling lightguide or maintains an even redistribution of force after at least one coupling lightguide is bent or folded. In another embodiment, the relative position maintaining element redistributes the force from bending and pulling one or more coupling lightguides from a corner point to substantially the length of an angled guide. In another embodiment, the edge of the angled guide is rounded. In another embodiment, the relative position maintaining element redistributes the force from bending during the bending operation and provides the resistance to maintain the force required to maintain a low profile (short dimension in the thickness direction) of the coupling lightguides. In a further embodiment, the relative position maintaining element is also a thermal transfer element. In one embodiment, the relative position maintaining element is an aluminum component with angled guides or teeth that is thermally coupled to an LED light source.

The following are more detailed descriptions of various embodiments illustrated in the Figures.

FIG. 1 is a top view of one embodiment of a light emitting device 100 including a light input coupler 101 disposed on one side of a film-based lightguide. The light input coupler 101 includes coupling lightguides 104 and a light source 102 disposed to direct light into the coupling lightguides 104 through a light input surface 103 including input edges of the coupling lightguides 104. In one embodiment, each coupling lightguide 104 includes a coupling lightguide terminating at a bounding edge. Each coupling lightguide is folded such that the bounding edges of the coupling lightguides are stacked to form the light input surface 103. The light emitting device 100 further includes a lightguide region 106 defining a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as the light propagates through the lightguide 107. In one embodiment, light is emitted from the lightguide 107 in the light emitting region 108 due to light extraction features (not shown).

Figure 2:
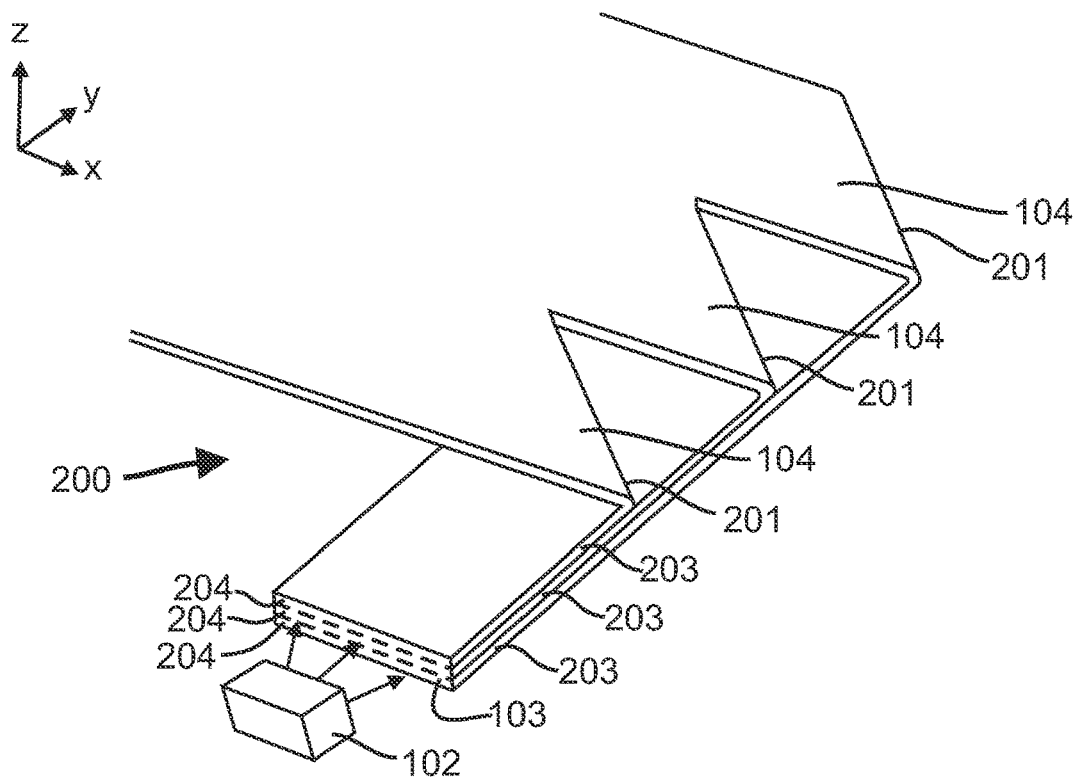
FIG. 2 is a perspective view of one embodiment of a light input coupler with coupling lightguides folded in the –y direction.

FIG. 2 is a perspective view of one embodiment of a light input coupler 200 with coupling lightguides 104 folded in the −y direction. Light from the light source 102 is directed into the light input surface 103 through or along input edges 204 of the coupling lightguides 104. A portion of the light from the light source 102 propagating within the coupling lightguides 104 with a directional component in the +y direction will reflect in the +x and −x directions from the lateral edges 203 of the coupling lightguides 104 and will reflect in the +z and −z directions from the top and bottom surfaces of the coupling lightguides 104. The light propagating within the coupling lightguides is redirected by the folds 201 in the coupling lightguides 104 toward the −x direction.

Figure 3:
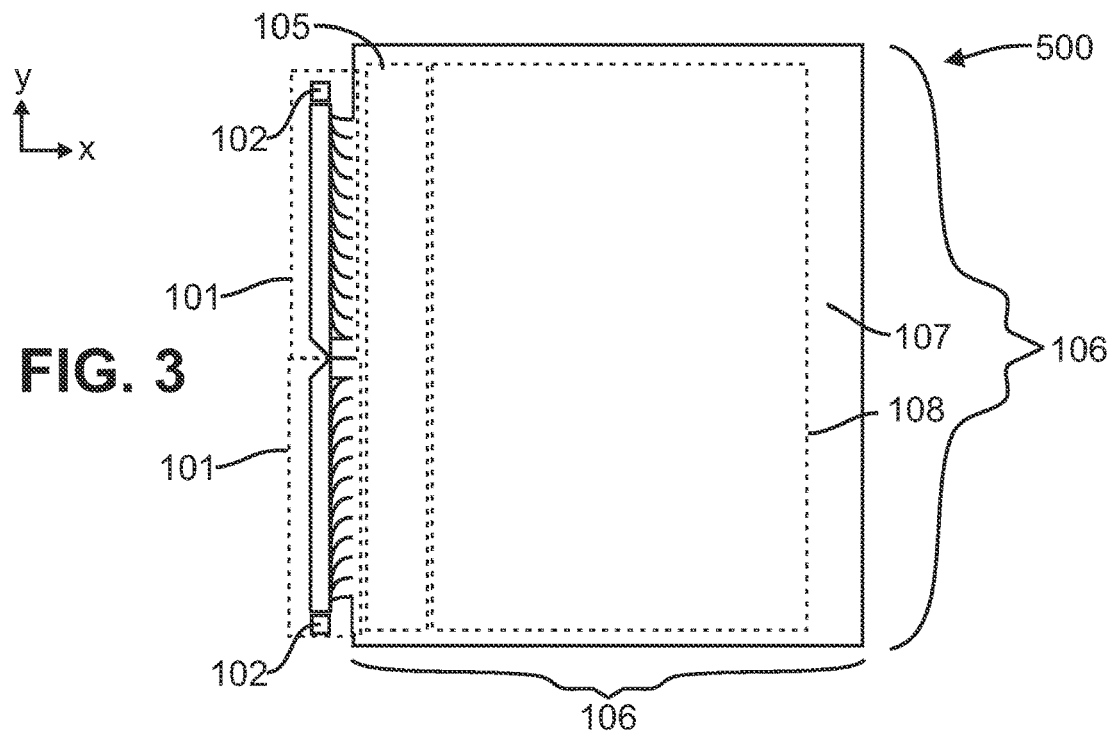
FIG. 3 is a top view of one embodiment of a light emitting device with two light input couplers disposed on the same side of a lightguide wherein the optical axes of the light sources are oriented substantially toward each other.

FIG. 3 is a top view of one embodiment of a light emitting device 500 with two light input couplers 101 disposed on the same side of the lightguide region 106. In this embodiment, the light sources 102 are oriented substantially with the light directed toward each other in the +y and −y directions.

Figure 4:
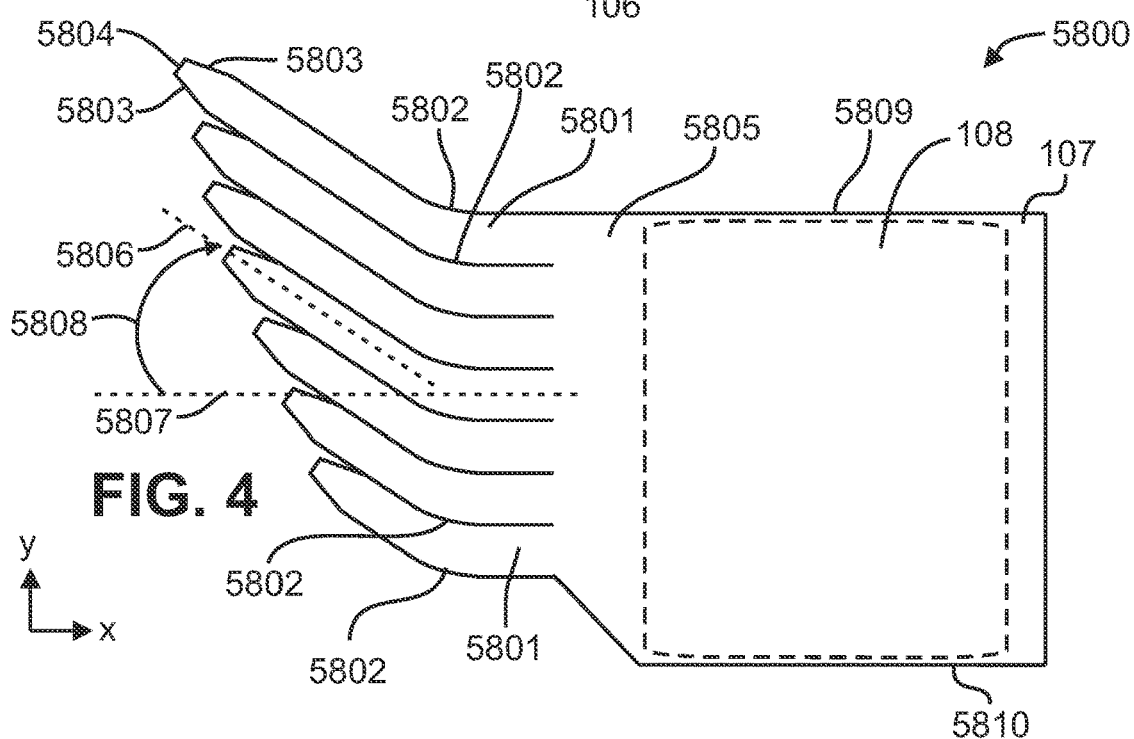
FIG. 4 is top view of one embodiment of a film-based lightguide including an array of oriented coupling lightguides with tapered light collimating lateral edges adjacent the input surface and light turning edges between the light input surface and the light mixing region of the film-based lightguide.

FIG. 4 is top view of one embodiment of a film-based lightguide 5800 including an array of oriented coupling lightguides 5801 oriented parallel to a first direction 5806 at a coupling lightguide orientation angle 5808 from the second direction 5807 perpendicular to the array direction (y-direction) of the array of coupling lightguides 5801 at the light mixing region 5805. The array of oriented coupling lightguides 5801 includes tapered light collimating lateral edges 5803 adjacent the light input surface 5804 and light turning lateral edges 5802 between the light input surface 5804 and the light mixing region 5805 of the film-based lightguide 107. In this embodiment, light from a light source (not shown) disposed to emit light into the light input surface 5804 when the array of oriented coupling lightguides 5801 are folded propagates with its optical axis parallel to the first direction 5806 of the array of oriented coupling lightguides 5801 and the optical axis is turned by the light turning lateral edges 5802 such that the optical axis is substantially parallel to the second direction 5807 perpendicular to the array direction (y-direction) of the array of oriented coupling lightguides 5801 at the light mixing region 5805. In this embodiment, when the oriented coupling lightguides 5801 are folded, the light source can be positioned between the planes (parallel to the z direction) including the lateral edges (5809, 5810) of the lightguide 107 such that a device or display including the light emitting device with the film-based lightguide 5800 does not require a large frame or a border region extending significantly past the lateral edges (5809, 5810) of the film-based lightguide in the y direction (as folded once or when the array of oriented coupling lightguides 5801 are folded and the light source, the array of oriented coupling lightguides 5801, and the light mixing region 5805 are folded behind the light emitting region 108 of the film based lightguide 107). The array of oriented coupling lightguides 5801 permit the light source to be positioned between the planes including the lateral edges (5809, 5810) of the film-based lightguide and the light turning lateral edges 5802 redirect the optical axis of the light toward the second direction 5807 perpendicular to the array direction (y-direction) of the array of oriented coupling lightguides 5801 at the light mixing region 5805 such that the optical axis of the light is oriented substantially parallel to the second direction 5807 when the light is extracted by light extraction features (not shown) with light redirecting surface oriented substantially parallel to the array direction (y direction) of the array of oriented coupling lightguides 5801.

Figure 5:
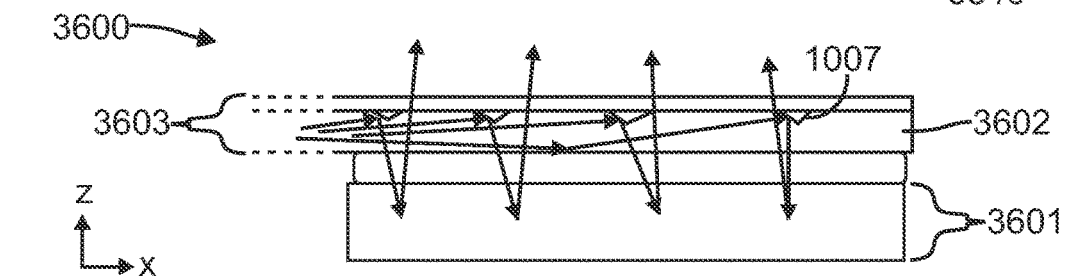
FIG. 5 is a cross-sectional side view of one embodiment of a spatial display including a frontlight.

FIG. 5 is a cross-sectional side view of one embodiment of a spatial display 3600 including a frontlight 3603 optically coupled to a reflective spatial light modulator 3601. The frontlight 3603 includes a film-based lightguide 3602 with the light extracting features 1007 that direct light to the reflective spatial light modulator 3601 at angles near the surface normal of the reflective spatial light modulator 3601. In one embodiment, the reflective spatial light modulator 3601 is an electrophoretic display, a microelectromechanical system (MEMS)-based display, or a reflective liquid crystal display. In one embodiment, the light extraction features 1007 direct one of 50%, 60%, 70%, 80%, and 90% of the light exiting the frontlight 3603 toward the reflective spatial light modulator 3601 within an angular range of 60 degrees to 120 degrees from the light emitting surface of the frontlight 3603.

Figure 6:
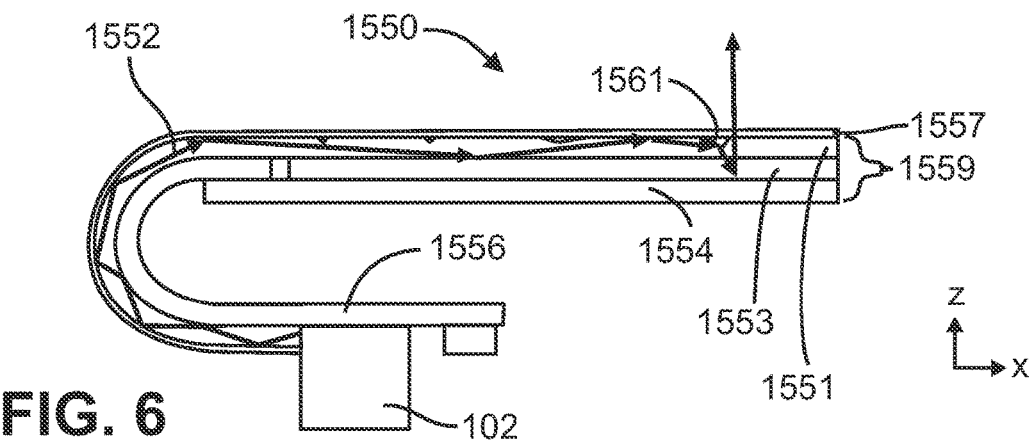
FIG. 6 is a cross-sectional side view of one embodiment of a light emitting display including a lightguide that further functions as a top substrate for a reflective spatial light modulator.

FIG. 6 is a cross-sectional side view of one embodiment a light emitting display 1550 with a film-based lightguide 1551 physically coupled to a flexible display connector 1556. In this embodiment, the reflective spatial light modulator 1559 includes a bottom substrate 1554 and the film-based lightguide 1551 is a top substrate. Light 1552 from the light source 102 physically coupled to the flexible display connector 1556 is directed into the film-based lightguide 1551 and is redirected by light extraction features 1561 to the active layer 1553 where the light 1552 reflects and passes back through the film-based lightguide 1551, and the upper cladding layer 1557, and exits the light emitting display 1550.

Figure 7:
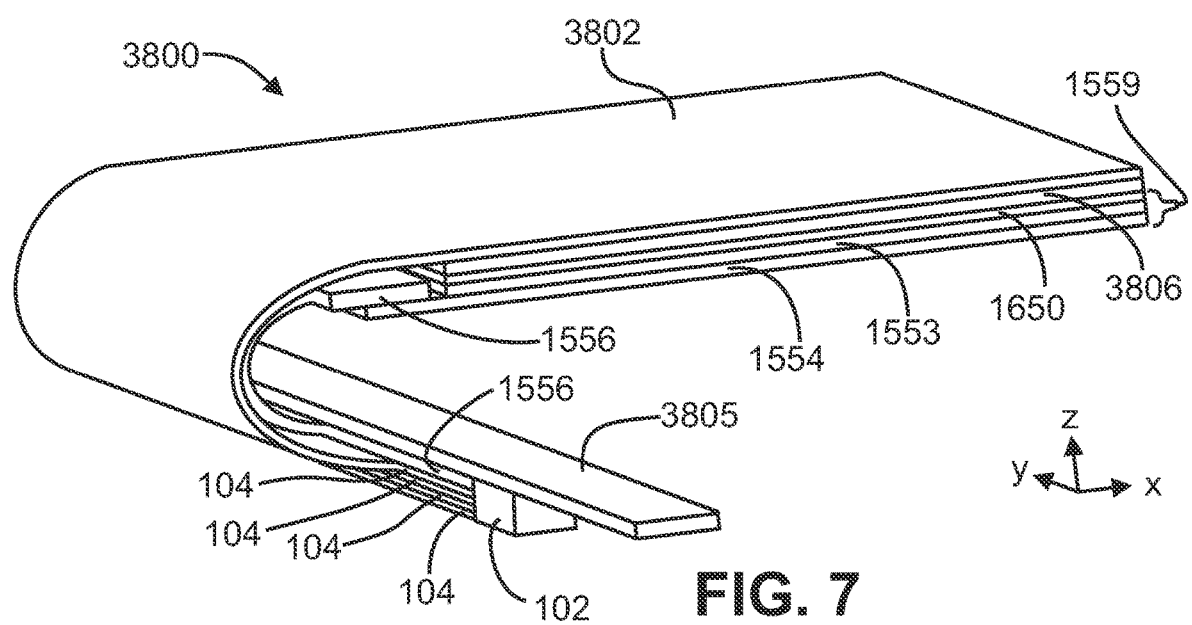
FIG. 7 is a perspective view of one embodiment of a light emitting device including a film-based lightguide that further functions as a top substrate for the reflective spatial light modulator with the light source disposed on a circuit board physically coupled to the flexible connector.

FIG. 7 is a perspective view of one embodiment of a light emitting device 3800 including a film-based lightguide 3802 physically coupled to a flexible display connector 1556 for the reflective spatial light modulator 1559 with a light source 102 disposed on a circuit board 3805 physically coupled to the flexible display connector 1556. In this embodiment, the reflective spatial light modulator 1559 includes an active layer 1553 positioned between a bottom substrate 1554 and a top substrate 1650. The top substrate 1650 of the reflective spatial light modulator 1559 is optically coupled to the film-based lightguide 3802 using an adhesive cladding layer 3806.

Figure 8:
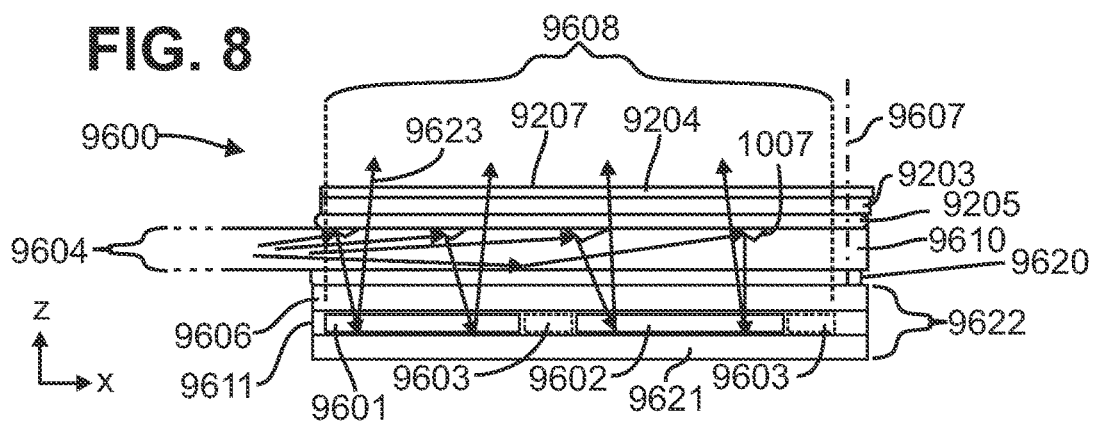
FIG. 8 is a cross-sectional side view of a portion of one embodiment of a spatial display illuminated by a frontlight including a film-based lightguide adhered and optically coupled to a color reflective display such that the light from the frontlight is directed toward the color filters of the color reflective display.

FIG. 8 is a cross-sectional side view of a portion of one embodiment of a spatial display 9600 illuminated by a frontlight 9604 including a film-based lightguide 9610. The film-based lightguide 9610 is optically coupled to a color reflective display 9622 including a color filter substrate 9606, a color filter layer 9611, and a reflective spatial light modulator 9621. In this embodiment, the film-based lightguide 9610 is adhered and optically coupled to the color reflective display 9622 using an adhesive 9620 (such as an optically clear pressure sensitive adhesive) to adhere the film-based lightguide 9610 to the color filter substrate 9606 in the active area 9608 of the color reflective display 9622. The color filter layer 9611 includes an array of first color filters 9601 and second color filters 9602 separated by inactive areas 9603 (areas without color filters) of the color filter layer 9611. Light 9623, after exiting the light source (not shown) and the folded, stack coupling lightguides (not shown), propagating through the frontlight 9604 exits the film-based lightguide 9610 by reflecting from the light extracting features 1007 on the surface of the film-based lightguide 9610 toward the color reflective display 9622 at angles near the surface normal 9607 of the color reflective display 9622. The light 9623 is directed toward the first color filters 9601 and second color filters 9602 due to the physical and optical properties (such as position and facet angle) of the light extraction features 1007. In one embodiment, the light 9623 does not pass through the inactive areas 9603 of the color filter layer 9611. In another embodiment, by aligning the light extraction features 1007 with the first color filters 9601 and the second color filters 9602 and directing the light 9623 through the first color filters 9601 and second color filters 9602 at an angle near the surface normal 9607 of the color reflective display 9622, light 9623 is not directed to the inactive areas 9603 of the color filter layer 9611 where it could be absorbed. In the embodiment illustrated in FIG. 8, a scratch resistant hardcoating 9204 on a hardcoating substrate 9203 protects the outer top surface 9207 of the spatial display 9600 and is optically coupled to the film-based lightguide 9610 using an adhesive 9205 (such as a silicone based pressure sensitive adhesive). In one embodiment, the adhesive 9205 between the hardcoating substrate 9203 and the film-based lightguide 9610, and the adhesive 9620 between the film-based lightguide 9610 and the color filter substrate 9606 also function as cladding layers for the film-based lightguide 9610 in the active area 9608 of the color reflective display 9622.

Figure 9:
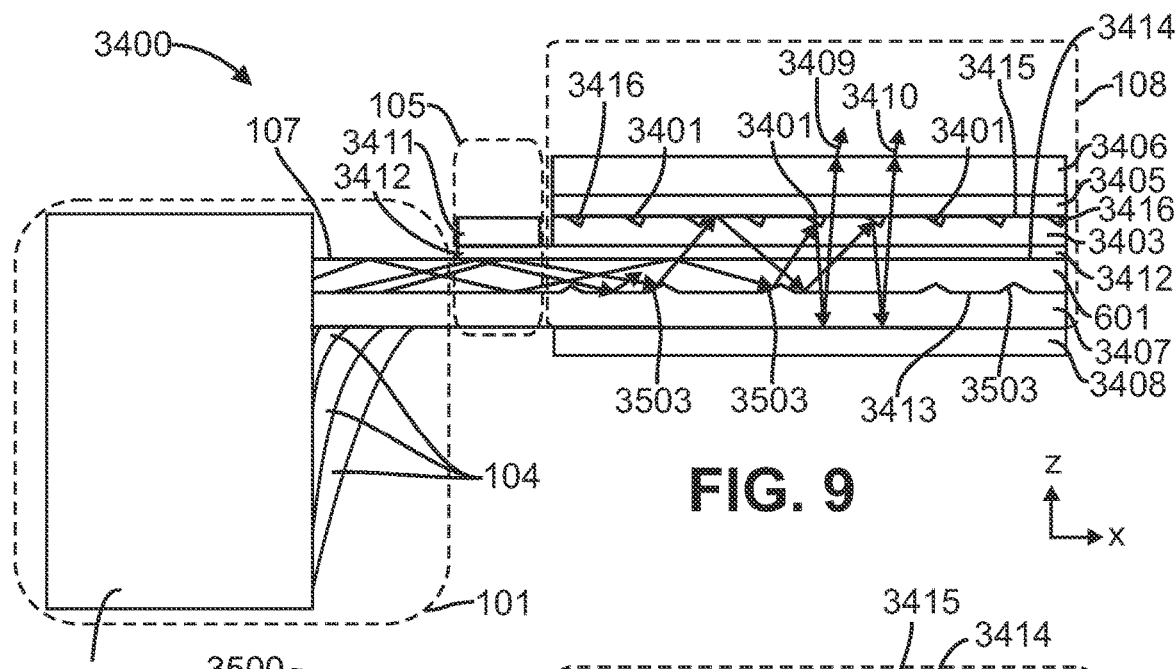
FIG. 9 is a cross-sectional side view of one embodiment of a light emitting device comprising low angle light directing features.

FIG. 9 is a cross-sectional side view of one embodiment of a light emitting device 3400 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3409 and second light 3410 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3409 and the second light 3410 preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within 30 degrees from the thickness direction (parallel to the z direction in this embodiment) of the film-based lightguide 107 (measured in air). The first light 3409 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3400 in the light emitting region 108.

After being redirected by the low angle directing feature 3503, the second light 3410 propagates from the core layer 601 into the second pressure sensitive adhesive layer 3412 and into the light turning film 3403. The second light 3410 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107 (measured in air). The second light 3410 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

Figure 10:
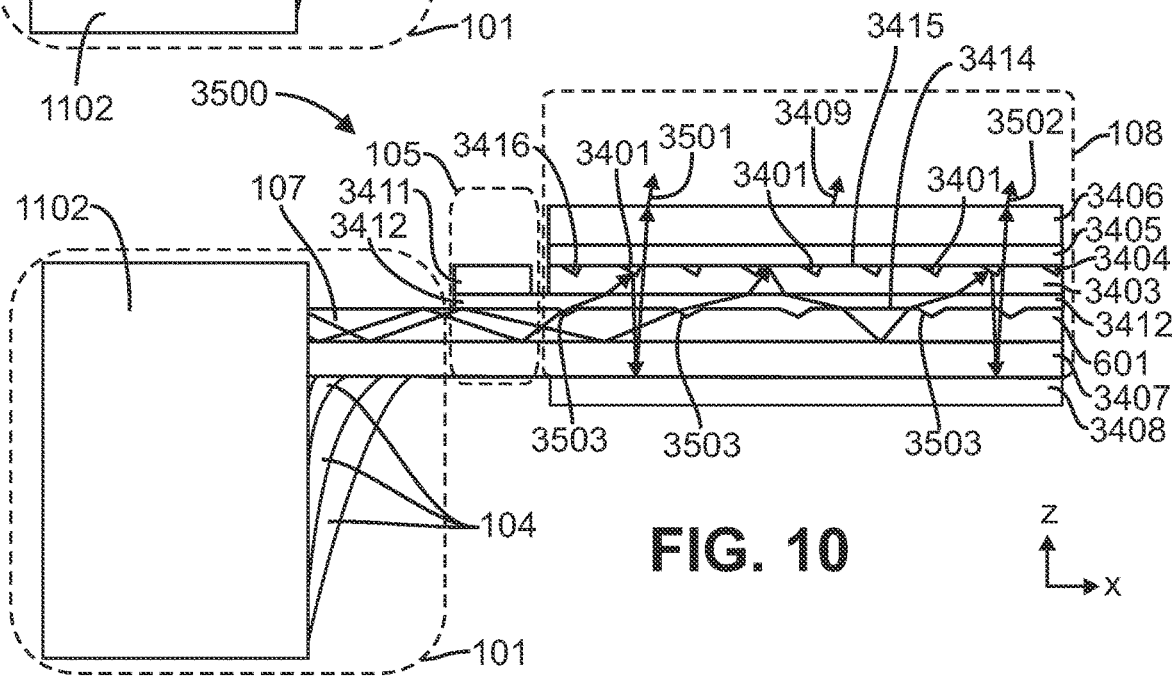
FIG. 10 is a cross-sectional side view of one embodiment of a light emitting device comprising light turning features.

FIG. 10 is a cross-sectional side view of one embodiment of a light emitting device 3500 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 which are refractive on the upper surface 3414 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting device 3500. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3501 and second light 3502 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3501 refracts to a new angle smaller than the incident angle by an average total angle of deviation of less than 20 degrees at a low angle directing feature 3503 that is refractive such that it propagates out of the core layer 601 of the lightguide. In this embodiment, a portion of the light from within the core layer 601 that intersects a low angle directing feature 3503 which is refractive may transmit through the low angle directing feature 3503 which is refractive, and a portion may reflect from the low angle directing feature 3503. In this embodiment, $n_{DL} > n_{D2} > n_{D1}$ such that a portion of the light that reflects from the low angle directing feature 3503 may reflect at a total angle of deviation of less than 20 degrees such that it reflects from the boundary between the core layer 601 and the first pressure sensitive adhesive layer 3407 and exits the core layer 601 at the upper surface 3414 of the core layer 601. After crossing the interface between the core layer 601 and the second pressure sensitive adhesive, the first light 3501 then propagates through the second pressure sensitive adhesive layer 3412 into the light turning film 3403 and totally internally reflects from a light turning feature 3401 in the light turning film 3403 to an angle within 30 degrees from the thickness direction (parallel to the z direction in this embodiment) of the film-based lightguide 107 (measured in air). The first light 3501 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3500 in the light emitting region 108.

After being redirected by the low angle directing feature 3503, the second light 3502 propagates through the second pressure sensitive adhesive layer 3412 and into the light turning film 3403. The second light 3502 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107 (measured in air). The second light 3502 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3500 in the light emitting region 108.

Figure 11:
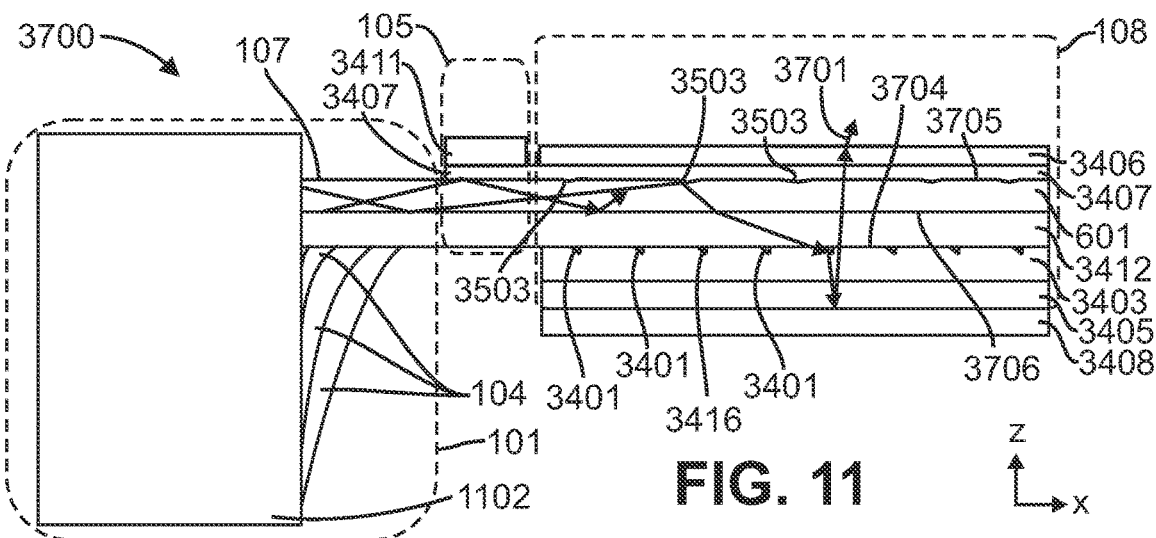
FIG. 11 is a cross-sectional side view of one embodiment of a light emitting device comprising light turning features and low angle directing features.

FIG. 11 is a cross-sectional side view of one embodiment of a light emitting device 3700 comprising the light input coupler 101, a film-based lightguide 107 comprising a core layer 601 of a core material with a core refractive index $n_{DL}$ optically coupled to a light turning film 3403 over a portion of the top surface 3704 of the light turning film 3403 (such that air gaps 3416 are formed at the light turning features 3401) using a second pressure sensitive adhesive layer 3412 comprising a second material with a second refractive index $n_{D2}$. The reflective spatial light modulator 3408 is optically coupled to the light turning film 3403 using a third pressure sensitive adhesive layer 3405. The light turning film 3403 comprises a plurality of light turning features 3401 on the top surface of the light turning film 3403 opposite the third pressure sensitive adhesive layer 3405. A light source 1102 with an optical axis parallel to the +y direction (into the page) is positioned to emit light into the folded stack of coupling lightguides 104. The film-based lightguide 107 comprises a plurality of low angle directing features 3503 on the top surface 3705 of the core layer 601 of the film-based lightguide 107 and is optically coupled to a cover layer 3406 (such as a protective PET film or touchscreen film, for example) using a first pressure sensitive adhesive layer 3407 comprising a first material with a first refractive index $n_{D1}$.

A light mixing region 105 is positioned between the light input coupler 101 and the light emitting region 108 of the light emitting device 3700. An opaque layer 3411 is optically coupled to the film-based lightguide 107 in the light mixing region 105 using the first pressure sensitive adhesive layer 3407. In this embodiment, the opaque layer 3411 is a light absorbing layer that absorbs at least 70% of the light within a wavelength range between 400 nanometers and 700 nanometers that reaches the opaque layer 3411 through the first pressure sensitive adhesive layer 3407. In this embodiment, first light 3701 from the light source 1102 propagates through the coupling lightguides 104 within the light input coupler 101, totally internally reflect within the core layer 601 of the film-based lightguide 107 and propagates through the light mixing region 105 and into the light emitting region 108 of the film-based lightguide 107. First light 3701 reflects from a low angle directing feature 3503 (which may be an embossed surface or light scattering region printed on the core layer 601, for example) to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3701 preferentially escapes a total internal reflection condition within the core layer 601 of the film-based lightguide 107 on the lower surface 3706 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3701 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3701 then propagates through the third pressure sensitive adhesive layer 3405 and reflects from the reflective spatial light modulator 3408, passes back through the aforementioned layers in the reverse order, does not interact a second time with a light turning feature 3401, and is emitted from the light emitting device 3700 in the light emitting region 108.

Figure 12:
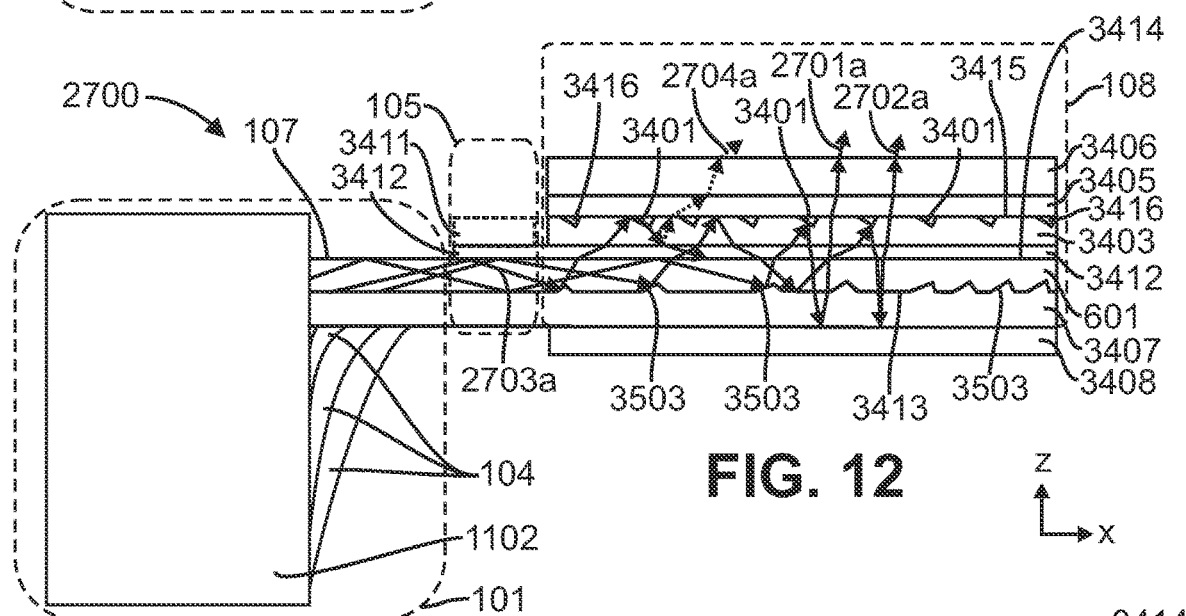
FIG. 12 is a cross-sectional side view of one embodiment of a light emitting display comprising film-based lightguide with a plurality of low angle directing features on the lower surface of the core layer of the film-based lightguide.

FIG. 12 is a cross-sectional side view of one embodiment of a light emitting display 2700 comprising the light input coupler 101, a film-based lightguide 107 comprising a core layer 601 with a core refractive index $n_{DL}$ optically coupled to a reflective spatial light modulator 3408 using a first pressure sensitive adhesive layer 3407 with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107. The low angle directing features 3503 may be, for example, linear (in the y-direction), faceted structures embossed into a polycarbonate film or light scattering regions or lines printed on the core layer 601, for example) and the low angle directing features 3503 may decrease in separation distance in the +x direction to extract more light out of the core layer 601 of the film-based lightguide 107 as the light propagates further across the reflective spatial light modulator 3408 in the +x direction to increase spatial luminance uniformity of the light reaching the reflective spatial light modulator and the resulting spatial luminance uniformity of the light emitting display 2700. The core layer 601 is optically coupled to a light turning film 3403 on the upper surface 3414 of the core layer 601 using a second pressure sensitive adhesive layer 3412 with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting display 2700. Optionally, an opaque layer 3411 may be optically coupled to the film-based lightguide 107 in the light mixing region 105 using the second pressure sensitive adhesive layer 3412. The opaque layer 3411 may be a light absorbing layer that absorbs at least 70% of the light within a wavelength range between 400 nanometers and 700 nanometers that reaches the opaque layer 3411 through the second pressure sensitive adhesive layer 3412. In this embodiment, the light turning film 3403 has a refractive index $n_{DT}$.

In this embodiment, first light 2701a, second light 2702a, and third light 2703a from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107 at, for example, the same angle of propagation within the core layer 601. First light 2701a reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL}>n_{D2}>n_{D1}$ such that the first light 2701a and the second light 2702a preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 2701a propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 2701a then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting display 2700 in the light emitting region 108.

After being redirected by the low angle directing feature 3503, the second light 2702a propagates from the core layer 601 into the second pressure sensitive adhesive layer 3412 and into the light turning film 3403. The second light 2702a does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107 (measured in air). The second light 2702a then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting display 2700 in the light emitting region 108.

In this embodiment third light 2703a propagates through the coupling lightguides 104 within the light input coupler 101, totally internally reflects within the core layer 601 of the film-based lightguide 107 and propagates through the light mixing region 105 and into the light emitting region 108 of the film-based lightguide 107. Third light 2703a reflects from a low angle directing feature 3503 to a second angle in the core layer 601 of the lightguide smaller than the incident angle by an average total angle of deviation of less than 20 degrees. In this embodiment, $n_{DT}>n_{D2}$, and third light 2703a totally internally reflects from the top surface 3415 of the light turning film 3403 between the light turning features 3401 and reflects from a light turning feature 3401 on the way back toward the core layer 601 at an angle in the light turning film 3403 that is larger from the direction normal to the light turning film surface than it would have been had it reflected from the light turning feature 3401 directly prior to reaching the top surface 3415 of the light turning film 3403. A portion 2704a of the third light 2703a reflects from the interface between the light turning film 3403 and the second pressure sensitive adhesive layer 3412 which propagates out of the light emitting display 2700 and reduces the contrast of the light emitting display 2700 since it has not been modulated by the reflective spatial light modulator and will increase the luminance of the dark pixels.

For example, in this embodiment, the first pressure sensitive adhesive layer 3407 may be a silicone-based pressure sensitive adhesive with a first refractive index of $n_{D1}=1.47$, the second pressure sensitive adhesive layer 3412 may be an acrylate based adhesive with a second refractive index, $n_{D2}=1.49$, the core layer 601 may be a polycarbonate film with a refractive index $n_{DL}=1.58$, and the light turning film 3403 may be a polycarbonate film with a refractive index $n_{DT}=1.58$. In this example, the interfaces between the PC films (the light turning film 3403 and the core layer 601) and the second pressure sensitive adhesive layer 3412 have a high reflectance due to the high difference in refractive index (difference in refractive indexes is 0.09) such that the display contrast is reduced.

Figure 13:
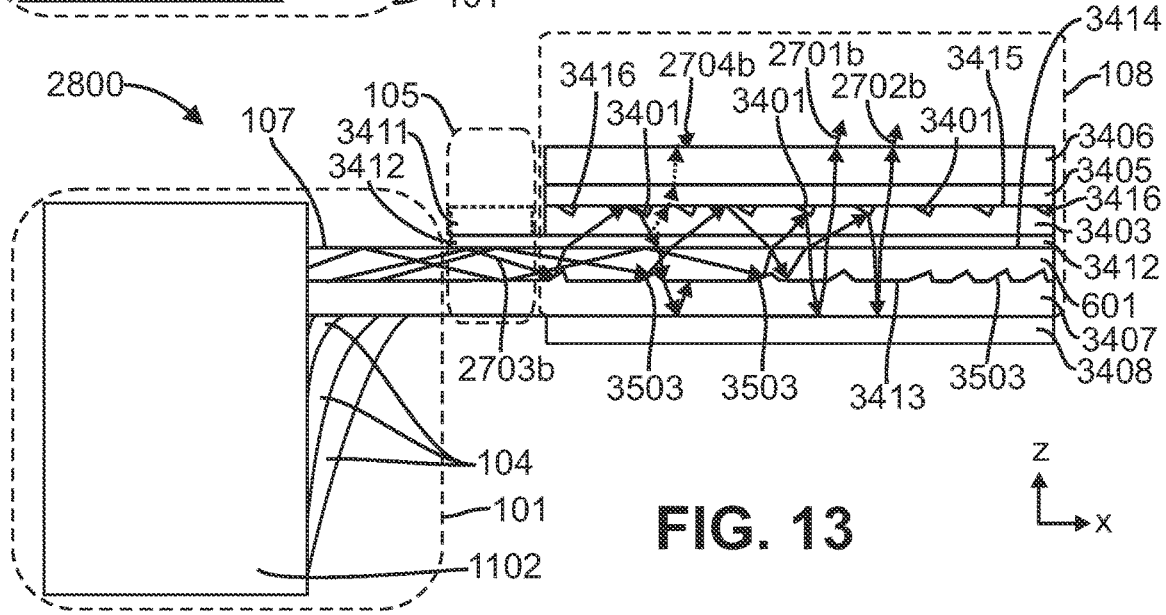
FIG. 13 is a cross-sectional side view of one embodiment of a light emitting display comprising a light turning film with a plurality of light turning features on the top surface of the light turning film opposite a second pressure sensitive adhesive layer.

FIG. 13 is a cross-sectional side view of one embodiment of a light emitting display 2800 comprising the light input coupler 101, a film-based lightguide 107 comprising a core layer 601 with a core refractive index $n_{DL}$ optically coupled to a reflective spatial light modulator 3408 using a first pressure sensitive adhesive layer 3407 with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107. The low angle directing features 3503 may be, for example, linear (in the y-direction), faceted structures embossed into a polycarbonate film or light scattering regions or lines printed on the core layer) and the low angle directing features 3503 may decrease in separation distance in the +x direction to extract more light out of the core layer 601 of the film-based lightguide 107 as the light propagates further across the reflective spatial light modulator 3408 in the +x direction to increase spatial luminance uniformity of the light reaching the reflective spatial light modulator and the resulting spatial luminance uniformity of the light emitting display 2800. The core layer 601 is optically coupled to a light turning film 3403 on the upper surface 3414 of the core layer 601 using a second pressure sensitive adhesive layer 3412 with a second refractive index $n_{D2}$. The light turning film 3403 comprises a plurality of light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the light turning features 3401. A light mixing region 105 is positioned between the light input coupler 101 and the light emitting region 108 of the light emitting display 2800. Optionally, an opaque layer 3411 may be optically coupled to the film-based lightguide 107 in the light mixing region 105 using the second pressure sensitive adhesive layer 3412. The opaque layer 3411 may be a light absorbing layer that absorbs at least 70% of the light within a wavelength range between 400 nanometers and 700 nanometers that reaches the opaque layer 3411 through the second pressure sensitive adhesive layer 3412. In this embodiment, the light turning film 3403 has a refractive index $n_{DT}$.

In this embodiment, first light 2701b, second light 2702b, and third light 2703b from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107 at, for example, the same angle of propagation within the core layer 601. First light 2701b reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL}>n_{D2}>n_{D1}$ such that the first light 2701b and the second light 2702b preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 2701b propagates into the light turning film 3403 and directly reflects (totally internally reflects directly prior to reaching the top surface 3415 of the light turning film 3403) from a light turning feature 3401 in the light turning film 3403 to an angle within 30 degrees from the thickness direction (parallel to the z direction in this embodiment) of the film-based lightguide 107 (measured in air). The first light 2701b then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting display 2700 in the light emitting region 108.

After being redirected by the low angle directing feature 3503, the second light 2702b propagates from the core layer 601 into the second pressure sensitive adhesive layer 3412 and into the light turning film 3403. The second light 2702b does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107 (measured in air). The second light 2702b then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting display 2800 in the light emitting region 108.

In this embodiment third light 2703b propagates through the coupling lightguides 104 within the light input coupler 101, totally internally reflect within the core layer 601 of the film-based lightguide 107 and propagate through the light mixing region 105 and into the light emitting region 108 of the film-based lightguide 107. Third light 2703b reflects from a low angle directing feature 3503 to a second angle in the core layer 601 smaller than the incident angle by an average total angle of deviation of less than 20 degrees. In this embodiment, $|n_{DT}-n_{D2}|<0.03$ and $n_{DL}-n_{DT}>0.03$, and third light 2703b totally internally reflects from the top surface 3415 of the light turning film 3403 between the light turning features 3401 and then reflects from a light turning feature 3401 on the way back toward the core layer 601 (indirect reflection) to an angle in the light turning film 3403 that is closer to the directly reflected angle of 2701b (a direct reflection from the light turning feature 3401) than that of the embodiment of FIG. 12 since the refractive index of the light turning film 3403 is lower than the refractive index of the light turning film 3403 in the embodiment of FIG. 12 (and $n_{DL}-n_{DT}>0.03$). The angle of propagation of the third light 2703b in the light turning film 3403 is at a larger angle from the normal to the top surface 3415 of the light turning film 3403 than in the embodiment of FIG. 12 such that the difference between the angles of reflection from the direct reflection light (2701b) and the indirect reflection light (2703b) from the light turning feature 3403 is less than the embodiment of FIG. 12 and therefore, the angular spread of the light (including 2701b, 2702b, and 2703b) illuminating the display (and ultimately outputting from the light emitting display 2800) is lower and with a reduced or eliminated second angular lobe due to the indirect reflection compared to the embodiment of FIG. 12. After reflection from the light turning feature 3401, third light 2703b propagates through the layers to the reflective spatial light modulator 3408 where it reflects and passes through the layers out of the light emitting display 2800 (not shown for clarity).

A portion 2704b of the third light 2703b reflects from the interface between the light turning film 3403 and the second pressure sensitive adhesive layer 3412 which propagates out of the light emitting display 2800. This portion 2704b is a smaller reflected percentage than the reflected percentage of the portion 2704a from the embodiment of FIG. 12 since the refractive index, $n_{DT}$, of the light turning film 3403 is closer to the refractive index, $n_{D2}$, of the second pressure sensitive adhesive layer 3412. Thus, the contrast of the light emitting display 2800 is increased relative to the light emitting display 2700 since the portion 2704b is a smaller percentage of incident light than 2704a and less light that has not been modulated by the reflective spatial light modulator will be emitted from the light emitting display 2800.

For example, in this embodiment, the first pressure sensitive adhesive layer 3407 may be a silicone-based pressure sensitive adhesive with a first refractive index of $n_{D1}$=1.47, the second pressure sensitive adhesive layer 3412 may be an acrylate based pressure-sensitive adhesive with a second refractive index, $n_{D2}$=1.491, the core layer 601 may be a polycarbonate film with a refractive index $n_{DL}$=1.58, and the light turning film 3403 may be an acrylic film with a refractive index $n_{DT}$=1.490. In this example, the interface between the light turning film 3403 (acrylic film in this embodiment) and the second pressure sensitive adhesive layer 3412 (an acrylic based pressure sensitive adhesive in this embodiment) has a low reflectance due to the low difference in refractive index (difference in refractive indexes is 0.001) such that the display contrast is increased relative to the embodiment of FIG. 12.

Figure 14:
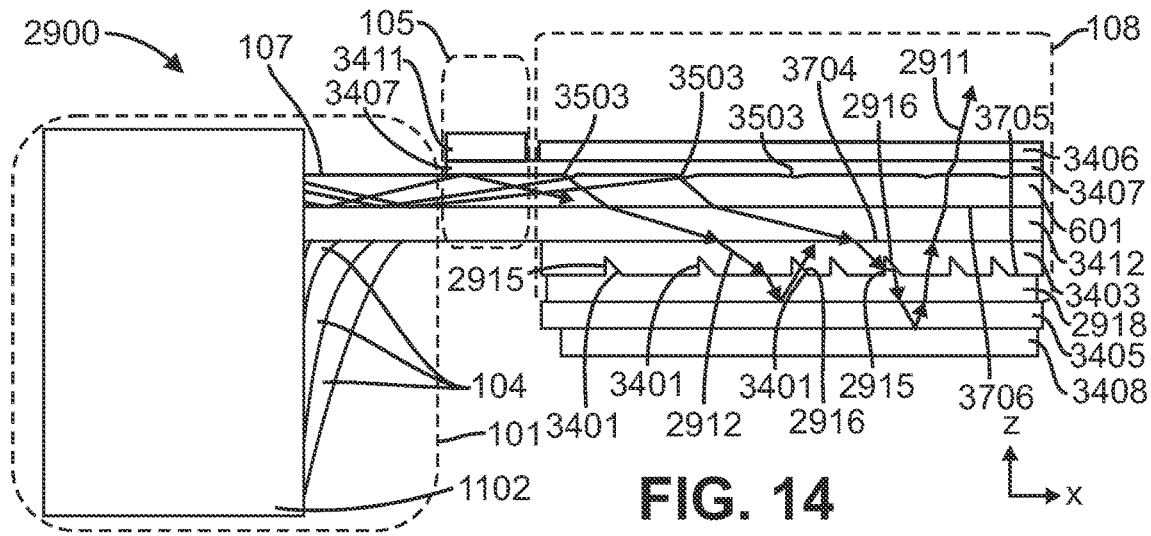
FIG. 14 is a cross-sectional side view of one embodiment of a light emitting display comprising a light turning film with light turning features on the bottom surface of the light turning film.

FIG. 14 is a cross-sectional side view of one embodiment of a light emitting display 2900 comprising the light input coupler 101, a film-based lightguide 107 comprising a core layer 601 with a core refractive index $n_{DL}$ optically coupled to a light turning film 3403 on the lower surface 3706 of the core layer 601 using a second pressure sensitive adhesive layer 3412 with a second refractive index $n_{D2}$. The light turning film 3403 comprises light turning features 3401 on the bottom surface 3708 of the light turning film 3403. A high refractive index conformal coating 2918 is coated onto the bottom surface of the light turning film 3403 such that the high refractive index conformal coating 2918 is conformal with the bottom surface 3708 of the light turning film 3403 and conformal with the surfaces of the light turning features 3401. The reflective spatial light modulator 3408 is optically coupled to the high refractive index conformal coating 2918 using a third pressure sensitive adhesive layer 3405. A light source 1102 with an optical axis parallel to the +y direction (into the page) is positioned to emit light into the folded stack of coupling lightguides 104. The film-based lightguide 107 comprises a plurality of low angle directing features 3503 on the top surface 3705 of the core layer 601 of the film-based lightguide 107 and is optically coupled to a cover layer 3406 (such as a protective PET film or touchscreen film, for example) using a first pressure sensitive adhesive layer 3407 with a first refractive index $n_{D1}$.

A light mixing region 105 is positioned between the light input coupler 101 and the light emitting region 108 of the light emitting device 3700. Optionally, an opaque layer 3411 is optically coupled to the film-based lightguide 107 in the light mixing region 105 using the first pressure sensitive adhesive layer 3407. In this optional configuration, the opaque layer 3411 is a light absorbing layer that absorbs at least 70% of the light within a wavelength range between 400 nanometers and 700 nanometers that reaches the opaque layer 3411 through the first pressure sensitive adhesive layer 3407. In the embodiment shown in FIG. 29, first light 2911 from the light source 1102 propagates through the coupling lightguides 104 within the light input coupler 101, totally internally reflects within the core layer 601 of the film-based lightguide 107 and propagates through the light mixing region 105 and into the light emitting region 108 of the film-based lightguide 107. First light 2911 reflects from a low angle directing feature 3503 (which may be an embossed surface or light scattering region printed on the core layer 601, for example) to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL}>n_{D2}>n_{D1}$ such that the first light 2911 and second light 2912 preferentially escapes a total internal reflection condition within the core layer 601 of the film-based lightguide 107 on the lower surface 3706 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 2911 propagates into the light turning film 3403, refracts into the high refractive index conformal coating 2918 at a first surface 2915 of the light turning feature 3401, and totally internally reflects from a second surface 2916 of the light turning feature 3401 to an angle within 30 degrees from the thickness direction (parallel to the z direction in this embodiment) of the film-based lightguide 107 (measured in air). The first light 2911 then propagates through the third pressure sensitive adhesive layer 3405 and reflects from the reflective spatial light modulator 3408, passes back through the aforementioned layers in the reverse order, does not interact a second time with a light turning feature 3401, and is emitted from the light emitting display 2900 in the light emitting region 108. After transmitting from the core layer 601 into the second pressure sensitive adhesive layer 3412, the second light 2912 propagates into the light turning film 3403, refracts into the high refractive index conformal coating 2918 outside of a light turning feature 3401, and totally internally reflects from the interface between the high refractive index conformal coating 2918 and the third pressure sensitive adhesive layer 3405. The second light 2912 then propagates through the high refractive index conformal coating 2918 and passes through the second surface 2916 of the light turning feature 3401 and is substantially un-deviated by refraction (or refracted such that the angle of propagation rotates by less than 10 degrees) into the light turning film 3403. Thus, in this embodiment, the second light 2912 and light parallel to the second light 2912 that totally internally reflects from the interface between the high refractive index conformal coating 2918 and the third pressure sensitive adhesive layer 3405 but misses the light turning feature 3401 may still totally internally reflect from the interface between the core layer 601 and the first pressure sensitive adhesive layer 3407 such that it isn't emitted directly from the light emitting display 2900 and doesn't reduce the contrast of the light emitting display 2900.

For example, in this embodiment, the first pressure sensitive adhesive layer 3407 may be a silicone-based pressure sensitive adhesive with a first refractive index of $n_{D1}$=1.47, the second pressure sensitive adhesive layer 3412 may be an acrylate based adhesive with a second refractive index, $n_{D2}$=1.49, the core layer 601 may be a polycarbonate film with a refractive index $n_{DL}$=1.58, the light turning film 3403 may be a polycarbonate film with a refractive index $n_{DT}$=1.58, and the high refractive index conformal coating may have a refractive index of $n_{DC}$=1.7.

Figure 15:
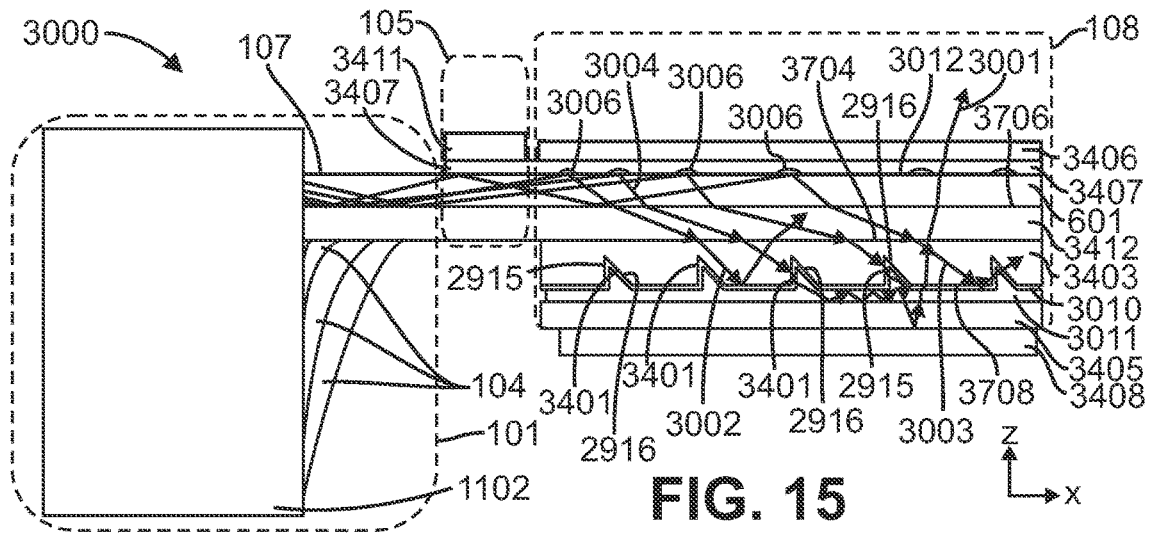
FIG. 15 is a cross-sectional side view of one embodiment of a light emitting display comprising a low refractive index conformal coating coated onto the bottom surface of the light turning film.

FIG. 15 is a cross-sectional side view of one embodiment of a light emitting display 3000 comprising the light input coupler 101, a film-based lightguide 107 comprising a core layer 601 with a core refractive index $n_{DL}$ optically coupled to a light turning film 3403 on the lower surface 3706 of the core layer 601 using a second pressure sensitive adhesive layer 3412 with a second refractive index $n_{D2}$. The light turning film 3403 comprises light turning features 3401 on the bottom surface 3708 of the light turning film 3403. A low refractive index conformal coating 3010 with a refractive index $n_{DC1}$ is coated onto the bottom surface of the light turning film 3403 such that the low refractive index conformal coating 3010 is conformal with the bottom surface 3708 of the light turning film 3403 and conformal with the first surface 2915 and the second surface 2916 (which is angled relative to the first surface 2915) of the light turning features 3401. A second conformal coating 3011 with a refractive index $n_{DC2}$ (where, for example, $|n_{DC1}-n_{DC2}|$ may be less than 0.01) is positioned between the low refractive index conformal coating 3010 and the third pressure sensitive adhesive layer 3405 with a refractive index $n_{D3}$. The reflective spatial light modulator 3408 is optically coupled to the second conformal coating 3011 using the third pressure sensitive adhesive layer 3405. A light source 1102 with an optical axis parallel to the +y direction (into the page) is positioned to emit light into the folded stack of coupling lightguides 104. The film-based lightguide 107 comprises a plurality of low angle directing features 3006 in the form of printed light scattering lines or regions on the top surface 3012 of the core layer 601 of the film-based lightguide 107 and is optically coupled to a cover layer 3406 (such as a protective PET film or touchscreen film, for example) using a first pressure sensitive adhesive layer 3407 with a first refractive index $n_{D1}$.

A light mixing region 105 is positioned between the light input coupler 101 and the light emitting region 108 of the light emitting device 3700. Optionally, an opaque layer 3411 is optically coupled to the film-based lightguide 107 in the light mixing region 105 using the first pressure sensitive adhesive layer 3407. In this optional configuration, the opaque layer 3411 is a light absorbing layer that absorbs at least 70% of the light within a wavelength range between 400 nanometers and 700 nanometers that reaches the opaque layer 3411 through the first pressure sensitive adhesive layer 3407. In the embodiment shown in FIG. 30, first light 3001 from the light source 1102 propagates through the coupling lightguides 104 within the light input coupler 101, totally internally reflects within the core layer 601 of the film-based lightguide 107 and propagates through the light mixing region 105 and into the light emitting region 108 of the film-based lightguide 107. First light 3001 reflects (such as reflectively scatters) from a low angle directing feature 3006 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL}>n_{D2}>n_{D1}$ such that the first light 3001 and second light 3002 preferentially escapes a total internal reflection condition within the core layer 601 of the film-based lightguide 107 on the lower surface 3706 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3001 propagates into the light turning film 3403, refracts into the low refractive index conformal coating 3010 at a first surface 2915 of the light turning feature 3401, passes through the low refractive index conformal coating 3010, refracts into the second conformal coating 3011, totally internally reflects from the interface between the second conformal coating 3011 and the low refractive index conformal coating 3010 to an angle within 30 degrees from the thickness direction (parallel to the z direction in this embodiment) of the film-based lightguide 107 (measured in air). The first light 3001 then propagates through the third pressure sensitive adhesive layer 3405 and reflects from the reflective spatial light modulator 3408, passes back through the aforementioned layers in the reverse order as shown in FIG. 30, does not interact a second time with a light turning feature 3401, and is emitted from the light emitting display 3000 in the light emitting region 108. After transmitting from the core layer 601 into the second pressure sensitive adhesive layer 3412, the second light 3002 propagates into the light turning film 3403, totally internally reflects at the low refractive index conformal coating and passes back through second pressure sensitive adhesive layer 3412, into the core layer 601 and reflects from the top surface 3012 of the core layer. After transmitting from the core layer 601 into the second pressure sensitive adhesive layer 3412, the third light 3003 propagates into the light turning film 3403, totally internally reflects at the low refractive index conformal coating 3010 and passes into the low refractive index conformal coating 3010 at the light turning feature 3401, passes through a portion of the second conformal coating 3011, passes through the low refractive index conformal coating 3010, passes through the light turning film 3403, passes back through second pressure sensitive adhesive layer 3412, into the core layer 601 and reflects from the top surface 3012 of the core layer.

Fourth light 3004 preferentially escapes a total internal reflection condition within the core layer 601 of the film-based lightguide 107 on the lower surface 3706 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the fourth light 3004 propagates into the light turning film 3403, refracts into the low refractive index conformal coating 3010 at a first surface 2915 of the light turning feature 3401, refracts into the second conformal coating 3011, totally internally reflects at the interface between the second conformal coating 3011 and the third pressure sensitive adhesive layer 3405, and continues to totally internally reflect within the second conformal coating 3011 in a lightguide condition until reaching a different light turning feature 3401 where it may be coupled back into the light turning film as the third light 3003 propagated.

In the embodiment shown in FIG. 30, the second light 3002, third light 3003, and fourth light 3004 remain in a waveguide condition within the light emitting display 3000 until totally internally reflecting from the low refractive index conformal coating 3010 adjacent the second surface 2916 of a light turning feature 3401 toward the reflective spatial light modulator 3408.

For example, in the embodiment shown in FIG. 30, the first pressure sensitive adhesive layer 3407 may be a silicone-based pressure sensitive adhesive with a first refractive index of $n_{D1}$=1.47, the second pressure sensitive adhesive layer 3412 may be an acrylate based adhesive with a second refractive index, $n_{D2}$=1.49, the core layer 601 may be a polycarbonate film with a refractive index $n_{DL}$=1.58, the light turning film 3403 may be an acrylic film with a refractive index $n_{DT}$=1.52, the low refractive index conformal coating 3010 may have a refractive index of $n_{DC1}$=1.38, the second conformal coating 3011 may be an acrylic coating with a refractive index of $n_{DC2}$=1.52, and the third pressure sensitive adhesive may be a silicone-based pressure sensitive adhesive with a refractive index of $n_{D3}$=1.47.

Figure 16:
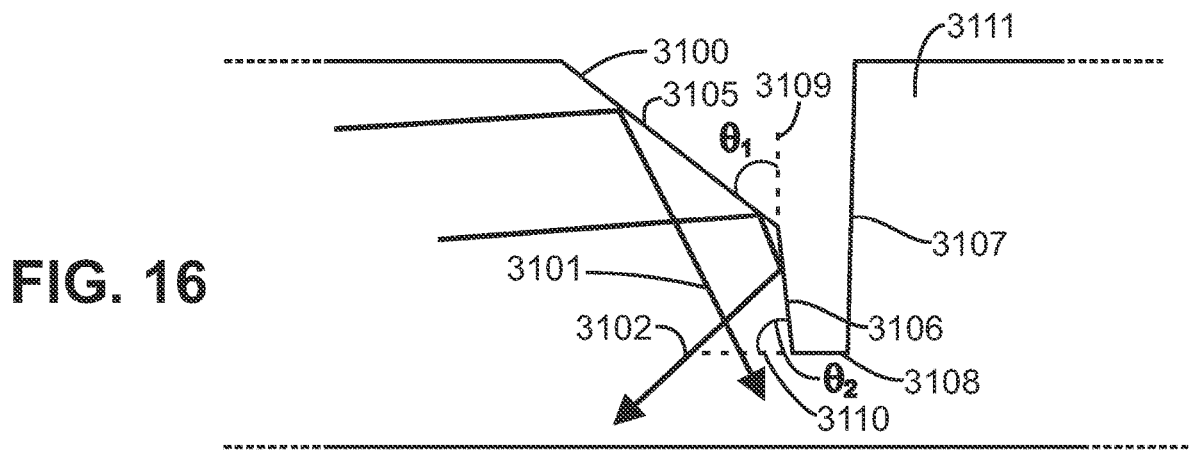
FIG. 16 is a cross-sectional side view of one embodiment of a multi-faceted light turning feature.

FIG. 16 is a cross-sectional side view of one embodiment of a multi-faceted light turning feature 3100 comprising a first light receiving surface 3105 and a second light receiving surface 3106. The first light receiving surface 3105 has a first orientation angle $\Theta_1$ from the thickness direction 3109 of the light turning film 3111 (which may also be the normal to the opposite surface of the light turning film 3111) and the second light receiving surface 3106 has a second orientation angle $\Theta_2$ from a direction 3110 orthogonal to the thickness direction 3109 of the light turning film 3111. In one embodiment, the first orientation angle $\Theta_1$ is within an angular range selected from the group of 40 to 50 degrees, 35 to 55 degrees, 30 to 60 degrees, and 25 to 65 degrees. In one embodiment, the second orientation angle $\Theta_2$ is within an angular range selected from the group of 85 and 90 degrees, 80 and 90 degrees, 70 and 90 degrees, and 60 and 90 degrees. The multi-faceted light turning feature 3100 may have other angular facets or surfaces such as a rear surface 3107 and a tip region or surface 3108. In this embodiment, first light 3101 and second light 3102 propagating within the light turning film 3111 is incident on the light turning feature 3100. In this embodiment, first light 3101 totally internally reflects from the first light receiving surface 3105 downward (such as in a direction toward a reflective spatial light modulator (not shown)) and second light 3102 totally internally reflects off of the first light receiving surface 3105 and then totally internally reflects off of the second light receiving surface 3106 downward in a direction different than the first light 3101. Thus, in this embodiment, the light directed downward may have two angular peaks of light intensity. Also, in this embodiment, the second light 3102 is reflected to an angle on the opposite side of the thickness direction 3109 of the light turning film 3111 than the first light 3101. If the first light receiving surface 3105 and the second light receiving surface 3106 are oriented at angles closer to each other but not at the same orientation angle, the luminous intensity peaks may begin to merge such that the angular light intensity of output from the light turning film 3111 (or the light emitting display comprising the light turning film 3111) has only one peak and the angular full-width at half maximum intensity of the output from the light turning film 3111 (and optionally the light emitting display or device) is increased relative to a light turning feature with a single light receiving facet. In on embodiment, the first light receiving surface 3105 and/or the second light receiving surface 3106 may be arcuate or comprise an arc, and in these embodiments, the respective orientation angles are an average angle across the curve or section comprising the arc for the purposes disclosed herein. FIG. 31 only shows a portion of the light turning film 3111 which would contain many faceted, curved, and/or multi-faceted light turning features 3100. The light turning feature 3100 may be used in other embodiments disclosed herein to provide increased control of the light reflected from the light turning feature 3100.

Figure 17:
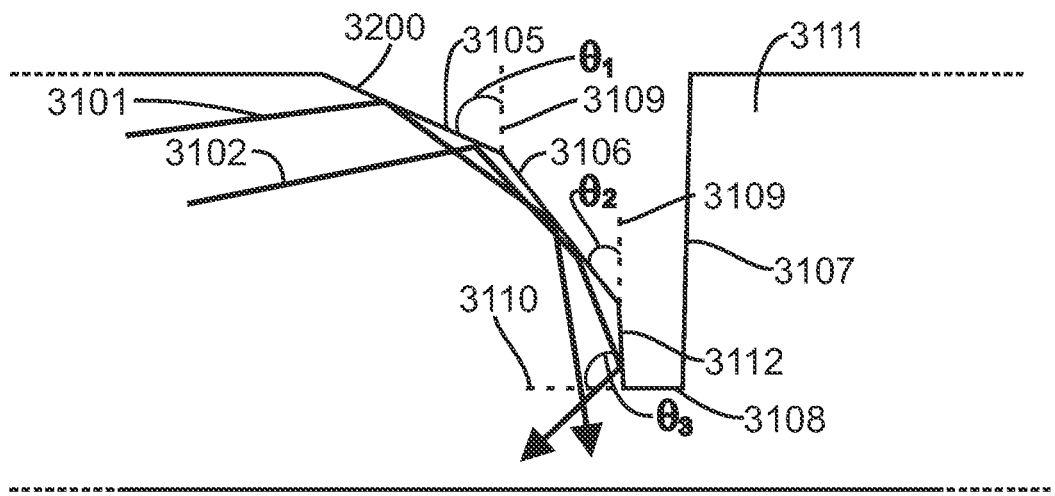
FIG. 17 is a cross-sectional side view of one embodiment of a multi-faceted light turning feature comprising three light receiving surfaces.

FIG. 17 a cross-sectional side view of one embodiment of a multi-faceted light turning feature 3200 comprising a first light receiving surface 3105, a second light receiving surface 3106, and a third light receiving surface 3112. The first light receiving surface 3105 has a first orientation angle $\Theta_1$ from the thickness direction 3109 of the light turning film 3111 (which may also be the normal to the opposite surface of the light turning film 3111); the second light receiving surface 3106 has a second orientation angle $\Theta_2$ from the thickness direction 3109 of the light turning film 3111 (which may also be the normal to the opposite surface of the light turning film 3111); and the third light receiving surface 3112 has a third orientation angle $\Theta_3$ from a direction 3110 orthogonal to the thickness direction 3109 of the light turning film 3111. In one embodiment, the first orientation angle $\Theta_1$ is within an angular range selected from the group of 40 to 50 degrees, 35 to 55 degrees, 30 to 60 degrees, 25 to 65 degrees, and 45 to 75 degrees. In one embodiment, the second orientation angle $\Theta_2$ is within an angular range selected from the group of 40 to 50 degrees, 35 to 55 degrees, 30 to 60 degrees, 25 to 65 degrees, 10 and 40 degrees and 10 and 30 degrees. In one embodiment, the third orientation angle $\Theta_3$ is within an angular range selected from the group of 85 and 90 degrees, 80 and 90 degrees, 70 and 90 degrees, and 60 and 90 degrees. The multi-faceted light turning feature 3200 may have other angular facets or surfaces such as a rear surface 3107 and a tip region or surface 3108. In this embodiment, first light 3101 and second light 3102 propagating within the light turning film 3111 is incident on the light turning feature 3100. In this embodiment, first light 3101 totally internally reflects from the first light receiving surface 3105 and then totally internally reflects from the second light receiving surface 3106 downward (such as in a direction toward a reflective spatial light modulator (not shown)) and second light 3102 totally internally reflects off of the first light receiving surface 3105, then totally internally reflects off of the second light receiving surface 3106, and then totally internally reflects off of the third light receiving surface 3112 downward in a direction different than the first light 3101. Thus, in this embodiment, the light directed downward may have two angular peaks of light intensity. Also, in this embodiment, the second light 3102 is reflected to an angle on the opposite side of the thickness direction 3109 of the light turning film 3111 than the first light 3101. In one embodiment, the first light receiving surface 3105, the second light receiving surface 3106, and the third light receiving surface are oriented at angles such that the luminous intensity peaks from light represented by first light 3101 and second light 3102 may begin to merge such that the angular light intensity of output from the light turning film 3111 (or the light emitting display comprising the light turning film 3111) has only one peak and the angular full-width at half maximum intensity of the output from the light turning film 3111 (and optionally the light emitting display or device) is increased relative to a light turning feature with a single light receiving facet. In on embodiment, the first light receiving surface 3105, the second light receiving surface 3106, and/or the third light receiving surface 3112 may be arcuate or comprise an arc, and in these embodiments, the respective orientation angles are an average angle across the curve or section comprising the arc for the purposes disclosed herein. FIG. 32 only shows a portion of the light turning film 3111 which would contain many faceted, curved, and/or multi-faceted light turning features 3200. The light turning feature 3200 may be used in other embodiments disclosed herein to provide increased control of the light reflected from the light turning feature 3100.

Figure 18:
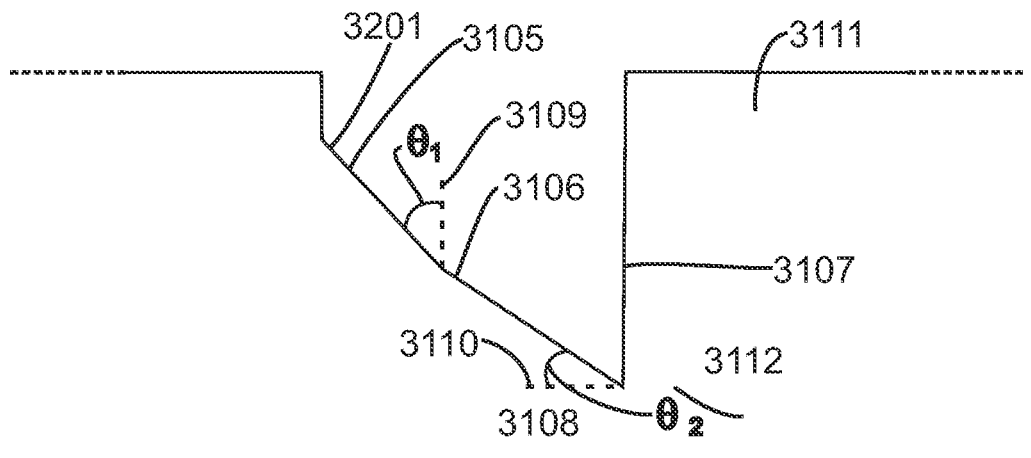
FIG. 18 is a cross-sectional side view of one embodiment of a multi-faceted light turning feature comprising a first light receiving surface and a second light receiving surface.

FIG. 18 is a cross-sectional side view of one embodiment of a multi-faceted light turning feature 3201 comprising a first light receiving surface 3105 and a second light receiving surface 3106. The first light receiving surface 3105 has a first orientation angle $\Theta_1$ from the thickness direction 3109 of the light turning film 3111 (which may also be the normal to the opposite surface of the light turning film 3111) and the second light receiving surface 3106 has a second orientation angle $\Theta_2$ from a direction 3110 orthogonal to the thickness direction 3109 of the light turning film 3111. In one embodiment, the first orientation angle $\Theta_1$ is within an angular range selected from the group of 40 to 50 degrees, 35 to 55 degrees, 30 to 60 degrees, and 25 to 65 degrees. In one embodiment, the second orientation angle $\Theta_2$ is within an angular range selected from the group of 85 and 90 degrees, 80 and 90 degrees, 70 and 90 degrees, and 60 and 90 degrees. The multi-faceted light turning feature 3100 may have other angular facets or surfaces such as a rear surface 3107 and a vertical surface.

In one embodiment, a light emitting device (such as a frontlight for a reflective display, for example) comprises a film-based lightguide with the surfaces of the film defining a first lightguide, the first lightguide is optically coupled to a light redirecting optical element or other film and one or more surfaces of the light redirecting optical element or other film in combination with a surface of the first lightguide define a second lightguide, wherein the second lightguide may comprise the first lightguide. In one embodiment, a reflective display comprises a lightguide wherein an effective thickness of the lightguide bounded by total internal reflection interfaces is increased for totally internally reflected light within the core layer that is frustrated by the plurality of light extraction features such that it passes through the first cladding layer and totally internally reflects at one of the total internal reflection interfaces of a light redirecting optical element. In a further embodiment, a first lightguide and a second lightguide comprise the core layer, the second lightguide defined by a portion of the frustrated totally internally reflected light from the first lightguide propagating by total internal reflection between a surface of the first lightguide and an area of a surface of the light redirecting optical element, wherein the light redirecting features of a light redirecting optical element occupy less than 50% of the surface of the light redirecting optical element, the area of the surface of the light redirecting element is defined between the light redirecting features and reflects by total internal reflection a second portion of the frustrated totally internally reflected light from the light extraction features back through a first cladding layer and into a core layer of the first lightguide where it totally internally reflects from the surface of the first lightguide and is subsequently reflected by a light redirecting feature toward a reflective spatial light modulator.

In one embodiment, a light emitting device comprises: a film lightguide of a lightguide material with a refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first core layer comprising a first material with a first refractive index, $n_{D1}$, a second layer comprising a second material with a second refractive index $n_{D2}$ where $n_{DL} > n_{D2} > n_{D1}$; a plurality of low angle directing features optically coupled to the body of the lightguide; a plurality of light turning features optically coupled to the lightguide; wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film (measured in air).

In one aspect, a light emitting device including a film with coupling lightguides extending therefrom includes a coupling lightguide Relative Position Maintaining Element (RPME) including a spine region connecting an array of angled teeth or guides. In another aspect, the angled teeth or guides of the RPME are physically coupled by a spine that does not extend outside the volume defined between the overlapping sections of the array of coupling lightguides in the regions of the fold. In another aspect, the array of angled teeth in an RPME include first edges oriented at a first tooth edge angle to the extended direction of the teeth (the direction the teeth extend from the spine, perpendicular to the array direction of the array of teeth) and second edges oriented at a second tooth edge angle to the extended direction of the teeth wherein the first tooth edge angle and second tooth edge angle are greater than 0 degrees.

In another aspect, a lightguide, cladding, or adhesive optically coupled to the lightguide includes a pliable or impact absorbing material. In another aspect, the ASTM D2240 Shore A hardness of the light transmitting lightguide, adhesive, or component physically and/or optically coupled to the lightguide is greater than one selected from the group: 5, 10, 20, 30, 40, 50, 60, 70, and 80.

In one aspect, a light input coupler for a light emitting device includes a wrap around a stack of coupling lightguides wherein the wrap includes a film with a Young's modulus less than one selected from the group: 10, 8, 6, 4, 2, 1, 0.5, and 0.1 gigapascals. In another aspect, the wrap includes perforations or alignment holes. In another aspect, the wrap material is a conformal material coated or injected into a cavity or region including the coupling lightguides.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein.

While the disclosure includes various specific embodiments, those skilled in the art will recognize that the embodiments can be practiced with modification within the spirit and scope of the disclosure and the claims.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context. In the aforementioned embodiments and examples referencing "pressure sensitive adhesives, other coatings or adhesives may be used, such as ultraviolet-cured adhesives, thermoset adhesives, thermoplastic adhesives, or other adhesives known to be compatible for bonding optical elements.

EQUIVALENTS

Those skilled in the art will recognize or be able to ascertain using no more than routine experimentation, numerous equivalents to the specific procedures described herein. Such equivalents are considered to be within the scope of the disclosure. Various substitutions, alterations, and modifications may be made to the embodiments without departing from the spirit and scope of the disclosure. Other aspects, advantages, and modifications are within the scope of the disclosure. This disclosure is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius. Unless otherwise stated, refractive indexes referenced herein are measured at the yellow doublet sodium D-line, with a wavelength of 589 nanometers. Elements in the figures are not drawn to scale. Any reference in this specification to "one embodiment," "an embodiment," "example embodiment," "another embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

What is claimed is:

1. A display comprising:
    a reflective spatial light modulator diffusely reflecting incident light;
    a lightguide comprising a core layer having opposing surfaces with a thickness not greater than 0.5 millimeters therebetween, a lightguide region and a light emitting region;
    a light source positioned to emit light that propagates by total internal reflection within the lightguide region to the light emitting region;
    a cladding layer having a first side optically coupled to the core layer and a second side opposite the first side;
    a plurality of light extraction features arranged within the light emitting region in a pattern that varies spatially in the light emitting region, the plurality of light extraction features frustrate totally internally reflected light from the light source propagating between the opposing surfaces of the core layer such that light exits the core layer in the light emitting region into the cladding layer; and
    a light turning film optically coupled to the second side of the cladding layer, the light turning film having a thickness in a thickness direction and comprising a plurality of light turning features with a first light receiving surface and a second light receiving surface,
    wherein a first portion of the totally internally reflected light frustrated and exited the core layer is redirected by the first light receiving surface such that it exits the light turning film toward the reflective spatial light modulator with a first peak luminous intensity at a first angle from the thickness direction of the light turning film, a second portion of the totally internally reflected light frustrated and exited the core layer is redirected by at least the second light receiving surface such that it exits the light turning film toward the reflective spatial light modulator with a second peak luminous intensity at a second angle from the thickness direction of the light turning film on an opposite side of the thickness direction of the light turning film than the first angle, and the light diffusely reflecting from the reflective spatial light modulator due to a combination of the first portion and the second portion of the totally internally reflected light frustrated and exited the core layer has a peak luminous intensity within 10 degrees from a direction normal to a light emitting surface of the display.

2. The display of claim 1 wherein the first light receiving surface has a first orientation angle within an angular range of 25 to 65 degrees from the thickness direction of the light turning film, and the second light receiving surface has a second orientation angle within an angular range of 60 to 90 degrees from a direction orthogonal to the thickness direction of the light turning film.

3. The display of claim 2 wherein the plurality of light turning features are multi-faceted light turning features.

4. The display of claim 1 wherein at least a portion of the first light receiving surface or the second light receiving surface is curved.

5. The display of claim 1 wherein the first light receiving surface has a first orientation angle within an angular range of 30 to 60 degrees from the thickness direction of the light turning film, and the second light receiving surface has a second orientation angle within an angular range of 80 to 90 degrees from a direction orthogonal to the thickness direction of the light turning film.

6. The display of claim 1 wherein the second portion of the totally internally reflected light frustrated and exited the core layer is redirected by total internal reflection from the first light receiving surface and the second light receiving surface such that it exits the light turning film with a second peak luminous intensity at a second angle from the thickness direction of the light turning film on an opposite side of the thickness direction of the light turning film than the first angle.

7. The display of claim 1 wherein the first portion of the totally internally reflected light frustrated and exited the core layer has a first angular full-width at half maximum luminous intensity, the second portion of the totally internally reflected light frustrated and exited the core layer has a second angular full-width at half maximum luminous intensity, and light reflecting from the reflective spatial light modulator due to the first portion of the totally internally reflected light and the second portion of the totally internally reflected light frustrated and exited the core layer has a third angular full-width at half-maximum luminous intensity greater than the first angular full-width at half maximum luminous intensity and the second angular full-width at half maximum luminous intensity.

8. The display of claim 7 wherein the first angular full-width at half maximum luminous intensity and the second angular full-width at half maximum luminous intensity are between 5 and 40 degrees measured in air.

9. The display of claim 1 wherein the light turning film is positioned between the lightguide and the reflective spatial light modulator.

10. The display of claim 1 wherein the reflective spatial light modulator has an optical property of diffusely reflecting light incident at an angle of 35 degrees from a normal to a top surface of the reflective spatial light modulator with a divergences less than 3 milliradians to light with an angular full-width at half maximum intensity less than 30 degrees measured in air.

11. The display of claim 1 wherein the first angle is between 15 and 30 degrees and the second angle is between 15 and 30 degrees measured in air.

12. The display of claim 1 wherein the reflective spatial light modulator is a reflective liquid crystal display.

13. The display of claim 1 wherein a refractive index of the core layer of the lightguide is greater than 1.5.

14. A display comprising:
a reflective spatial light modulator diffusely reflecting incident light;
a lightguide comprising a core layer having opposing surfaces with a thickness not greater than 0.5 millimeters therebetween, a lightguide region and a light emitting region;
a light source positioned to emit light that propagates by total internal reflection within the lightguide region to the light emitting region;
a cladding layer having a first side optically coupled to the core layer and a second side opposite the first side;
a plurality of light extraction features arranged within the light emitting region in a pattern that varies spatially in the light emitting region, the plurality of light extraction features frustrate totally internally reflected light from the light source propagating between the opposing surfaces of the core layer such that light exits the core layer in the light emitting region into the cladding layer; and a light turning film optically coupled to the second side of the cladding layer, the light turning film having a thickness in a thickness direction and comprising a plurality of light turning features that redirect frustrated totally internally reflected light from the core layer into a first portion of light and a second portion of light,
wherein the first portion of light exits the light turning film toward the reflective spatial light modulator with a first peak luminous intensity at a first angle from the thickness direction of the light turning film, the second portion of light exits the light turning film toward the reflective spatial light modulator with a second peak luminous intensity at a second angle from the thickness direction of the light turning film on an opposite side of the thickness direction of the light turning film than the first angle, and the light diffusely reflecting from the reflective spatial light modulator due to the first portion of light and the second portion of light of the frustrated totally internally reflected light has a peak luminous intensity within 10 degrees from a direction normal to a light emitting surface of the display.

15. The display of claim 14 wherein the first angle measured in air is between 15 and 30 degrees and the second angle measured in air is between 15 and 30 degrees.

16. The display of claim 14 wherein the plurality of light turning features are multi-faceted light turning features.

17. The display of claim 14 wherein the plurality of light turning features comprise at least one curved surface.

18. The display of claim 14 wherein the light turning film is positioned between the lightguide and the reflective spatial light modulator.

19. The display of claim 14 wherein:
the lightguide is formed from a film and comprises an array of coupling lightguides in a form of strips of the film extending from and continuous with the lightguide region of the film;
each coupling lightguide of the array of coupling lightguides terminates in a bounding edge;
each coupling lightguide is folded in a fold region such that the array of coupling lightguides are stacked and oriented in a first direction parallel to their stacked surfaces and the bounding edges of the array of coupling lightguides are stacked; and
the light source is positioned to emit light into the bounding edges, the light propagating within the array of coupling lightguides to the lightguide region, with light from each coupling lightguide combining and totally internally reflecting within the lightguide region.

20. A display comprising:
a reflective spatial light modulator diffusely reflecting incident light;
a lightguide comprising a core layer having opposing surfaces with a thickness not greater than 0.5 millimeters therebetween, a lightguide region and a light emitting region;
a light source positioned to emit light that propagates by total internal reflection within the lightguide region to the light emitting region;
a cladding layer having a first side optically coupled to the core layer and a second side opposite the first side;
a plurality of light extraction features arranged within the light emitting region in a pattern that varies spatially in the light emitting region, the plurality of light extraction features frustrate totally internally reflected light from the light source propagating between the opposing surfaces of the core layer such that light exits the core layer in the light emitting region into the cladding layer; and a light turning film optically coupled to the second side of the cladding layer, the light turning film having a thickness in a thickness direction and comprising a plurality of light turning features that redirect frustrated totally internally reflected light from the core layer into a first portion of light and a second portion of light, wherein the first portion of light exits the light turning film toward the reflective spatial light modulator with a first peak luminous intensity at a first angle between 5 and 20 degrees from the thickness direction of the light turning film measured in air, the second portion of light exits the light turning film toward the reflective spatial light modulator with a second peak luminous intensity at a second angle larger than the first angle between 15 and 35 degrees measured in air from the thickness direction of the light turning film on a same side of the thickness direction of the light turning film than the first angle, and the light diffusely reflecting from the reflective spatial light modulator due to the first portion of light and the second portion of light of the totally internally reflected light frustrated and exited the core layer has a peak luminous intensity within 10 degrees measured in air from a direction normal to a light emitting surface of the display.

21. The display of claim 20 wherein the light turning film comprises a first surface optically coupled to the second side of the cladding layer and a second surface opposite the first surface, the second surface comprises the light turning features, and the light turning features are recessed regions between planar regions of the second surface of the light turning film.

22. The display of claim 21 wherein a pressure sensitive adhesive is adhered to the planar regions of the second surface of the light turning film.

* * * * *